United States Patent
Hirai et al.

(10) Patent No.: US 10,906,387 B2
(45) Date of Patent: Feb. 2, 2021

(54) COOLING APPARATUS OF VEHICLE DRIVING SYSTEM

(71) Applicant: TOYOTA JIDOSHA KABUSHIKI KAISHA, Aichi (JP)

(72) Inventors: Takuya Hirai, Susono (JP); Yuji Miyoshi, Susono (JP); Tomohiro Shinagawa, Shizuoka-ken (JP); Masatoshi Yano, Hadano (JP); Hiroyuki Sugihara, Shizuoka-ken (JP); Ryo Michikawauchi, Numazu (JP); Kunihiko Hayashi, Odawara (JP); Yoichi Ogura, Mishima (JP); Hidefumi Aikawa, Shizuoka-ken (JP); Yu Ofune, Kariya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 8 days.

(21) Appl. No.: 16/384,935

(22) Filed: Apr. 16, 2019

(65) Prior Publication Data
US 2020/0047605 A1 Feb. 13, 2020

(30) Foreign Application Priority Data

Aug. 8, 2018 (JP) .................................. 2018-149302

(51) Int. Cl.
*B60K 11/02* (2006.01)
*B60K 6/26* (2007.10)
(Continued)

(52) U.S. Cl.
CPC ................ *B60K 11/02* (2013.01); *B60K 6/26* (2013.01); *F01P 3/12* (2013.01); *F01P 7/165* (2013.01);
(Continued)

(58) Field of Classification Search
CPC . B60K 1/00; B60K 6/26; B60K 11/02; B60K 2001/006; B60K 2001/005;
(Continued)

(56) References Cited

U.S. PATENT DOCUMENTS 6,928,962 B2 * 8/2005 Yamazaki ................ B60K 6/24
123/41.05
7,168,398 B2 * 1/2007 Ap .......................... F01P 7/165
123/41.1
(Continued)

FOREIGN PATENT DOCUMENTS

| JP | 4753996 B2 | 8/2011 |
| JP | 2013-177026 A | 9/2013 |
| WO | 2007/031670 A1 | 3/2007 |

*Primary Examiner* — Grant Moubry
(74) *Attorney, Agent, or Firm* — Hauptman Ham, LLP

(57) ABSTRACT

A cooling apparatus of a vehicle driving system of the invention connects an engine water circulation passage to a hybrid system water circulation passage and flows cooling water in the engine water circulation passage and the hybrid system water circulation passage to cool a first hybrid system component by the cooling water cooled by an engine radiator and cool a second hybrid system component by the cooling water cooled by a hybrid system radiator when an engine cooling process is not requested, a first hybrid system cooling process is requested, a second hybrid system cooling process is requested, and a connection condition is satisfied. The connection condition is satisfied when the engine cooling process is not requested, and the cooling water flowing into the hybrid system water circulation passage from the engine water circulation passage, can cool the first hybrid system component.

14 Claims, 52 Drawing Sheets

(51) Int. Cl.
  *F01P 3/12*    (2006.01)
  *F01P 7/16*    (2006.01)
  *B60K 1/00*    (2006.01)

(52) U.S. Cl.
  CPC ..... *B60K 2001/006* (2013.01); *F01P 2050/24* (2013.01)

(58) Field of Classification Search
  CPC ........ F01P 3/12; F01P 3/20; F01P 7/16; F01P 7/165; F01P 11/00; F01P 2050/24
  See application file for complete search history.

(56) References Cited

U.S. PATENT DOCUMENTS

| | | | |
|---|---|---|---|
| 8,215,427 B2 * | 7/2012 | Rouaud | B60K 6/26 180/65.27 |
| 8,439,003 B2 * | 5/2013 | Araki | F01P 7/165 123/41.1 |
| 2007/0137909 A1 * | 6/2007 | Zillmer | B60K 6/485 180/65.245 |
| 2008/0251303 A1 | 10/2008 | Rouaud et al. | |
| 2013/0226380 A1 | 8/2013 | Ando et al. | |

* cited by examiner

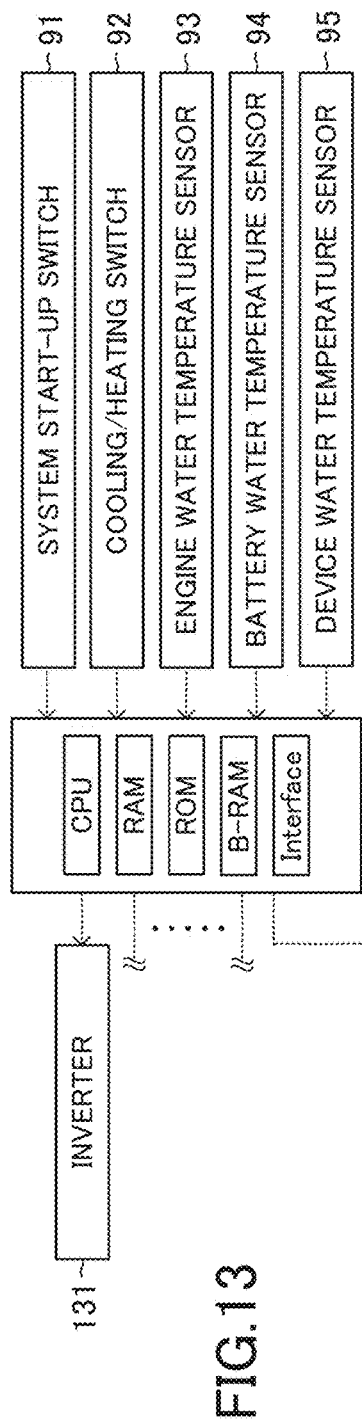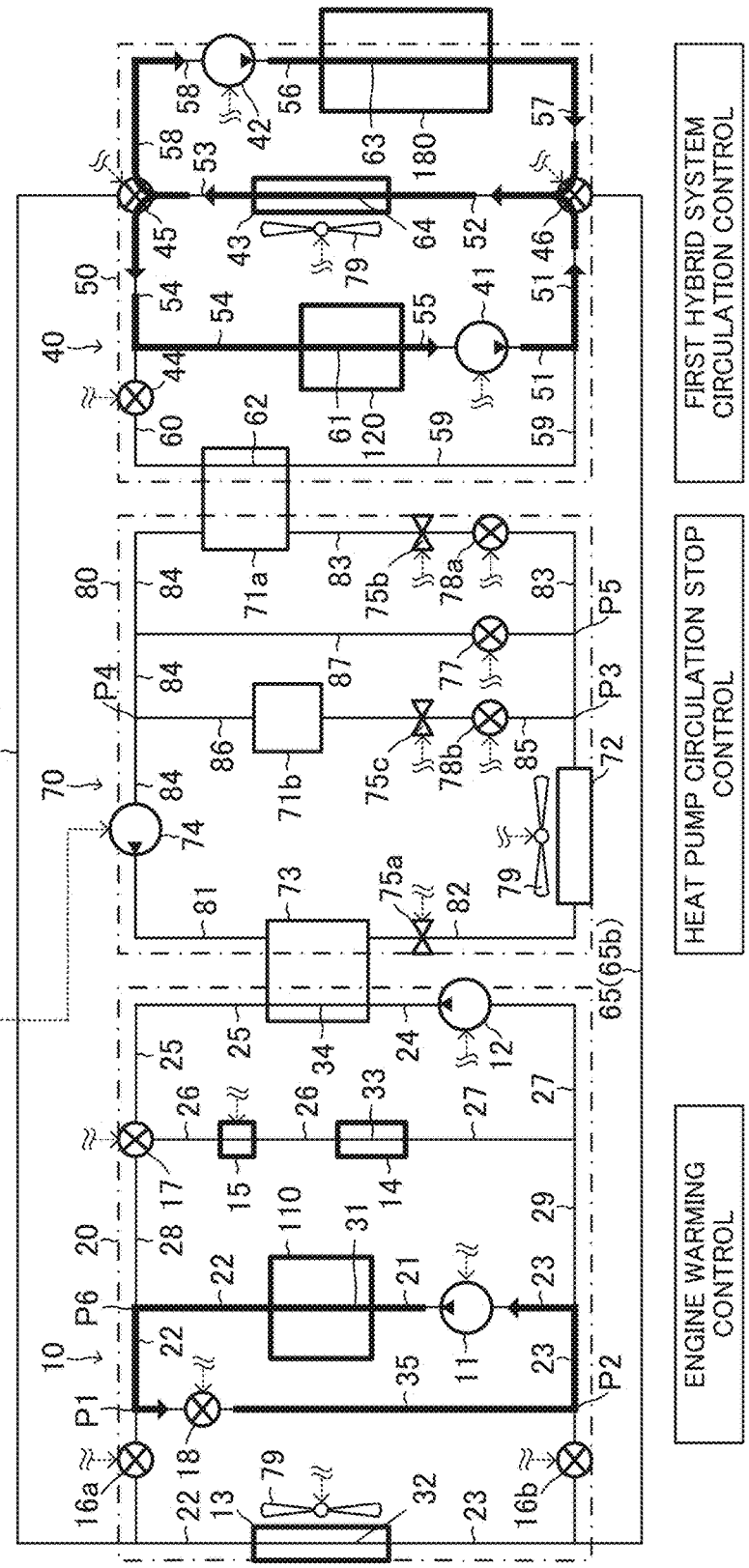
FIG.13

FIG.23
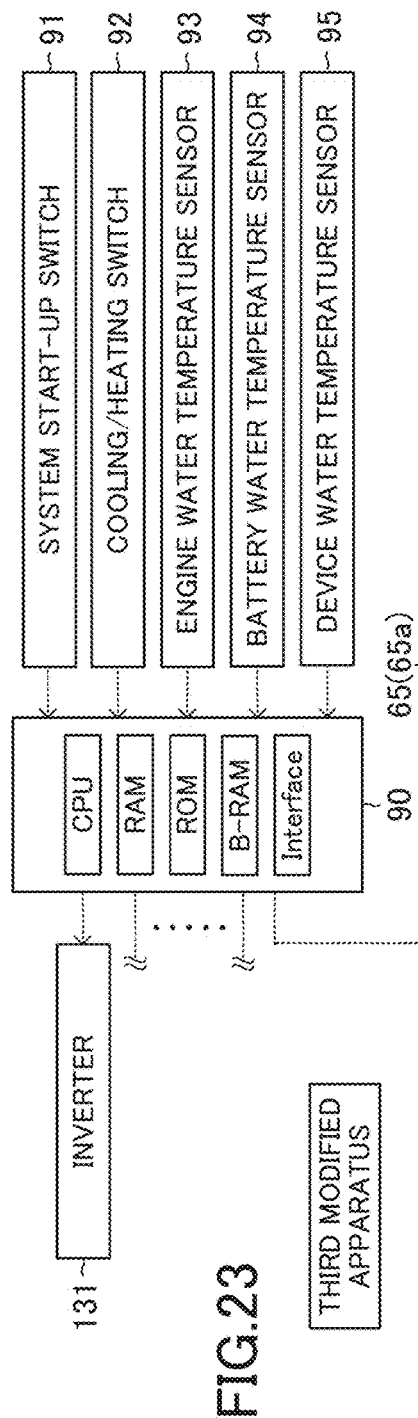
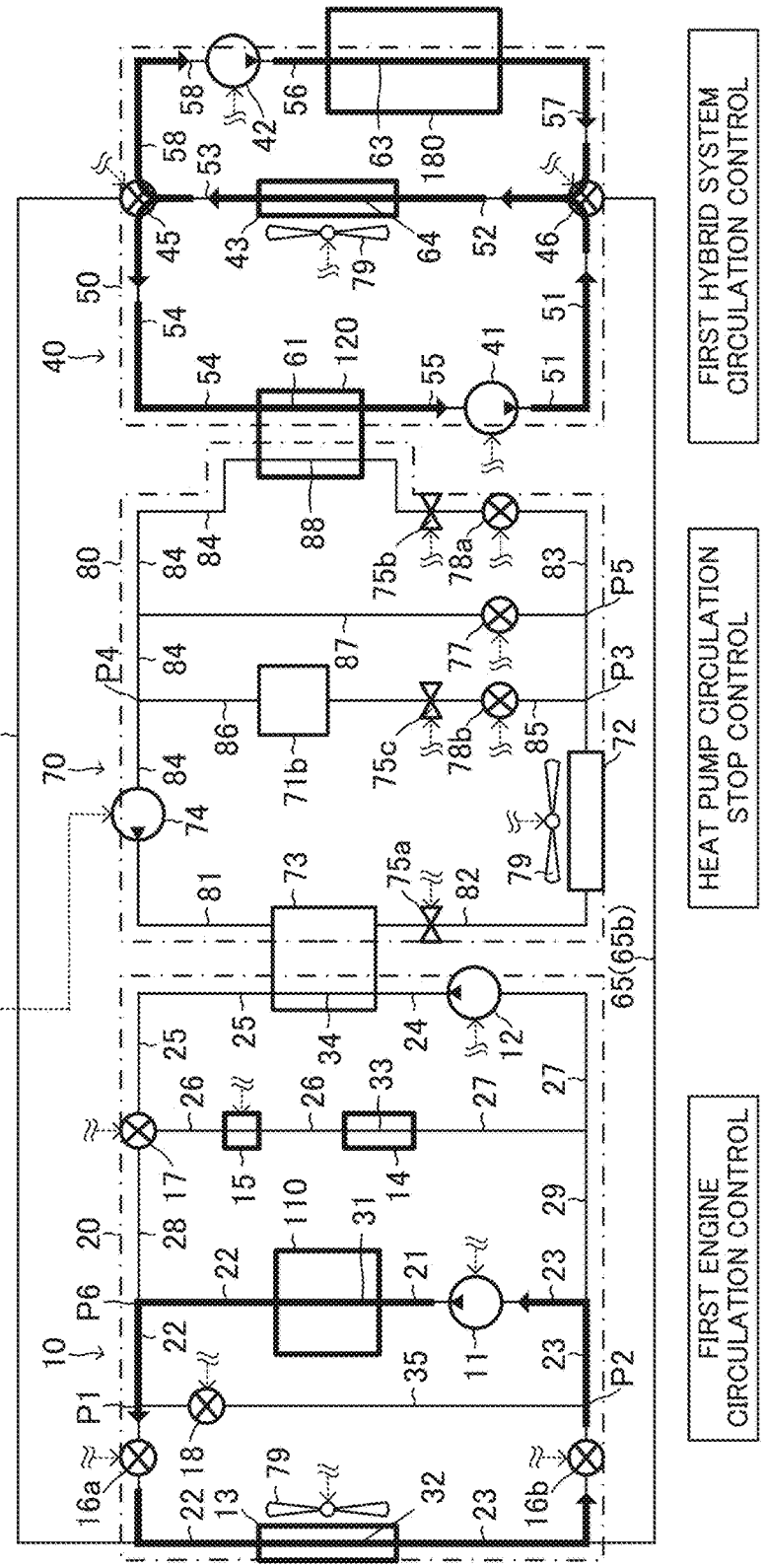

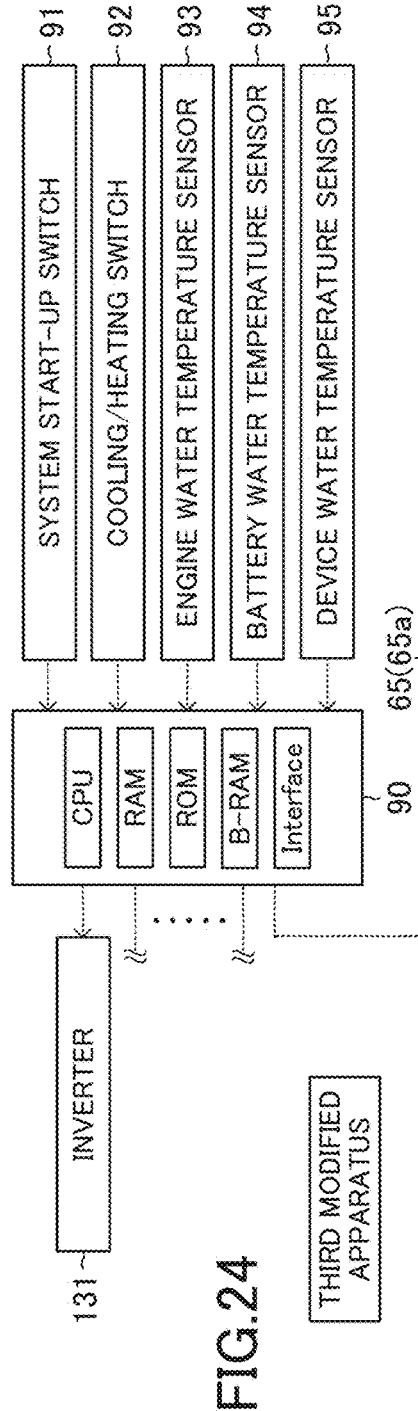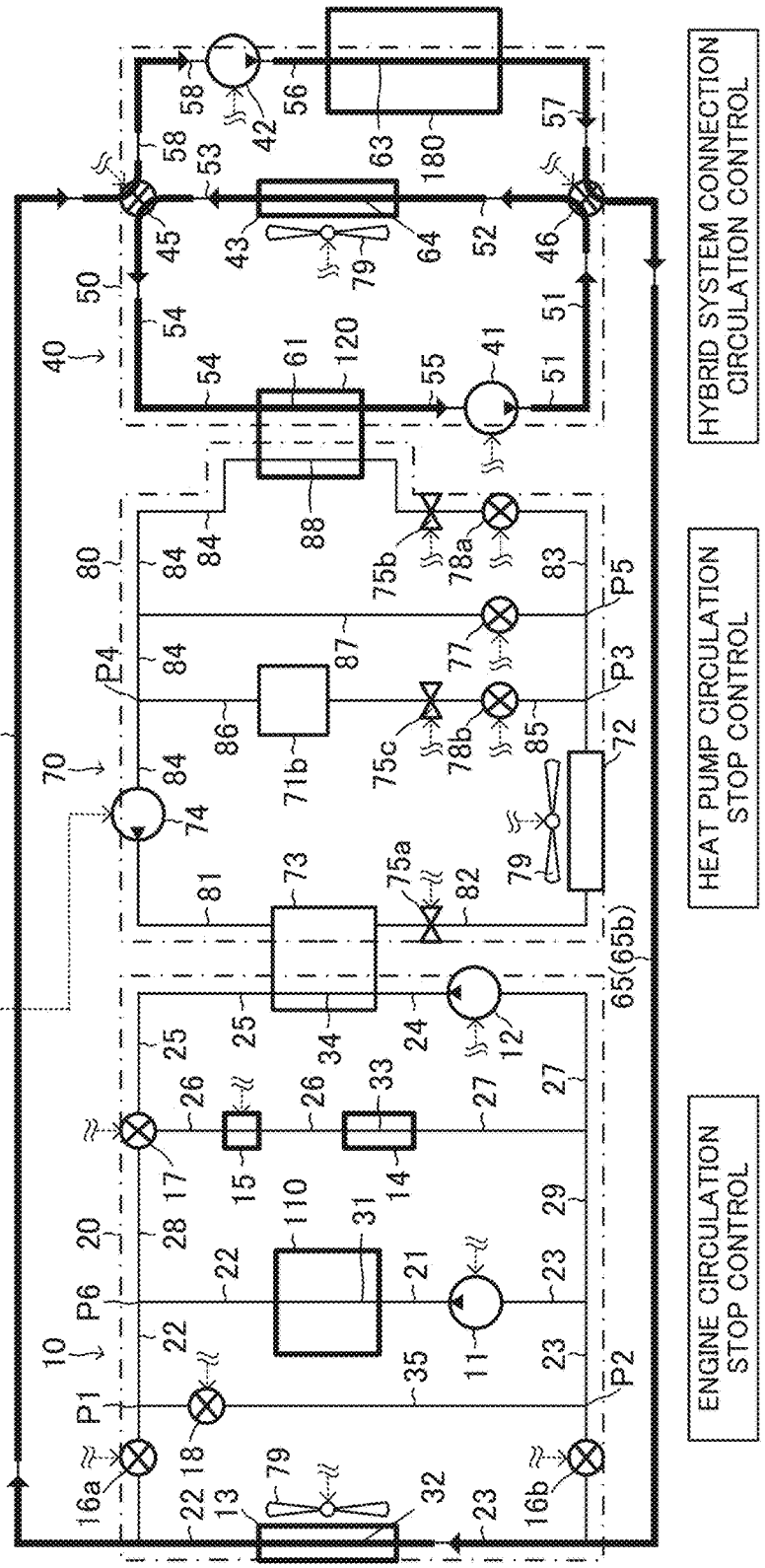
FIG.24

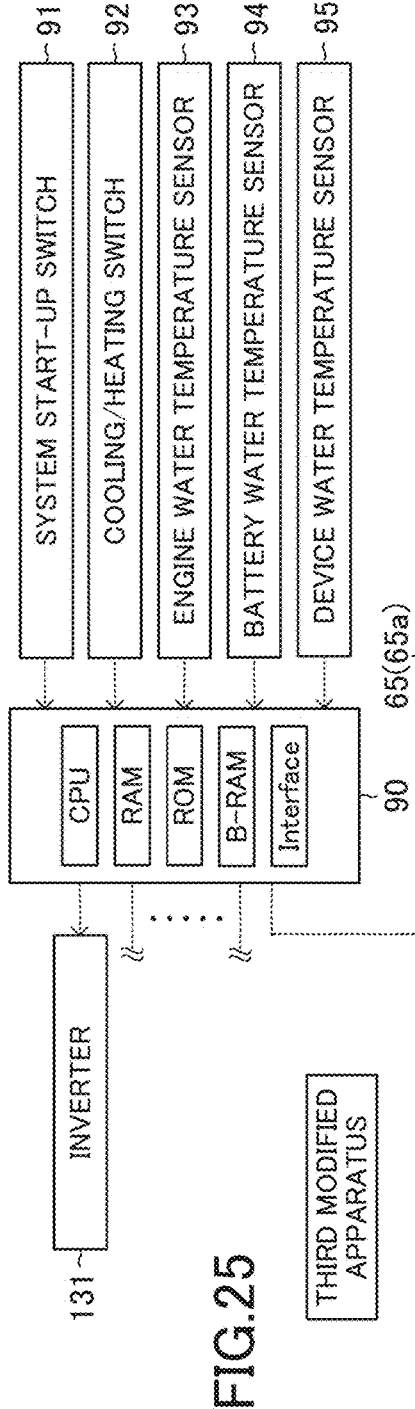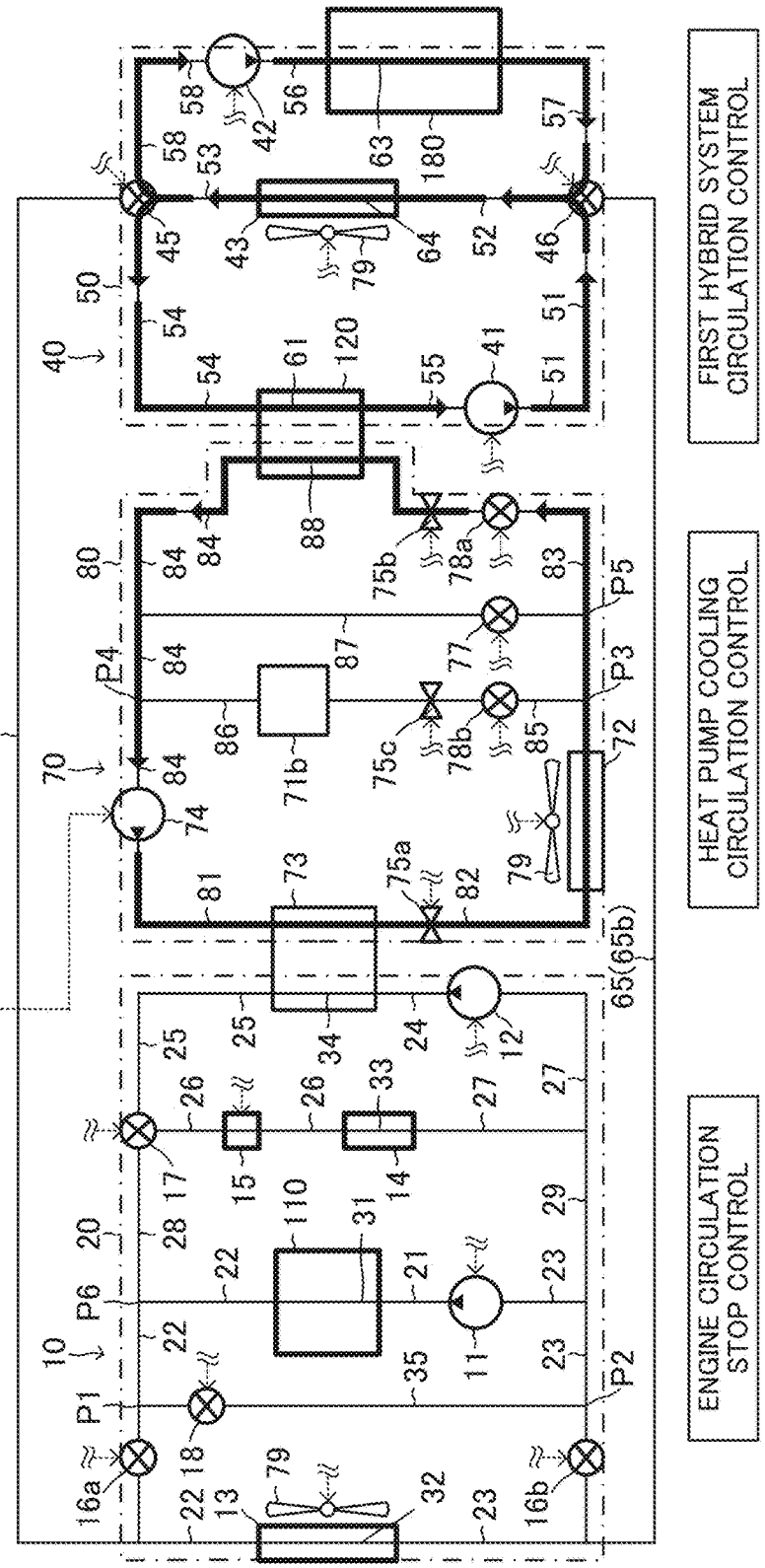
FIG.25

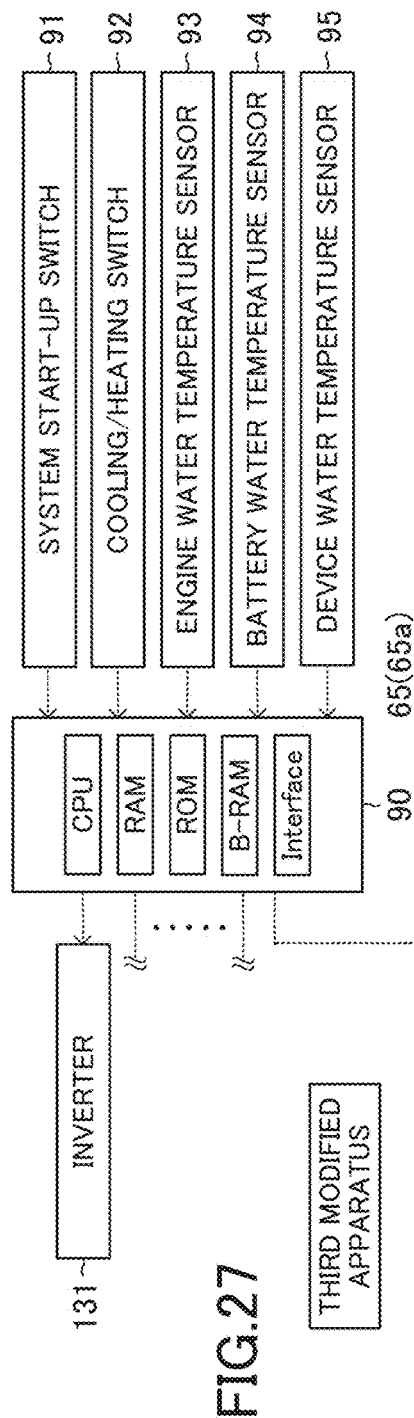
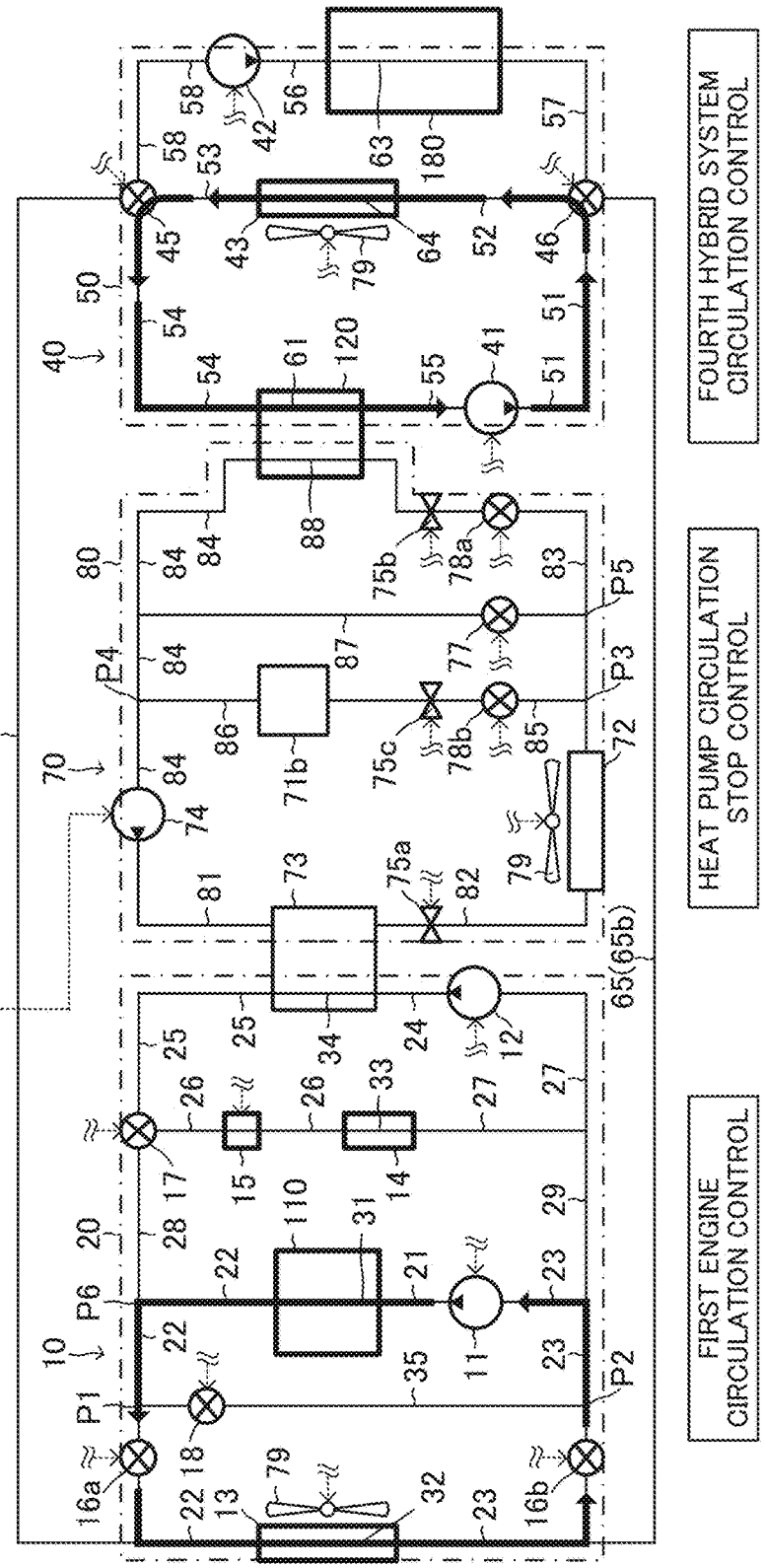
FIG.27

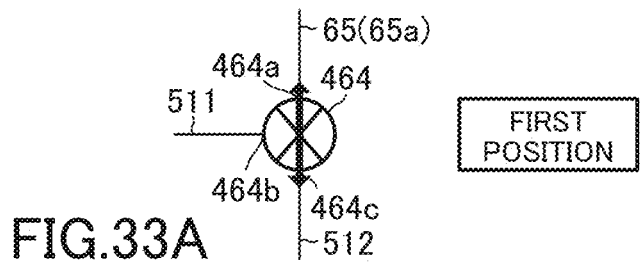
FIG.33A — FIRST POSITION
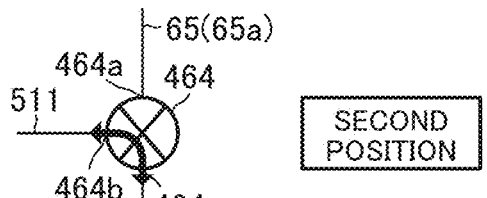
FIG.33B — SECOND POSITION
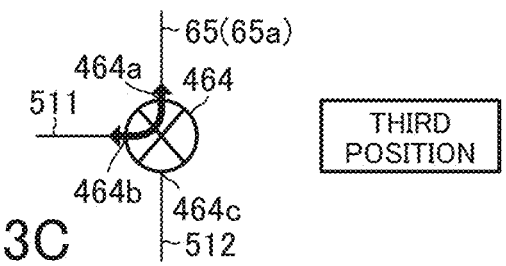
FIG.33C — THIRD POSITION
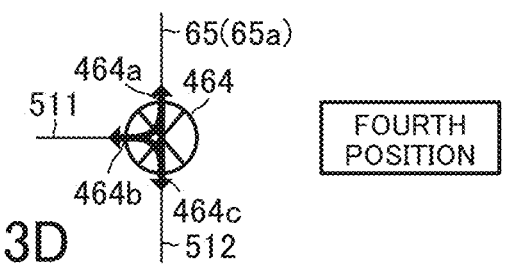
FIG.33D — FOURTH POSITION

FIG.36 HYBRID SYSTEM CONNECTION CIRCULATION CONTROL

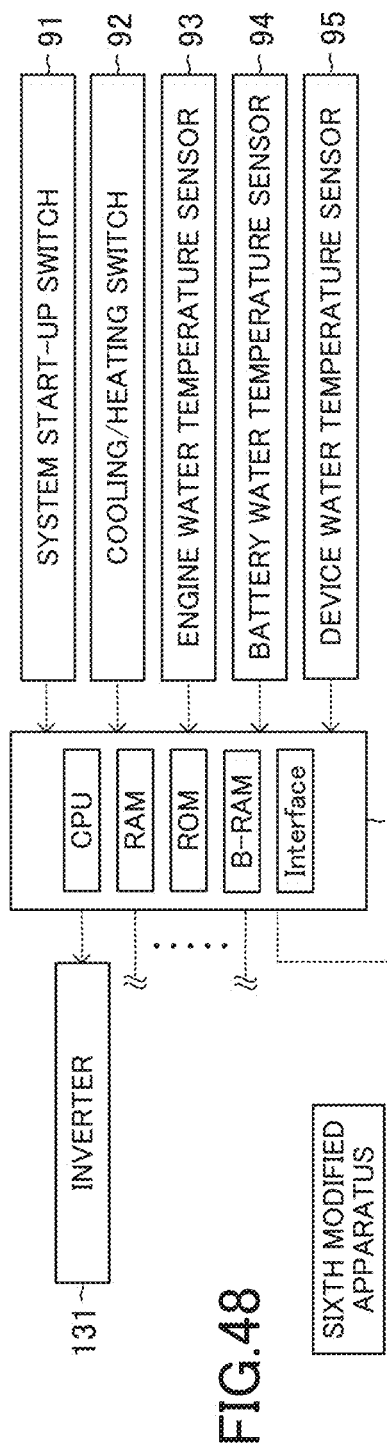
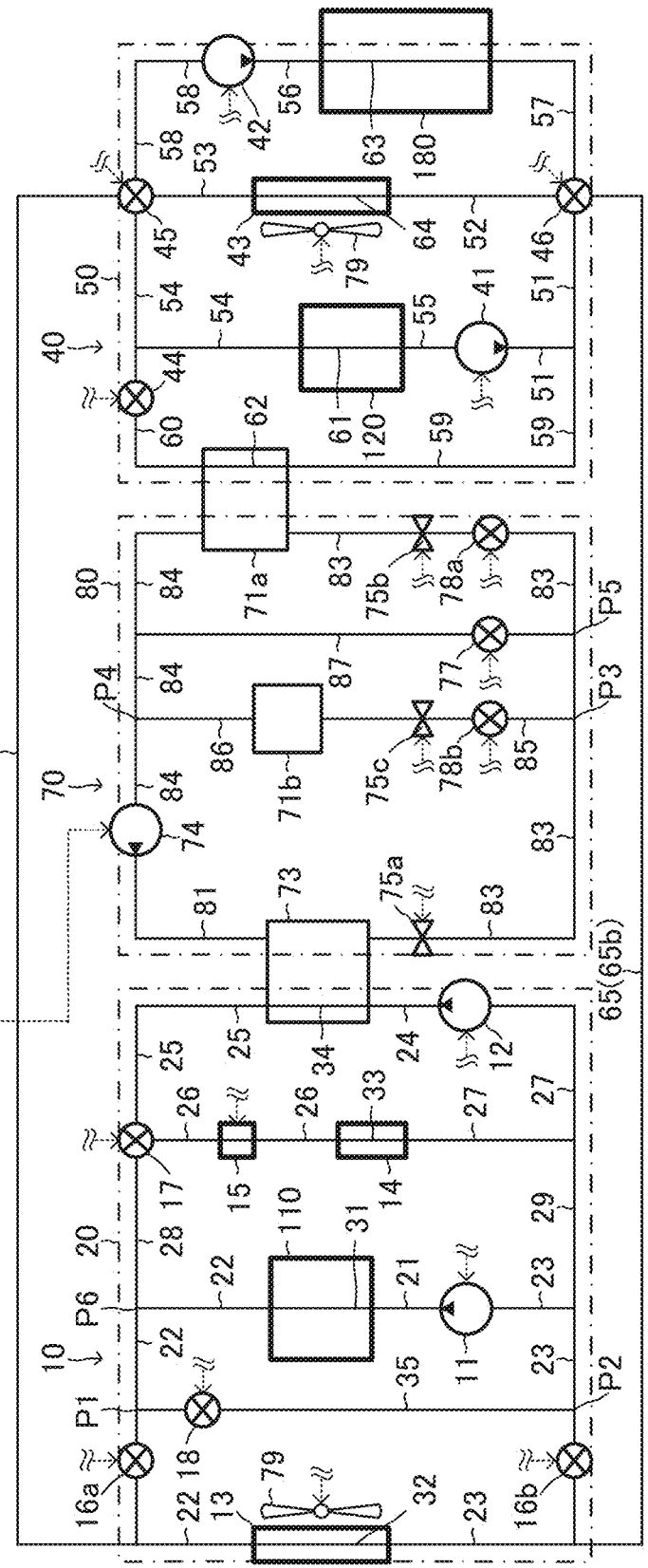
FIG.48

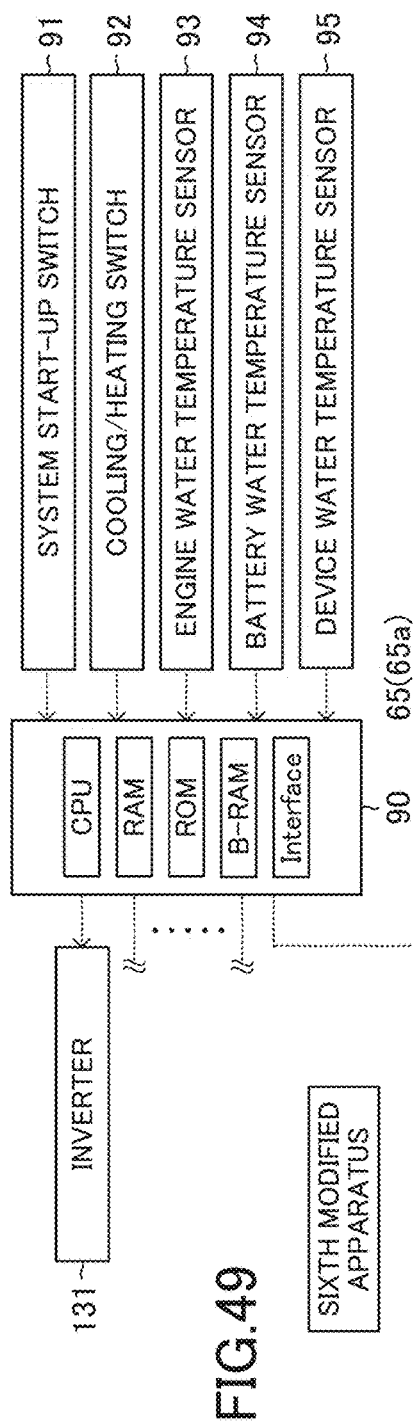
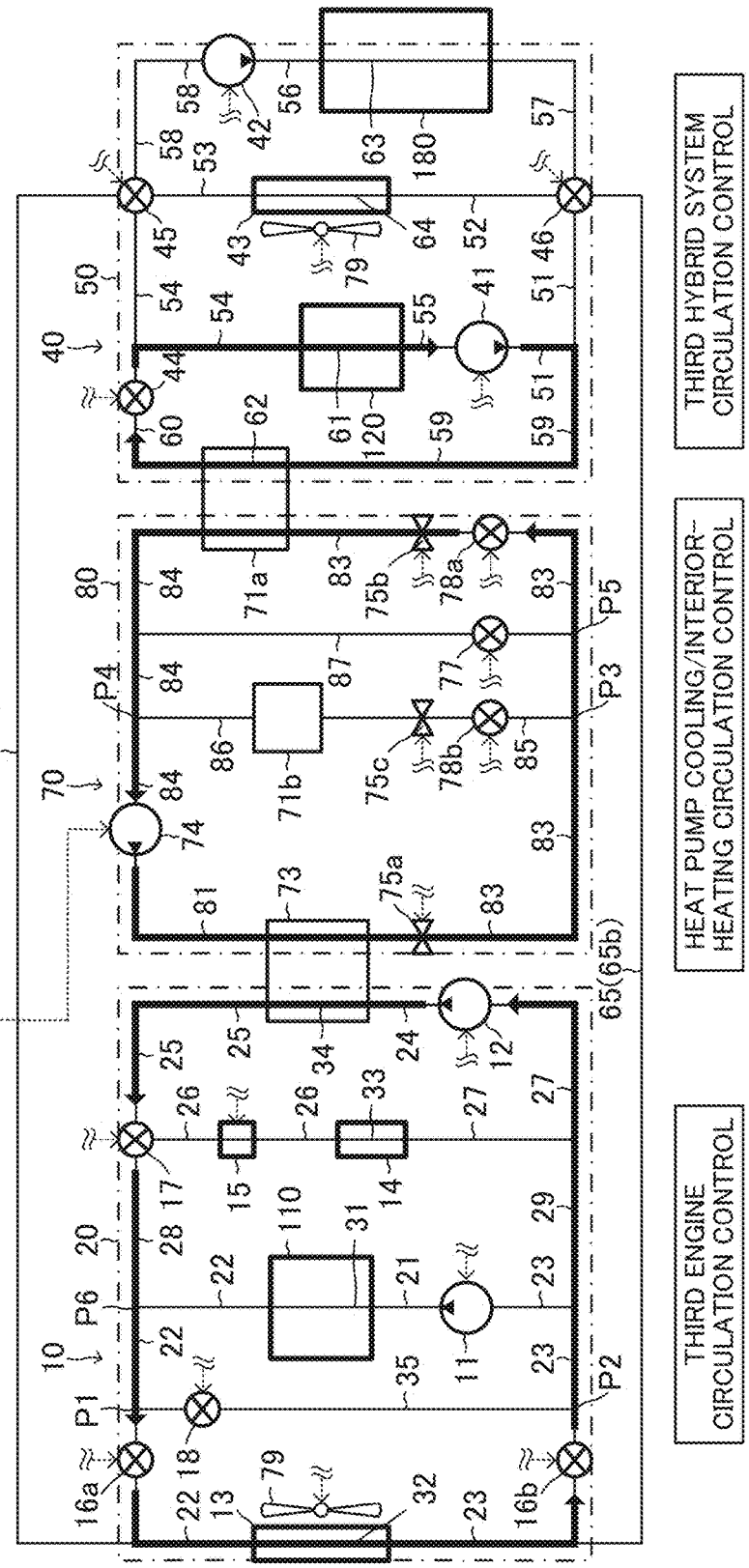
FIG.49

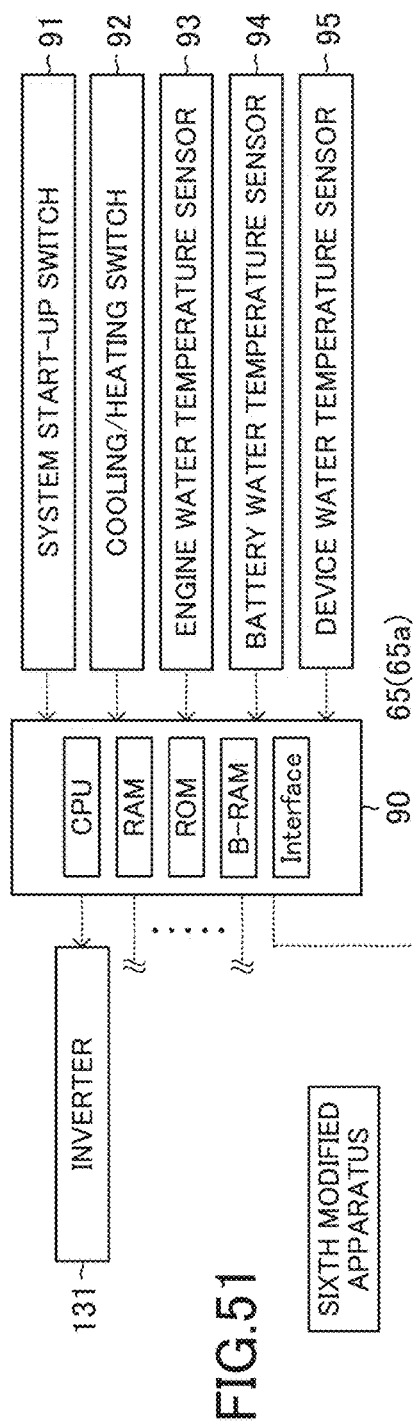
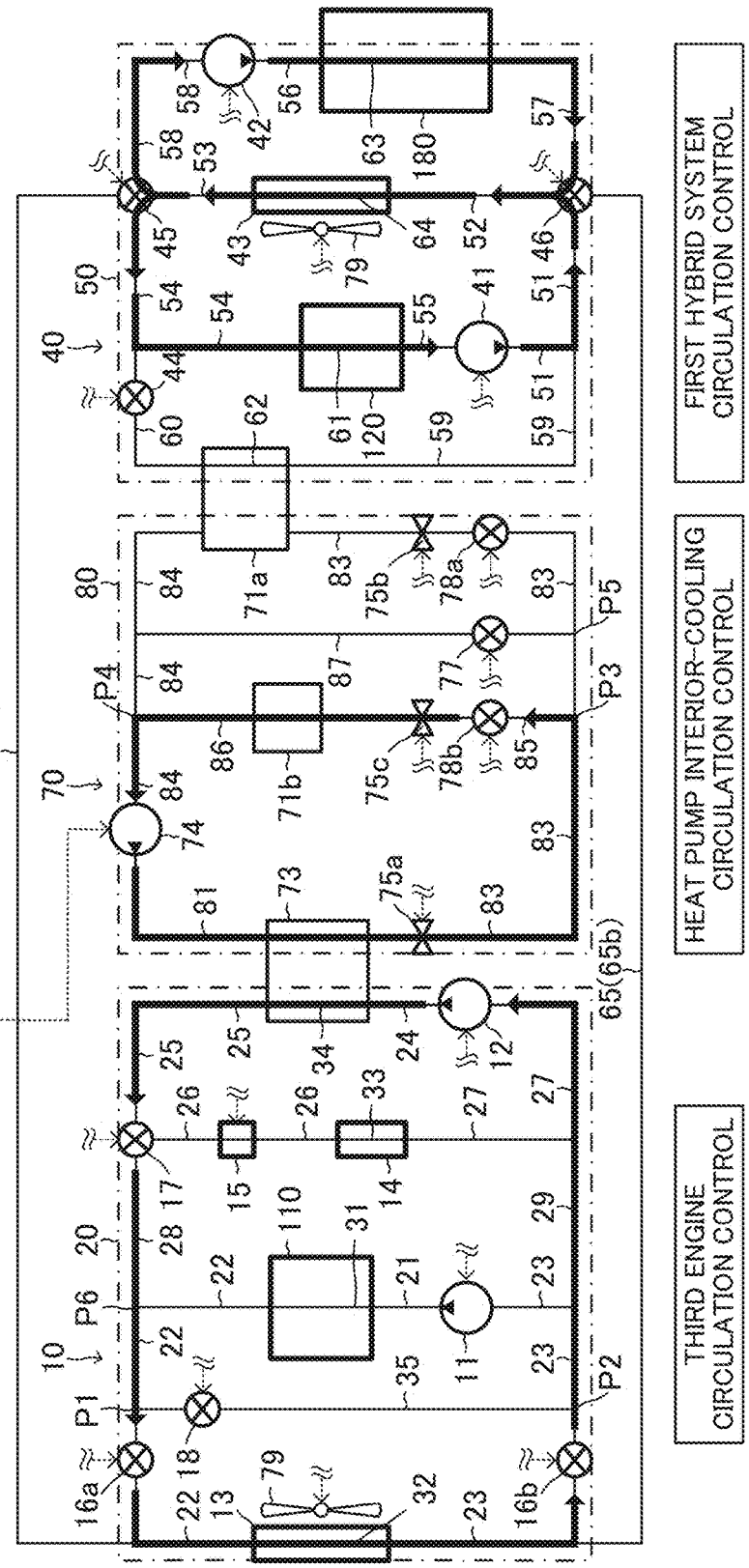
FIG.51

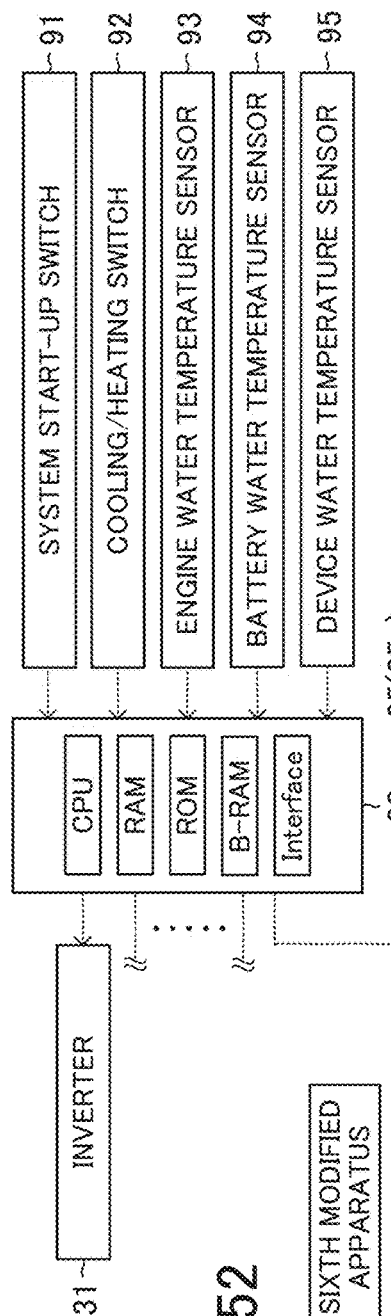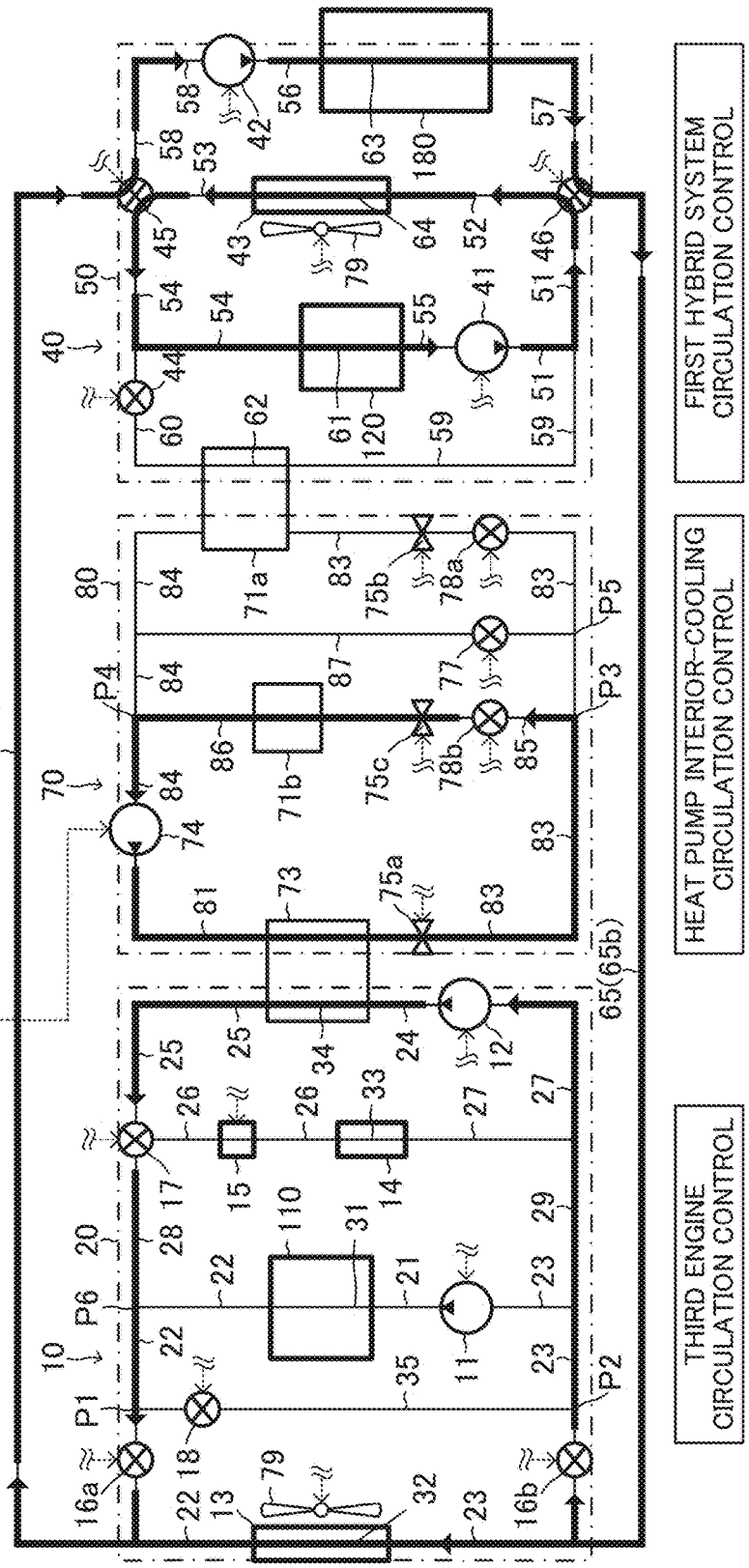
FIG.52

COOLING APPARATUS OF VEHICLE DRIVING SYSTEM

RELATED APPLICATIONS

The present application claims priority to Japanese Patent Application No. 2018-149302, filed Aug. 8, 2018, the disclosure of which is hereby incorporated by reference herein in its entirety.

BACKGROUND

Field

The invention relates to a cooling apparatus of a vehicle driving system.

Description of the Related Art

There is known a hybrid vehicle driven by a vehicle driving system including an internal combustion engine and an electric motor. The vehicle driving system of the hybrid vehicle comprises a battery for storing electric power to be supplied to the electric motor. The hybrid vehicle comprises a cooling apparatus including water circulation passages, through which cooling water flows for cooling the internal combustion engine, the electric motor, and the battery, thereby preventing temperatures of the internal combustion engine, the motor, and the battery from increasing excessively.

In general, a temperature of a hybrid system including the electric motor and the battery should be maintained at a temperature lower than the temperature of the internal combustion engine. Accordingly, one of the water circulation passages of the cooling apparatus of the hybrid vehicle is used as a hybrid system water circulation passage for the cooling water for cooling the hybrid system, and the other water circulation passage of the cooling apparatus of the hybrid vehicle is used as an engine water circulation passage for the cooling water for cooling the internal combustion engine.

Further, when the hybrid system is not activated, it is not necessary to cool the hybrid system. Thus, there is known a cooling apparatus which is configured to stop flowing the cooling water in the hybrid system water circulation passage when the hybrid system is not activated (for example, see JP 4753996 B). The known cooling apparatus is configured to connect the engine water circulation passage to the hybrid system water circulation passage to cool the cooling water for cooling the internal combustion engine by both of a radiator provided in the engine water circulation passage and a radiator provided in the hybrid system water circulation passage when the hybrid system is not activated, and the temperature of the cooling water flowing in the engine water circulation passage is considerably high.

When an operation of the internal combustion engine is stopped, it is not necessary to cool the internal combustion engine and thus, the radiator provided in the engine water circulation passage is not used for cooling the cooling water for cooling the internal combustion engine. Therefore, in the known cooling apparatus, a degree of the cooling water to cool the hybrid system may be increased by connecting the hybrid system water circulation passage to the engine water circulation passage to cool the cooling water for cooling the hybrid system by both of the radiator provided in the hybrid system water circulation passage and the radiator provided in the engine water circulation passage when the operation of the internal combustion engine is stopped.

As described above, the temperature of the hybrid system should be maintained at the temperature lower than the temperature of the internal combustion engine. Therefore, when the temperature of the cooling water remaining in the engine water circulation passage at a time of connecting the hybrid system water circulation passage to the engine water circulation passage, is high, the cooling water having a high temperature flows into the hybrid system water circulation passage and is supplied to the hybrid system. In this case, the hybrid system may be heated by the cooling water, and the temperature of the hybrid system may be increased. As a result, the temperature of the hybrid system may not be maintained within an appropriate temperature range.

SUMMARY

The invention has been made for solving the aforementioned problem. An object of the invention is to provide a cooling apparatus of the vehicle driving system which can prevent the temperature of the hybrid system from being increased excessively when the cooling water for cooling the hybrid system is cooled by both of the radiator provided in the hybrid system water circulation passage and the radiator provided in the engine water circulation passage.

A cooling apparatus of a vehicle driving system (200) according to the invention comprises an engine water circulation passage (20), an engine radiator (13), a hybrid system water circulation passage (50), a hybrid system radiator (43), a connection device (65), and an electronic control unit (90).

Cooling water for cooling an internal combustion engine (110) of the vehicle driving system (200) for driving a vehicle (100), flows through the engine water circulation passage (20). The engine radiator (13) is provided in the engine water circulation passage (20) for cooling the cooling water by an outside air.

The cooling water for cooling a first hybrid system component (180 or 120) and a second hybrid system component (120 or 180) of the vehicle driving system (200), flows through the hybrid system water circulation passage (50). One of the first hybrid system component (180 or 120) and the second hybrid system component (120 or 180) includes at least one of an electric motor (111, 112) and a battery (120). The hybrid system radiator (43) is provided in the hybrid system water circulation passage (50) for cooling the cooling water by the outside air.

The connection device (65) includes a first connection water passage (65*a*) for connecting the engine water circulation passage (20) to the hybrid system water circulation passage (50) and a second connection water passage (65*b*) for connecting the hybrid system water circulation passage (50) to the engine water circulation passage (20).

The electronic control unit (90) controls a flow of the cooling water and an activation of the connection device (65).

The electronic control unit (90) is configured to execute a first control (see processes of steps 930 and 940 in FIG. 9 and a process of a step 1070 in FIG. 10) when an engine cooling process of cooling the internal combustion engine (110) is requested, a first hybrid system cooling process of cooling the first hybrid system component (180 or 120) is requested, a second hybrid system cooling process of cooling the second hybrid system component (120 or 180) is requested, and a connection condition (C1 and C2 or C3 or C4) is not satisfied (see determinations "Yes" at steps 905 and 910 in FIG. 9, determinations "Yes" at steps 1010 and 1020 in FIG. 10, and determinations "No" at steps 1030 and 1050 in FIG. 10).

In the first control, the electronic control unit (90) controls the activation of the connection device (65) to disconnect the engine water circulation passage (20) from the hybrid system water circulation passage (50) through the first connection water passage (65a) and disconnect the hybrid system water circulation passage (50) from the engine water circulation passage (20) through the second connection water passage (65b) (see the process of the step 1070 in FIG. 10).

In addition, in the first control, the electronic control unit (90) controls the flow of the cooling water in the engine water circulation passage (20) to cool the internal combustion engine (110) by the cooling water cooled by the engine radiator (13) (see the processes of the steps 930 and 940 in FIG. 9).

In addition, in the first control, the electronic control unit (90) controls the flow of the cooling water in the hybrid system water circulation passage (50) to cool the first hybrid system component (180 or 120) and the second hybrid system component (120 or 180) by the cooling water cooled by the hybrid system radiator (43) (see the process of the step 1070 in FIG. 10).

On the other hand, the electronic control unit (90) is configured to execute a second control (see a process of a step 950 in FIG. 9 and a process of a step 1040 in FIG. 10) when the engine cooling process is not requested, the first hybrid system cooling process is requested, the second hybrid system cooling process is requested, and the connection condition (C1 and C2 or C3 or C4) is satisfied (see a determination "No" at the step 905 in FIG. 9, the determinations "Yes" at the step 1010 and 1020 in FIG. 10, and a determination "Yes" at the step 1030 in FIG. 10).

In the second control, the electronic control unit (90) controls the activation of the connection device (65) to connect the engine water circulation passage (20) to the hybrid system water circulation passage (50) through the first connection water passage (65a) and connect the hybrid system water circulation passage (50) to the engine water circulation passage (20) through the second connection water passage (65b) (see the process of the step 1040 in FIG. 10).

In addition, in the second control, the electronic control unit (90) controls the flow of the cooling water in the engine water circulation passage (20), the hybrid system water circulation passage (50), the first connection water passage (65a), and the second connection water passage (65b) to cool the first hybrid system component (180 or 120) by the cooling water cooled by the engine radiator (13) and cool the second hybrid system component (120 or 180) by the cooling water cooled by the hybrid system radiator (43) (see the processes of the step 950 in FIG. 9 and the step 1040 in FIG. 10).

The connection condition (C1 and C2 or C3 or C4) is satisfied when the engine cooling process is not requested, and the cooling water flowing into the hybrid system water circulation passage (50) from the engine water circulation passage (20) through the first connection water passage (65a), can cool the first hybrid system component (180 or 120).

According to the invention, when the hybrid system water circulation passage is fluidically connected to the engine water circulation passage through the first connection water passage, and the cooling water flows into the hybrid system water circulation passage from the engine water circulation passage through the first connection water passage, the cooling water flowing into the hybrid system water circulation passage from the engine water circulation passage, can cool the first hybrid system component. In addition, when the hybrid system water circulation passage is fluidically connected to the engine water circulation passage through the first connection water passage, and the cooling water flows into the hybrid system water circulation passage from the engine water circulation passage through the first connection water passage, the first hybrid system component is cooled by the cooling water cooled by the engine radiator, and the second hybrid system component is cooled by the cooling water cooled by the hybrid system radiator. Therefore, a degree of the cooling water to cool the first hybrid system component and a degree of the cooling water to cool the second hybrid system component are increased. Thus, temperatures of the first and second hybrid system components can be prevented from being increased excessively.

According to an aspect of the invention, the electronic control unit (90) may be configured to determine whether the cooling water flowing into the hybrid system water circulation passage (50) from the engine water circulation passage (20) through the first connection water passage (65a), can cool the first hybrid system component (180 or 120) on the basis of a temperature (TWeng) of the cooling water in the engine water circulation passage (20) without the second control being executed and a temperature (TWdev or TWbat) of the cooling water in the hybrid system water circulation passage (50) without the second control being executed.

According to another aspect of the invention, the electronic control unit (90) may be configured to determine that the cooling water flowing into the hybrid system water circulation passage (50) from the engine water circulation passage (20) through the first connection water passage (65a), can cool the first hybrid system component (180 or 120) when the temperature (TWeng) of the cooling water in the engine water circulation passage (20) without the second control being executed, is equal to or lower than the temperature (TWdev or TWbat) of the cooling water in the hybrid system water circulation passage (50) without the second control being executed.

When the temperature of the cooling water in the engine water circulation passage without the second being executed, is equal to or lower than the temperature of the cooling water in the hybrid system water circulation passage without the second control being executed, the cooling water flowing into the hybrid system water circulation passage from the engine water circulation passage through the first connection water passage, can cool the first hybrid system component. Thus, it can be determined accurately that the cooling water flowing into the hybrid system water circulation passage from the engine water circulation passage through the first connection water passage, can cool the first hybrid system component by determining so when the temperature of the cooling water in the engine water circulation passage without the second control being executed, is equal to or lower than the temperature of the cooling water in the hybrid system water circulation passage without the second control being executed.

According to further another aspect of the invention, the electronic control unit (90) may be configured to uses the temperature (TWdev or TWbat) of the cooling water which cooled the first hybrid system component (180 or 120) without the second control being executed, as the temperature of the cooling water in the hybrid system water circulation passage (50) without the second being executed.

When the temperature of the cooling water in the engine water circulation passage without the second control being executed, is equal to or lower than the temperature of the cooling water which cooled the first hybrid system component without the second control being executed, the first hybrid system component can be cooled by the cooling water flowing into the hybrid system water circulation passage from the engine water circulation passage through the first connection water passage. Thus, it can be determined accurately that the cooling water flowing into the hybrid system water circulation passage from the engine water circulation passage through the first connection water passage, can cool the first hybrid system component by determining so when the temperature of the cooling water in the engine water circulation passage without the second control being executed, is equal to or lower than the temperature of the cooling water which cooled the first hybrid system component without the second control being executed.

According to further another aspect of the invention, the electronic control unit (90) may be configured to determine that the cooling water flowing into the hybrid system water circulation passage (50) from the engine water circulation passage (20) through the first connection water passage (65*a*), can cool the first hybrid system component (180 or 120) when the temperature (TWeng) of the cooling water in the engine water circulation passage (20) without the second control being executed, is equal to or lower than a permitted upper limit (Tdev_upper or Tbat_upper) of the temperature (Tdev or Tbat) of the first hybrid system component (180 or 120).

When the temperature of the cooling water in the engine water circulation passage without the second control being executed, is equal to or lower than the permitted upper limit of the temperature of the first hybrid system component, the first hybrid system component can be cooled by the cooling water flowing into the hybrid system water circulation passage from the engine water circulation passage through the first connection water passage. Thus, it can be determined accurately that the cooling water flowing into the hybrid system water circulation passage from the engine water circulation passage through the first connection water passage, can cool the first hybrid system component by determining so when the temperature of the cooling water in the engine water circulation passage without the second control being executed, is equal to or lower than the permitted upper limit of the temperature of the first hybrid system component.

According to further another aspect of the invention, the electronic control unit (90) may be configured to determine that the cooling water flowing into the hybrid system water circulation passage (50) from the engine water circulation passage (20) through the first connection water passage (65*a*), can cool the first hybrid system component (180 or 120) when an amount (Htotal) of heat generated by the first hybrid system component (180 or 120) and the second hybrid system component (120 or 180) is larger than a maximum amount (Hmax) of the heat discharged by the hybrid system radiator (43).

When the amount the heat generated by the first and second hybrid system components is larger than the maximum amount of the heat discharged by the hybrid system radiator, the temperatures of the first and second hybrid system components may not be maintained within appropriate temperature ranges, respectively by cooling the cooling water for cooling the first and second hybrid system components only by the hybrid system radiator. At this time, if the cooling water is supplied to the hybrid system water circulation passage from the engine water circulation passage through the first connection water passage, the cooling water flowing into the hybrid system water circulation passage from the engine water circulation passage through the first connection water passage, can cool the first hybrid system component, and the temperatures of the first and second hybrid system components may be maintained within the appropriate temperature ranges, respectively. Thus, it can be determined accurately that the cooling water flowing into the hybrid system water circulation passage from the engine water circulation passage through the first connection water passage, can cool the first hybrid system component by determining so when the amount of the heat generated by the first and second hybrid system components is larger than the maximum amount of the heat discharged by the hybrid system radiator.

According to further another aspect of the invention, the electronic control unit (90) may be configured to determine that the engine cooling process is not requested when an operation of the internal combustion engine (110) is stopped.

When the operation of the internal combustion engine is stopped, the temperature of the cooling water in the engine water circulation passage may be low. Thus, it can be determined accurately that the engine cooling process is not requested by determining so when the operation of the internal combustion engine is stopped.

According to further another aspect of the invention, the electronic control unit (90) may be configured to determine that the engine cooling process is requested when the internal combustion engine (110) is operated, and a temperature (Teng) of the internal combustion engine (110) is equal to or higher than an engine warmed temperature (Teng_lower), at which the internal combustion engine (110) becomes warmed completely.

According to further another aspect of the invention, the electronic control unit (90) may be configured to determine that the first hybrid system cooling process is requested when the first hybrid system component (180 or 120) is activated, and a temperature (Tdev or Tbat) of the first hybrid system component (180 or 120) is equal to or higher than a first hybrid system component warmed temperature (Tdev_lower or Tbat_lower), at which the first hybrid system component (180 or 120) becomes warmed completely.

According to further another aspect of the invention, the electronic control unit (90) may be configured to determine that the second hybrid system cooling process is requested when the second hybrid system component (120 or 180) is activated, and a temperature (Tbat or Tdev) of the second hybrid system component (120 or 180) is equal to or higher than a second hybrid system component warmed temperature (Tbat_lower or Tdev_lower), at which the second hybrid system component (120 or 180) becomes warmed completely.

According to further another aspect of the invention, the first hybrid system component (180) may include the electric motor (111, 122). In this case, the second hybrid system component (120) may include the battery (120). On the other hand, the first hybrid system component (120) may include the battery (120). In this case, the second hybrid system component (180) may include the electric motor (111, 112).

In the above description, for facilitating understanding of the present invention, elements of the present invention corresponding to elements of an embodiment described later are denoted by reference symbols used in the description of the embodiment accompanied with parentheses. However, the elements of the present invention are not limited to the elements of the embodiment defined by the reference symbols. The other objects, features and accompanied advantages of the present invention can be easily understood from the description of the embodiment of the present invention along with the drawings.

BRIEF DESCRIPTION OF THE DRAWINGS

FIG. 13 is a view similar to FIG. 2 and which shows the flow of the cooling water.

FIG. 23 is a view similar to FIG. 22 and which shows the flow of the cooling water.

FIG. 24 is a view similar to FIG. 22 and which shows the flow of the cooling water.

FIG. 25 is a view similar to FIG. 22 and which shows the flow of the cooling water and the flow of the cooling medium.

FIG. 27 is a view similar to FIG. 22 and which shows the flow of the cooling water.

FIG. 33A is a view for showing the flow of the cooling water when a fourth hybrid system flow rate control valve shown in FIG. 29 is set at a first position.

FIG. 33B is a view for showing the flow of the cooling water when the fourth hybrid system flow rate control valve shown in FIG. 29 is set at a second position.

FIG. 33C is a view for showing the flow of the cooling water when the fourth hybrid system flow rate control valve shown in FIG. 29 is set at a third position.

FIG. 33D is a view for showing the flow of the cooling water when the fourth hybrid system flow rate control valve shown in FIG. 29 is set at a fourth position.

FIG. 48 is a view for showing a cooling apparatus of the vehicle driving system according to further another modified example of the embodiment.

FIG. 49 is a view similar to FIG. 48 and which shows the flow of the cooling water and the flow of the cooling medium.

FIG. 51 is a view similar to FIG. 48 and which shows the flow of the cooling water and the flow of the cooling medium.

FIG. 52 is a view similar to FIG. 48 and which shows the flow of the cooling water and the flow of the cooling medium.

DESCRIPTION OF THE PREFERRED EMBODIMENTS

Figure 1:
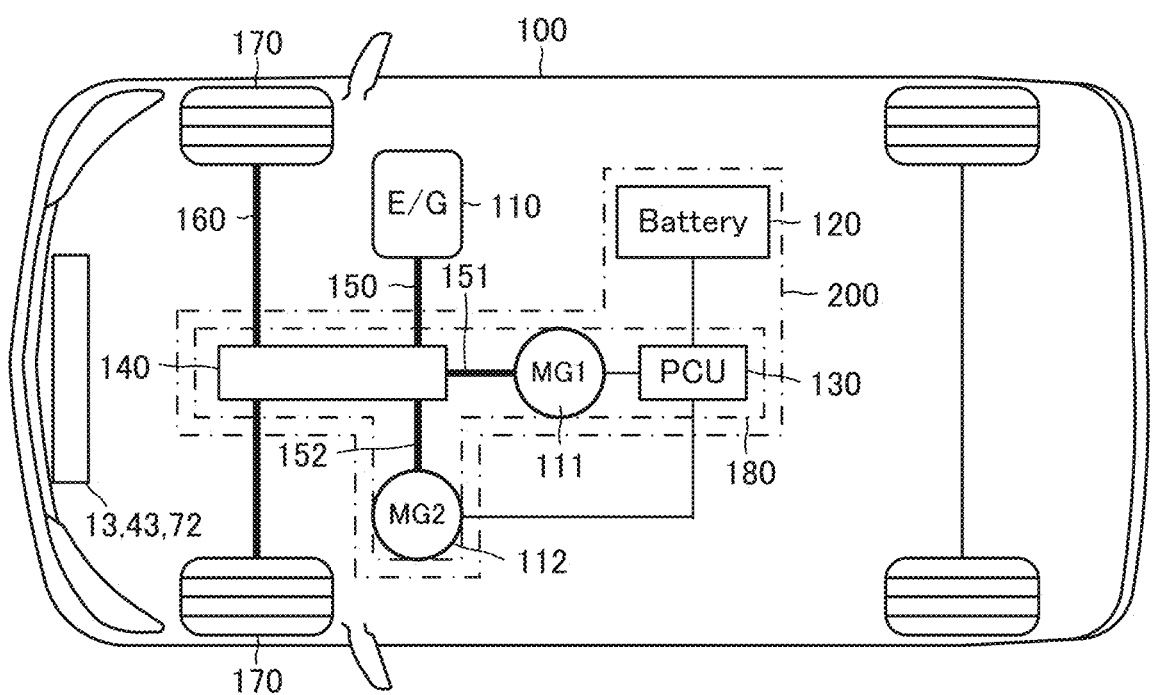
FIG. 1 is a view for showing a vehicle, to which a cooling apparatus of a vehicle driving system according to an embodiment of the invention.

Below, a cooling apparatus of a vehicle driving system according to an embodiment of the invention will be described with reference to the drawings. The cooling apparatus according to the embodiment is applied to a vehicle 100 shown in FIG. 1. An internal combustion engine 110, a rechargeable battery 120, and a hybrid device 180 are mounted on the vehicle 100 as a vehicle driving system 200 for supplying driving force to the vehicle 100 to drive the vehicle 100. Hereinafter, the cooling apparatus according to the embodiment will be referred to as "the embodiment apparatus".

The hybrid device 180 includes a first motor generator 111, a second motor generator 112, a power control unit 130, a power distribution mechanism 140, etc. as hybrid system components, respectively. The power control unit 130 includes an inverter 131 (see FIG. 2), a boost converter, a DC/DC converter, etc. Hereinafter, the power control unit 130 will be referred to as "the PCU 130".

The vehicle 100 is a so-called hybrid vehicle which is driven by power output from the engine 110, the first motor generator 111, and the second motor generator 112. The vehicle 100, to which the embodiment apparatus is applied, may be a so-called plug-in hybrid vehicle in which the battery 120 can be charged by an outside electric power source. Further, the vehicle 100, to which the embodiment apparatus is applied, may be a hybrid vehicle which includes one motor generator as the hybrid device 180 and is driven by the output power from the motor generator and the engine 110. Further, the vehicle 100, to which the embodiment apparatus is applied, may be a hybrid vehicle which includes one motor generator, is driven by the output power from the motor generator and the engine 110, and uses the power output from the engine 110 for generating the electric power by an electric generator provided independently.

The power distribution mechanism 140 is, for example, a planetary gear mechanism. The power distribution mechanism 140 distributes a torque input to the power distribution mechanism 140 from the engine 110 via an output shaft 150 into a torque for rotating an output shaft of the power distribution mechanism 140 and a torque for driving the first motor generator 111 as an electric generator at a predetermined distribution proportion (i.e., with a predetermined distribution property).

The power distribution mechanism 140 transmits the torque input to the power distribution mechanism 140 from the engine 110 via the output shaft 150 and a torque input to the power distribution mechanism 140 from the second motor generator 112 to right and left driving wheels 170 via a wheel drive shaft 160. The power distribution mechanism 140 is known, for example, in JP 2013-177026 A, etc.

The first and second motor generators 111 and 112 are permanent magnet synchronous motors, respectively. The first and second motor generators 111 and 112 are electrically connected to the battery 120 via the inverter 131 of the PCU 130.

The first motor generator 111 is operatively connected to the power distribution mechanism 140 via an input/output shaft 151. The first motor generator 111 is mainly used as an electric generator. When the first motor generator 111 is used as the electric generator, a rotation shaft of the first motor generator 111 is rotated by external forces such as a moving energy of the vehicle 100 and the torque output from the engine 110, thereby generating electric power. The generated electric power is charged in the battery 120 via the inverter 131 of the PCU 130. The first motor generator 111 is also used as an electric motor. When the first motor generator 111 is used as the electric motor, the first motor generator 111 is driven by the electric power supplied thereto from the battery 120 via the inverter 131 of the PCU 130.

The second motor generator 112 is operatively connected to the power distribution mechanism 140 via an input/output shaft 152. The second motor generator 112 is mainly used as an electric motor. When the second motor generator 112 is used as the electric motor, the second motor generator 112 is driven by the electric power supplied thereto from the battery 120 via the inverter 131 of the PCU 130. The second motor generator 112 is also used as an electric generator. When the second motor generator 112 is used as the electric generator, a rotation shaft of the second motor generator 112 is rotated by the external forces such as the moving energy of the vehicle 100 and the torque output from the engine 110, thereby generating the electric power. The generated electric power is charged in the battery 120 via the inverter 131 of the PCU 130.

Figure 2:
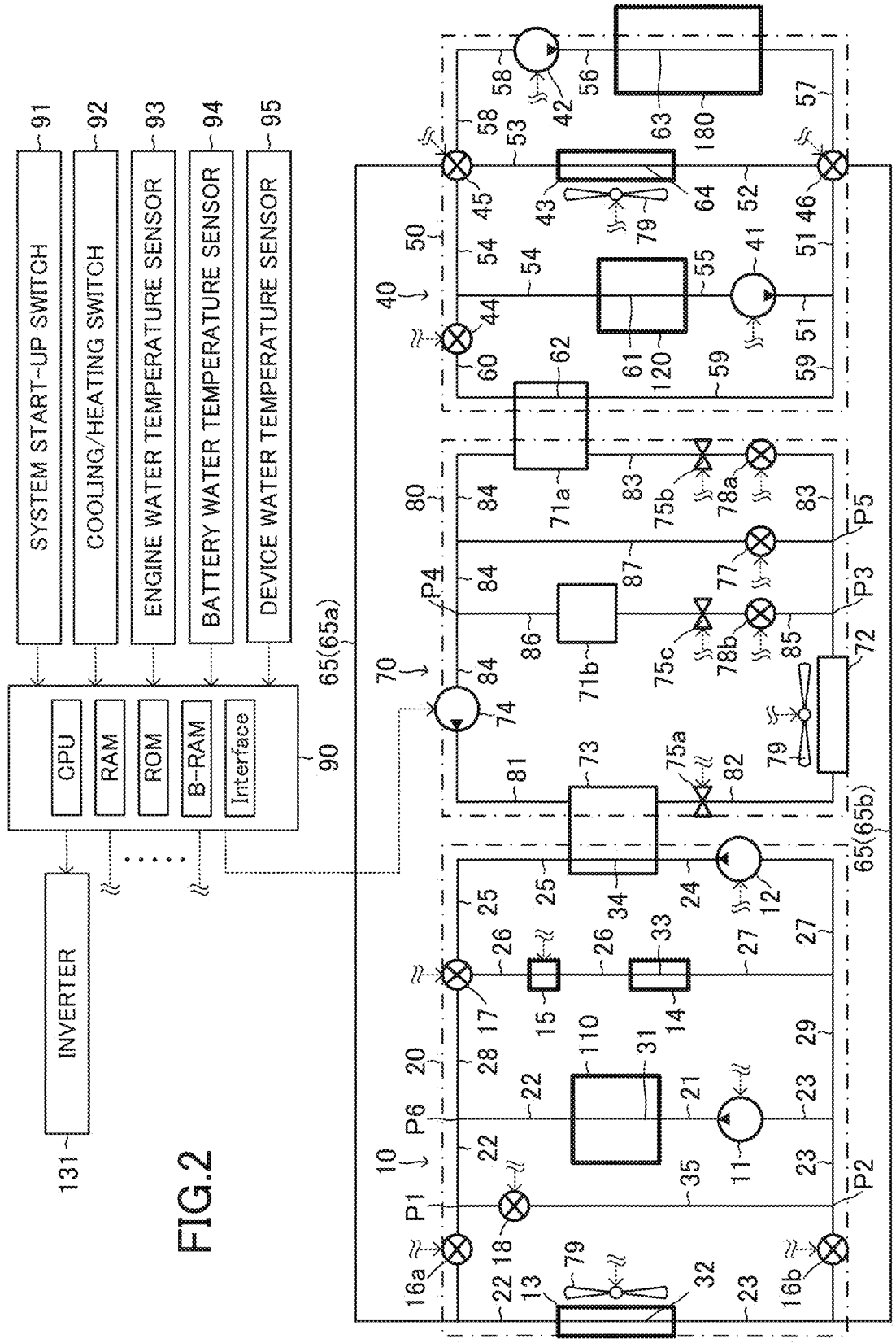
FIG. 2 is a view for showing the cooling system of the vehicle driving system according to the embodiment.

As shown in FIG. 2, the inverter 131 is electrically connected to an ECU 90. The ECU 90 is an electronic control unit which is an electronic control circuit including as a main component a microcomputer including a CPU, a ROM, a RAM, a back-up RAM, an interface, etc. The CPU realizes various functions described later by executing instructions or routines stored in a memory, i.e., the ROM.

An activation of the inverter 131 is controlled by the ECU 90. The ECU 90 controls activations of the first and second motor generators 111 and 112 by controlling the activation of the inverter 131.

The embodiment apparatus includes an engine system temperature control apparatus 10, a hybrid system temperature control apparatus 40, a heat pump 70, and a heat exchanging fan 79.

<Engine System Temperature Control Apparatus>

The engine system temperature control apparatus 10 includes an engine pump 11, a heating pump 12, an engine radiator 13, a heater core 14, an electric heater 15, a first engine water passage shut-off valve 16a, a second engine water passage shut-off valve 16b, an engine flow rate control valve 17, an engine bypass valve 18, and an engine water circulation passage 20.

Below, the embodiment apparatus will be described, using cooling water as liquid which flows in the engine water circulation passage 20 and a hybrid system water circulation passage 50 described later. The liquid which flows in the engine water circulation passage 20 and the hybrid system water circulation passage 50 may be liquid capable of exchanging heat, that is, heat exchanging liquid.

Figure 3A:
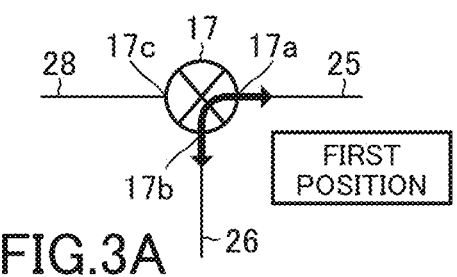
FIG. 3A is a view for showing a flow of cooling water when an engine flow rate control valve is set at a first position.

As shown in FIG. 3A, the engine flow rate control valve 17 includes a first engine port 17a, a second engine port 17b, and a third engine port 17c.

As shown in FIG. 2, the engine water circulation passage 20 is formed by first to ninth engine water passages 21 to 29, an engine internal water passage 31, an engine radiator water passage 32, a core water passage 33, a condenser water passage 34, an engine bypass water passage 35, an internal water passage (not shown) of the engine pump 11, an internal water passage (not shown) of the heating pump 12, and an internal water passage (not shown) of the engine flow rate control valve 17.

The engine internal water passage 31 is a passage for the cooling water and is formed in the engine 110. The engine radiator water passage 32 is a passage for the cooling water and is formed in the engine radiator 13. The core water passage 33 is a passage for the cooling water and is formed in the heater core 14. The condenser water passage 34 is a passage for the cooling water and is formed in a condenser 73 of the heat pump 70 described later in detail.

The first engine water passage 21 is a passage for the cooling water and fluidically connects a cooling water discharging opening of the engine pump 11 to an inlet of the engine internal water passage 31. The second engine water passage 22 is a passage for the cooling water and fluidically connects an outlet of the engine internal water passage 31 to an inlet of the engine radiator water passage 32. The third engine water passage 23 is a passage for the cooling water and fluidically connects an outlet of the engine radiator water passage 32 to a cooling water suctioning opening of the engine pump 11. The fourth engine water passage 24 is a passage for the cooling water and fluidically connects a cooling water discharging opening of the heating pump 12 to an end of the condenser water passage 34.

The engine bypass water passage 35 is a passage for the cooling water and fluidically connects the second engine water passage 22 to the third engine water passage 23.

The fifth engine water passage 25 is a passage for the cooling water and fluidically connects the other end of the condenser water passage 34 to the first engine port 17a of the engine flow rate control valve 17. The sixth engine water passage 26 is a passage for the cooling water and fluidically connects the second engine port 17b of the engine flow rate control valve 17 to an inlet of the core water passage 33. The seventh engine water passage 27 is a passage for the cooling water and fluidically connects an outlet of the core water passage 33 to a cooling water suctioning opening of the heating pump 12.

The eighth engine water passage 28 is a passage for the cooling water. An end of the eighth engine water passage 28 is fluidically connected to the second engine water passage 22 between the outlet of the engine internal water passage 31 and a connection portion P1 of the second engine water passage 22, at which the engine bypass passage 35 is connected to the second engine water passage 22. The other end of the eighth engine water passage 28 is fluidically connected to the third engine port 17c of the engine flow rate control valve 17. The ninth engine water passage 29 is a passage for the cooling water. An end of the ninth engine water passage 29 is fluidically connected to the seventh engine water passage 27. The other end of the ninth engine water passage 29 is fluidically connected to the third engine water passage 23 between the engine pump 11 and a connection portion P2 of the third engine water passage 23, at which the engine bypass water passage 35 is connected to the third engine water passage 23.

The first engine water passage shut-off valve 16a is provided in the second engine water passage 22 between the inlet of the engine radiator water passage 32 and the connection portion P1. The first engine water passage shut-off valve 16a is electrically connected to the ECU 90. A setting position of the first engine water passage shut-off valve 16a is controlled by the ECU 90. When the first engine water passage shut-off valve 16a is set at an open position, the cooling water can flow through the first engine water passage shut-off valve 16a. On the other hand, when the first engine water passage shut-off valve 16a is set at a closed position, the cooling water cannot flow through the first engine water passage shut-off valve 16a.

The second engine water passage shut-off valve 16b is provided in the third engine water passage 23 between the outlet of the engine radiator water passage 32 and the connection portion P2. The second engine water passage shut-off valve 16b is electrically connected to the ECU 90. A setting position of the second engine water passage shut-off valve 16b is controlled by the ECU 90. When the second engine water passage shut-off valve 16b is set at an open position, the cooling water can flow through the second engine water passage shut-off valve 16b. On the other hand, when the second engine water passage shut-off valve 16b is set at a closed position, the cooling water cannot flow through the second engine water passage shut-off valve 16b.

The engine bypass valve 18 is provided in the engine bypass water passage 35. The engine bypass valve 18 is electrically connected to the ECU 90. A setting position of the engine bypass valve 18 is controlled by the ECU 90. When the engine bypass valve 18 is set at an open position, the cooling water can flow through the engine bypass valve 18. On the other hand, when the engine bypass valve 18 is set at a closed position, the cooling water cannot flow through the engine bypass valve 18.

Figure 3B:
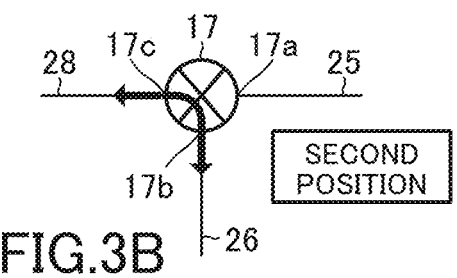
FIG. 3B is a view for showing the flow of the cooling water when the engine flow rate control valve is set at a second position.

The engine flow rate control valve 17 is electrically connected to the ECU 90. A setting position of the engine flow rate control valve 17 is controlled by the ECU 90. When the engine flow rate control valve 17 is set at a first position, the engine flow rate control valve 17 fluidically connects the fifth and sixth engine water passages 25 and 26 to each other as shown in FIG. 3A. When the engine flow rate control valve 17 is set at a second position, the engine flow rate control valve 17 fluidically connects the sixth and eighth engine water passages 26 and 28 to each other as shown in FIG. 3B.

Figure 3C:
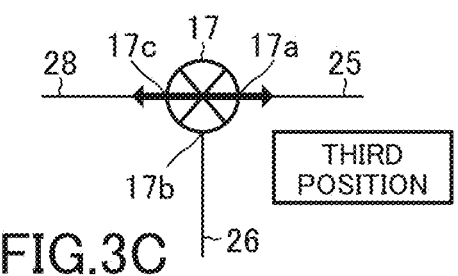
FIG. 3C is a view for showing the flow of the cooling water when the engine flow rate control valve is set at a third position.
Figure 3D:
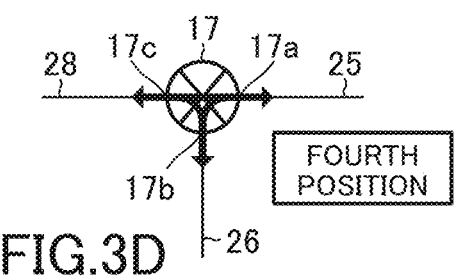
FIG. 3D is a view for showing the flow of the cooling water when the engine flow rate control valve is set at a fourth position.

When the engine flow rate control valve 17 is set at a third position, the engine flow rate control valve 17 fluidically connects the fifth and eighth engine water passages 25 and 28 to each other as shown in FIG. 3C. When the engine flow rate control valve 17 is set at a fourth position, the engine flow rate control valve 17 fluidically connects the fifth and sixth engine water passages 25 and 26 to each other, connects the fifth and eighth engine water passages 25 and 28 to each other, and connects the sixth and eighth engine water passages 26 and 28 to each other as shown in FIG. 3D. When the engine flow rate control valve 17 is set at a closed position, the cooling water cannot flow through the engine flow rate control valve 17.

As shown in FIG. 2, the electric heater 15 is provided in the sixth engine water passage 26. The electric heater 15 is electrically connected to the ECU 90. An activation of the electric heater 15 is controlled by the ECU 90. The ECU 90 sets the engine flow rate control valve 17 at the first position and activates the electric heater 15 and the heating pump 12 when a process of heating the heater core 14 is requested, and the heater core 14 cannot be heated by heat of the engine 110. Also, the ECU 90 sets the engine flow rate control valve 17 at the first position and activates the electric heater 15 and the heating pump 12 when the process of heating the heater core 14 is requested, and the heater core 14 cannot be heated by the heat pump 70. In these cases, the heater core 14 is heated by the cooling water heated by the electric heater 15.

The engine pump 11 is electrically connected to the ECU 90. An activation of the engine pump 11 is controlled by the ECU 90. The heating pump 12 is electrically connected to the ECU 90. An activation of the heating pump 12 is controlled by the ECU 90.

The heat exchanging fan 79 is provided near the engine radiator 13, a hybrid system radiator 43, and an outside air heat exchanger 72 to supply the outside air to the engine radiator 13, the hybrid system radiator 43, and the outside air heat exchanger 72 when the heat exchanging fan 79 is activated. The heat exchanging fan 79 is electrically connected to the ECU 90. An activation of the heat exchanging fan 79 is controlled by the ECU 90. In the drawings, the heat exchanging fan 79 is shown near the engine radiator 13, the hybrid system radiator 43, and the outside air heat exchanger 72, respectively. However, the heat exchanging fan 79 is common to the engine radiator 13, the hybrid system radiator 43, and the outside air heat exchanger 72.

<Hybrid System Temperature Control Apparatus>

The hybrid system temperature control apparatus 40 includes a battery pump 41, a device pump 42, the hybrid system radiator 43, a hybrid system water passage shut-off valve 44, a first hybrid system flow rate control valve 45, a second hybrid system flow rate control valve 46, the hybrid system water circulation passage 50, and a connection device 65.

Figure 4A:
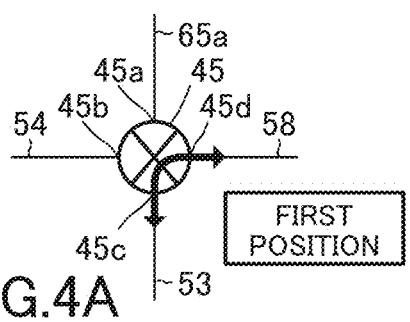
FIG. 4A is a view for showing the flow of the cooling water when a first hybrid system flow rate control valve is set at a first position.
Figure 5A:
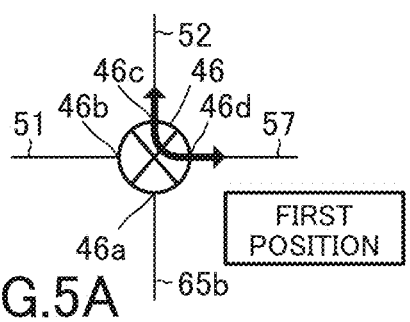
FIG. 5A is a view for showing the flow of the cooling water when a second hybrid system flow rate control valve is set at a first position.

As shown in FIG. 4A, the first hybrid system flow rate control valve 45 includes a first hybrid system port 45a, a second hybrid system port 45b, a third hybrid system port 45c, and a fourth hybrid system port 45d. As shown in FIG. 5A, the second hybrid system flow rate control valve 46 includes a first hybrid system port 46a, a second hybrid system port 46b, a third hybrid system port 46c, and a fourth hybrid system port 46d.

As shown in FIG. 2, the hybrid system water circulation passage 50 is formed by first to tenth hybrid system water passages 51 to 60, a battery water passage 61, an evaporator water passage 62, a device water passage 63, a hybrid system radiator water passage 64, an internal water passage (not shown) of the battery pump 41, an internal water passage (not shown) of the device pump 42, an internal water passage (not shown) of the first hybrid system flow rate control valve 45, and an internal water passage (not shown) of the second hybrid system flow rate control valve 46.

The battery water passage 61 is a passage for the cooling water and is formed in the battery 120. The evaporator water passage 62 is a passage for the cooling water and is formed in a first evaporator 71a of the heat pump 70. The device water passage 63 is a passage for the cooling water and is formed in the hybrid device 180. The hybrid system radiator water passage 64 is a passage for the cooling water and is formed in the hybrid system radiator 43.

The first hybrid system water passage 51 is a passage for the cooling water and fluidically connects a cooling water discharging opening of the battery pump 41 to the second hybrid system port 46b of the second hybrid system flow rate control valve 46. The second hybrid system water passage 52 is a passage for the cooling water and fluidically connects the third hybrid system port 46c of the second hybrid system flow rate control valve 46 to an inlet of the hybrid system radiator water passage 64. The third hybrid system water passage 53 is a passage for the cooling water and fluidically connects an outlet of the hybrid system radiator water passage 64 to the third hybrid system port 45*c* of the first hybrid system flow rate control valve 45. The fourth hybrid system water passage 54 is a passage for the cooling water and fluidically connects the second hybrid system port 45*b* of the first hybrid system flow rate control valve 45 to an inlet of the battery water passage 61. The fifth hybrid system water passage 55 is a passage for the cooling water and fluidically connects an outlet of the battery water passage 61 to a cooling water suctioning opening of the battery pump 41.

The sixth hybrid system water passage 56 is a passage for the cooling water and fluidically connects a cooling water discharging opening of the device pump 42 to an inlet of the device water passage 63. The seventh hybrid system water passage 57 is a passage for the cooling water and fluidically connects an outlet of the device water passage 63 to the fourth hybrid system port 46*d* of the second hybrid system flow rate control valve 46. The eighth hybrid system water passage 58 is a passage for the cooling water and fluidically connects the fourth hybrid system port 45*d* of the first hybrid system flow rate control valve 45 to a cooling water suctioning opening of the device pump 42. The ninth hybrid system water passage 59 is a passage for the cooling water and fluidically connects the first hybrid system water passage 51 to an inlet of the evaporator water passage 62. The tenth hybrid system water passage 60 is a passage for the cooling water and fluidically connects an outlet of the evaporator water passage 62 to the fourth hybrid system water passage 54.

The connection device 65 includes a first connection water passage 65*a* and a second connection water passage 65*b*. The first connection water passage 65*a* is a passage for the cooling water and fluidically connects the second engine water passage 22 between the inlet of the engine radiator water passage 32 and the first engine water passage shut-off valve 16*a* to the first hybrid system port 45*a* of the first hybrid system flow rate control valve 45. The second connection water passage 65*b* is a passage for the cooling water and fluidically connects the first hybrid system port 46*a* of the second hybrid system flow rate control valve 46 to the third engine water passage 23 between the outlet of the engine radiator water passage 32 and the second engine water passage shut-off valve 16*b*.

The hybrid system water passage shut-off valve 44 is provided in the tenth hybrid system water passage 60. The hybrid system water passage shut-off valve 44 is electrically connected to the ECU 90. A setting position of the hybrid system water passage shut-off valve 44 is controlled by the ECU 90. When the hybrid system water passage shut-off valve 44 is set at an open position, the cooling water can flow through the hybrid system water passage shut-off valve 44. On the other hand, when the hybrid system water passage shut-off valve 44 is set at a closed position, the cooling water cannot flow through the hybrid system water passage shut-off valve 44.

The first hybrid system flow rate control valve 45 is electrically connected to the ECU 90. A setting position of the first hybrid system flow rate control valve 45 is controlled by the ECU 90. When the first hybrid system flow rate control valve 45 is set at a first position, the first hybrid system flow rate control valve 45 fluidically connects the third and eighth hybrid system water passages 53 and 58 to each other as shown in FIG. 4A. When the first hybrid system flow rate control valve 45 is set at a second position, the first hybrid system flow rate control valve 45 fluidically connects the third and fourth hybrid system water passages 53 and 54 to each other as shown in FIG. 4B. When the first hybrid system flow rate control valve 45 is set at a third position, the first hybrid system flow rate control valve 45 fluidically connects the third and fourth hybrid system water passages 53 and 54 to each other, connects the third and eighth hybrid system water passages 53 and 58 to each other, and connects the fourth and eighth hybrid system water passages 54 and 58 to each other as shown in FIG. 4C.

Figure 4D:
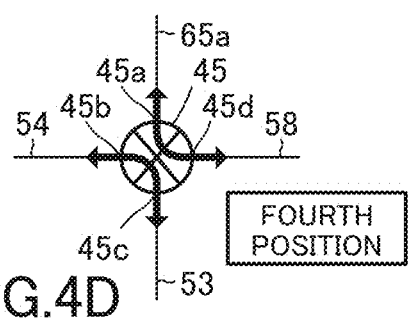
FIG. 4D is a view for showing the flow of the cooling water when the first hybrid system flow rate control valve is set at a fourth position.
Figure 4B:
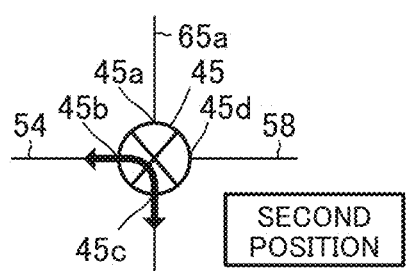
FIG. 4B is a view for showing the flow of the cooling water when the first hybrid system flow rate control valve is set at a second position.
Figure 4E:
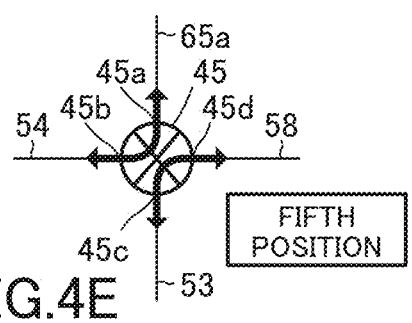
FIG. 4E is a view for showing the flow of the cooling water when the first hybrid system flow rate control valve is set at a fifth position.
Figure 4C:
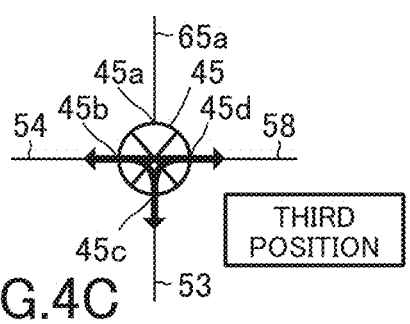
FIG. 4C is a view for showing the flow of the cooling water when the first hybrid system flow rate control valve is set at a third position.

When the first hybrid system flow rate control valve 45 is set at a fourth position, the first hybrid system flow rate control valve 45 fluidically connects the first connection water passage 65*a* and the eighth hybrid system water passage 58 to each other and connects the third and fourth hybrid system water passages 53 and 54 to each other as shown in FIG. 4D. When the first hybrid system flow rate control valve 45 is set at a fifth position, the first hybrid system flow rate control valve 45 fluidically connects the first connection water passage 65*a* and the fourth hybrid system water passage 54 to each other and connects the third and eighth hybrid system water passages 53 and 58 to each other as shown in FIG. 4E. When the first hybrid system flow rate control valve 45 is set at a closed position, the cooling water cannot flow through the first hybrid system flow rate control valve 45.

The second hybrid system flow rate control valve 46 is electrically connected to the ECU 90. A setting position of the second hybrid system flow rate control valve 46 is controlled by the ECU 90. When the second hybrid system flow rate control valve 46 is set at a first position, the second hybrid system flow rate control valve 46 fluidically connects the second and seventh hybrid system water passages 52 and 57 to each other as shown in FIG. 5A. When the second hybrid system flow rate control valve 46 is set at a second position, the second hybrid system flow rate control valve 46 fluidically connects the first and second hybrid system water passages 51 and 52 to each other as shown in FIG. 5B. When the second hybrid system flow rate control valve 46 is set at a third position, the second hybrid system flow rate control valve 46 fluidically connects the first and second hybrid system water passages 51 and 52 to each other, connects the first and seventh hybrid system water passages 51 and 57, and connects the second and seventh hybrid system water passages 52 and 57 to each other as shown in FIG. 4C.

Figure 5D:
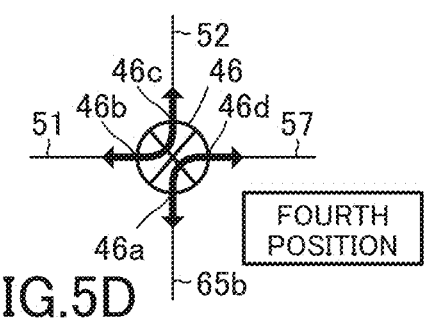
FIG. 5D is a view for showing the flow of the cooling water when the second hybrid system flow rate control valve is set at a fourth position.
Figure 5B:
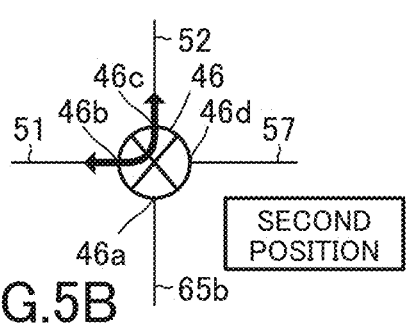
FIG. 5B is a view for showing the flow of the cooling water when the second hybrid system flow rate control valve is set at a second position.
Figure 5E:
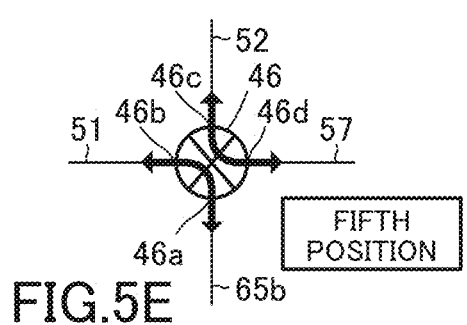
FIG. 5E is a view for showing the flow of the cooling water when the second hybrid system flow rate control valve is set at a fifth position.
Figure 5C:
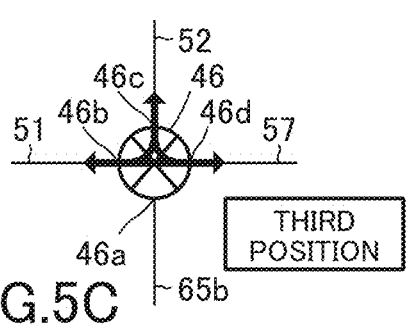
FIG. 5C is a view for showing the flow of the cooling water when the second hybrid system flow rate control valve is set at a third position.

When the second hybrid system flow rate control valve 46 is set at a fourth position, the second hybrid system flow rate control valve 46 fluidically connects the second connection water passage 65*b* and the seventh hybrid system water passage 57 to each other and connects the first and second hybrid system water passages 51 and 52 to each other as shown in FIG. 5D. When the second hybrid system flow rate control valve 46 is set at a fifth position, the second hybrid system flow rate control valve 46 fluidically connects the second connection water passage 65*b* and the first hybrid system water passage 51 to each other and connects the second and seventh hybrid system water passages 52 and 57 to each other as shown in FIG. 4E. When the second hybrid system flow rate control valve 46 is set at a closed position, the cooling water cannot flow through the second hybrid system flow rate control valve 46.

As shown in FIG. 2, the battery pump 41 is electrically connected to the ECU 90. An activation of the battery pump 41 is controlled by the ECU 90. The device pump 42 is electrically connected to the ECU 90. An activation of the device pump 42 is controlled by the ECU 90.

<Heat Pump>

The heat pump 70 includes the first evaporator 71a, a second evaporator 71b, the outside air heat exchanger 72, the condenser 73, a compressor 74, a first expansion valve 75a, a second expansion valve 75b, a third expansion valve 75c, a heat pump bypass valve 77, a first cooling medium passage shut-off valve 78a, a second cooling medium passage shut-off valve 78b, and a cooling medium circulation passage 80.

The cooling medium circulation passage 80 is formed by an internal passage (not shown) of the first evaporator 71a, an internal passage (not shown) of the second evaporator 71b, an internal passage (not shown) of the outside air heat exchanger 72, an internal passage (not shown) of the condenser 73, first to sixth cooling medium passages 81 to 86, and a bypass passage 87.

The first cooling medium passage 81 is a passage for cooling medium and fluidically connects a cooling medium discharging opening of the compressor 74 to a cooling medium inlet of the condenser 73. The second cooling medium passage 82 is a passage for the cooling medium and fluidically connects a cooling medium outlet of the condenser 73 to a cooling medium inlet of the outside air heat exchanger 72. The third cooling medium passage 83 is a passage for the cooling medium and fluidically connects a cooling medium outlet of the outside air heat exchanger 72 to a cooling medium inlet of the first evaporator 71a. The fourth cooling medium passage 84 is a passage for the cooling medium and fluidically connects a cooling medium outlet of the first evaporator 71a to a cooling medium suctioning opening of the compressor 74. The fifth cooling medium passage 85 is a passage for the cooling medium and fluidically connects the third cooling medium passage 83 to a cooling medium inlet of the second evaporator 71b. The sixth cooling medium passage 86 is a passage for the cooling medium and fluidically connects a cooling medium outlet of the second evaporator 71b to the fourth cooling medium passage 84. The bypass passage 87 is a passage for the cooling medium and fluidically connects a portion of the third cooling medium passage 83 between the cooling medium inlet of the first evaporator 71a and a connection portion P3 of the third cooling medium passage 83, to a portion of the fourth cooling medium passage 84 between the cooling medium outlet of the first evaporator 71a and a connection portion P4 of the fourth cooling medium passage 84. At the connection portion P3, the fifth cooling medium passage 85 is fluidically connected to the third cooling medium passage 83. At the connection portion P4, the sixth cooling medium passage 86 is fluidically connected to the fourth cooling medium passage 84.

The first expansion valve 75a is provided in the second cooling medium passage 82. The first expansion valve 75a is electrically connected to the ECU 90. An activation of the first expansion valve 75a is controlled by the ECU 90. When the first expansion valve 75a is set at a decompression position, a pressure of the cooling medium decreases while the cooling medium flows through the first expansion valve 75a. As a result, the cooling medium is likely to evaporate. On the other hand, when the first expansion valve 75a is set at a non-decompression position, the pressure of the cooling medium does not change even when the cooling medium flows through the first expansion valve 75a.

The second expansion valve 75b is provided in the third cooling medium passage 83 between the cooling medium inlet of the first evaporator 71a and a connection portion P5, at which the bypass passage 87 is fluidically connected to the third cooling medium passage 83. The second expansion valve 75b is electrically connected to the ECU 90. An activation of the second expansion valve 75b is controlled by the ECU 90. When the second expansion valve 75b is set at a decompression position, the pressure of the cooling medium decreases while the cooling medium flows through the second expansion valve 75b. As a result, the cooling medium is likely to evaporate. On the other hand, when the second expansion valve 75b is set at a non-decompression position, the pressure of the cooling medium does not change even when the cooling medium flows through the second expansion valve 75b.

The third expansion valve 75c is provided in the fifth cooling medium passage 85. The third expansion valve 75c is electrically connected to the ECU 90. An activation of the third expansion valve 75c is controlled by the ECU 90. When the third expansion valve 75c is set at a decompression position, the pressure of the cooling medium decreases while the cooling medium flows through the third expansion valve 75c. As a result, the cooling medium is likely to evaporate. On the other hand, when the third expansion valve 75c is set at a non-decompression position, the pressure of the cooling medium does not change even when the cooling medium flows through the third expansion valve 75c.

The first cooling medium passage shut-off valve 78a is provided in the third cooling medium passage 83 between the second expansion valve 75b and the connection portion P5. The first cooling medium passage shut-off valve 78a is electrically connected to the ECU 90. An activation of the first cooling medium passage shut-off valve 78a is controlled by the ECU 90. When the first cooling medium passage shut-off valve 78a is set at an open position, the cooling medium can flow through the first cooling medium passage shut-off valve 78a. On the other hand, when the first cooling medium passage shut-off valve 78a is set at a closed position, the cooling medium cannot flow through the first cooling medium passage shut-off valve 78a.

The second cooling medium passage shut-off valve 78b is provided in the fifth cooling medium passage 85 between the third expansion valve 75c and the connection portion P3. The second cooling medium passage shut-off valve 78b is electrically connected to the ECU 90. An activation of the second cooling medium passage shut-off valve 78b is controlled by the ECU 90. When the second cooling medium passage shut-off valve 78b is set at an open position, the cooling medium can flow through the second cooling medium passage shut-off valve 78b. On the other hand, when the second cooling medium passage shut-off valve 78b is set at a closed position, the cooling medium cannot flow through the second cooling medium passage shut-off valve 78b.

The heat pump bypass valve 77 is provided in the bypass passage 87. The heat pump bypass valve 77 is electrically connected to the ECU 90. A setting position of the heat pump bypass valve 77 is controlled by the ECU 90. When the heat pump bypass valve 77 is set at an open position, the cooling medium can flow through the heat pump bypass valve 77. On the other hand, when the heat pump bypass valve 77 is set at a closed position, the cooling medium cannot flow through the heat pump bypass valve 77.

The compressor 74 is electrically connected to the ECU 90. An activation of the compressor 74 is controlled by the ECU 90.

<System Start-Up Switch>

A system start-up switch 91 is a switch which is operated by a driver of the vehicle 100. The system start-up switch 91 is electrically connected to the ECU 90. When the system start-up switch 91 is set at an ON position by the driver, the ECU 90 enters into a ready state to operate the engine 110 and/or activate the first motor generator 111 and/or the second motor generator 112, depending on output power PDreq requested to be supplied to the driving wheels 170 via the wheel drive shaft 160. On the other hand, when the system start-up switch 91 is set at an OFF position by the driver, the ECU 90 stops operating the engine 110 and activating the first and second motor generators 111 and 112.

<Cooling/Heating Switch>

A cooling/heating switch 92 is a switch which is operated by the driver of the vehicle 100. The cooling/heating switch 92 is electrically connected to the ECU 90. When the cooling/heating switch 92 is set at a cooling position by the driver while the system start-up switch 91 is set at the ON position, the ECU 90 determines that a process of cooling an interior of the vehicle 100 is requested. On the other hand, when the cooling/heating switch 92 is set at a heating position by the driver while the system start-up switch 91 is set at the ON position, the ECU 90 determines that a process of heating the interior of the vehicle 100 is requested. When the cooling/heating switch 92 is set at an OFF position by the driver while the system start-up switch 91 is set at the ON position, the ECU 90 determines that the processes of cooling and heating the interior of the vehicle 100 are not requested. In addition, when the system start-up switch 91 is set at the OFF position while the cooling/heating switch 92 is set at the cooling or heating position, the ECU 90 determines that the processes of cooling and heating the interior of the vehicle 100 are not requested.

When the process of cooling the interior of the vehicle 100 is requested by the driver of the vehicle 100, the embodiment apparatus activates a fan (not shown) provided near the second evaporator 71b, thereby, supplying the outside air to the second evaporator 71b to supply the air cooled by the second evaporator 71b to the interior of the vehicle 100. Thereby, the interior of the vehicle 100 is cooled.

When the process of heating the interior of the vehicle 100 is requested by the driver of the vehicle 100, the embodiment apparatus activates a fan (not shown) provided near the heater core 14, thereby, supplying the outside air to the heater core 14 to supply the air heated by the cooling water flowing through the core water passage 33 to the interior of the vehicle 100. Thereby, the interior of the vehicle 100 is heated.

<Sensors>

An engine water temperature sensor 93 is provided at the second engine water passage 22 between the outlet of the engine internal water passage 31 and a connection portion P6 of the second engine water passage 22, at which the eighth engine water passage 28 is fluidically connected to the second engine water passage 22. The engine water temperature sensor 93 is electrically connected to the ECU 90. The engine water temperature sensor 93 detects a temperature of the cooling water flowing out of the engine internal water passage 31 and outputs a signal representing the detected temperature to the ECU 90. The ECU 90 acquires the temperature of the cooling water flowing out of the engine internal water passage 31 as an engine water temperature TWeng on the basis of the signal output from the engine water temperature sensor 93.

A battery water temperature sensor 94 is provided at the fifth hybrid system water passage 55. The battery water temperature sensor 94 is electrically connected to the ECU 90. The battery water temperature sensor 94 detects a temperature of the cooling water flowing out of the battery water passage 61 and outputs a signal representing the detected temperature to the ECU 90. The ECU 90 acquires the temperature of the cooling water flowing out of the battery water passage 61 as a battery water temperature TWbat on the basis of the signal output from the battery water temperature sensor 94.

A device water temperature sensor 95 is provided at the seventh hybrid system water passage 57. The device water temperature sensor 95 is electrically connected to the ECU 90. The device water temperature sensor 95 detects a temperature of the cooling water flowing out of the device water passage 63 and outputs a signal representing the detected temperature to the ECU 90. The ECU 90 acquires the temperature of the cooling water flowing out of the device water passage 63 as a device water temperature TWdev on the basis of the signal output from the device water temperature sensor 95.

<Summary of Operation of Embodiment Apparatus>

Next, a summary of an operation of the embodiment apparatus will be described.

<Operation of Engine, Etc.>

The embodiment apparatus calculates the requested driving output power PDreq to be supplied to the driving wheels 170 via the wheel drive shaft 160 as is known in the art. The embodiment apparatus calculates power to be output from the engine 110 to the power distribution mechanism 140, power to be output from the first motor generator 111 to the power distribution mechanism 140, and power to be output from the second motor generator 112 to the power distribution mechanism 140 on the basis of the requested driving output power PDreq as a target engine output power PEtgt, a target first motor generator output power PM1tgt, and a target second motor generator output power PM2tgt.

The embodiment apparatus controls an operation of the engine 110 to cause the engine 110 to output power corresponding to the target engine output power PEtgt to the power distribution mechanism 140 and controls an activation of the inverter 131 to cause the first and second motor generators 111 and 112 to output powers corresponding to the target first and second motor generator output powers PM1tgt and PM2tgt, respectively to the power distribution mechanism 140.

<Operation of Engine System Temperature Control Apparatus>

When the engine 110 operates, the engine 110 generates heat. For example, an amount of emission in exhaust gas discharged from the engine 110 is small when a temperature Teng of the engine 110 is maintained within a predetermined engine temperature range WTeng higher than zero degree Celsius.

Accordingly, the embodiment apparatus determines that a process (or a engine cooling process) of cooling the engine 110 is requested when the engine water temperature TWeng is equal to or higher than an engine warmed water temperature TWeng_dan while the engine 110 operates. On the other hand, when the engine water temperature TWeng is lower than the engine warmed water temperature TWeng_dan while the engine 110 operates, the embodiment apparatus determines that the process of cooling the engine 110 is not requested. In this embodiment, the engine warmed water temperature TWeng_dan is the engine water temperature TWeng corresponding to a lower limit temperature Teng_lower of the predetermined engine temperature range WTeng. The engine warmed water temperature TWeng_dan may be previously set on the basis of the result of the experiment, etc. Hereinafter, the temperature Teng of the engine 110 will be referred to as "the engine temperature Teng".

Also, when the engine 110 does not operate, the embodiment apparatus determines that the process of cooling the engine 110 is not requested.

As described above, the embodiment apparatus determines that the process of heating the interior of the vehicle 100 is requested when the system start-up switch 91 is set at the ON position, and the cooling/heating switch 92 is set at the heating position. In this case, the embodiment apparatus determines that a process of heating the heater core 14 is requested for increasing a temperature of the heater core 14.

<First Engine Circulation Control>

Figure 6:
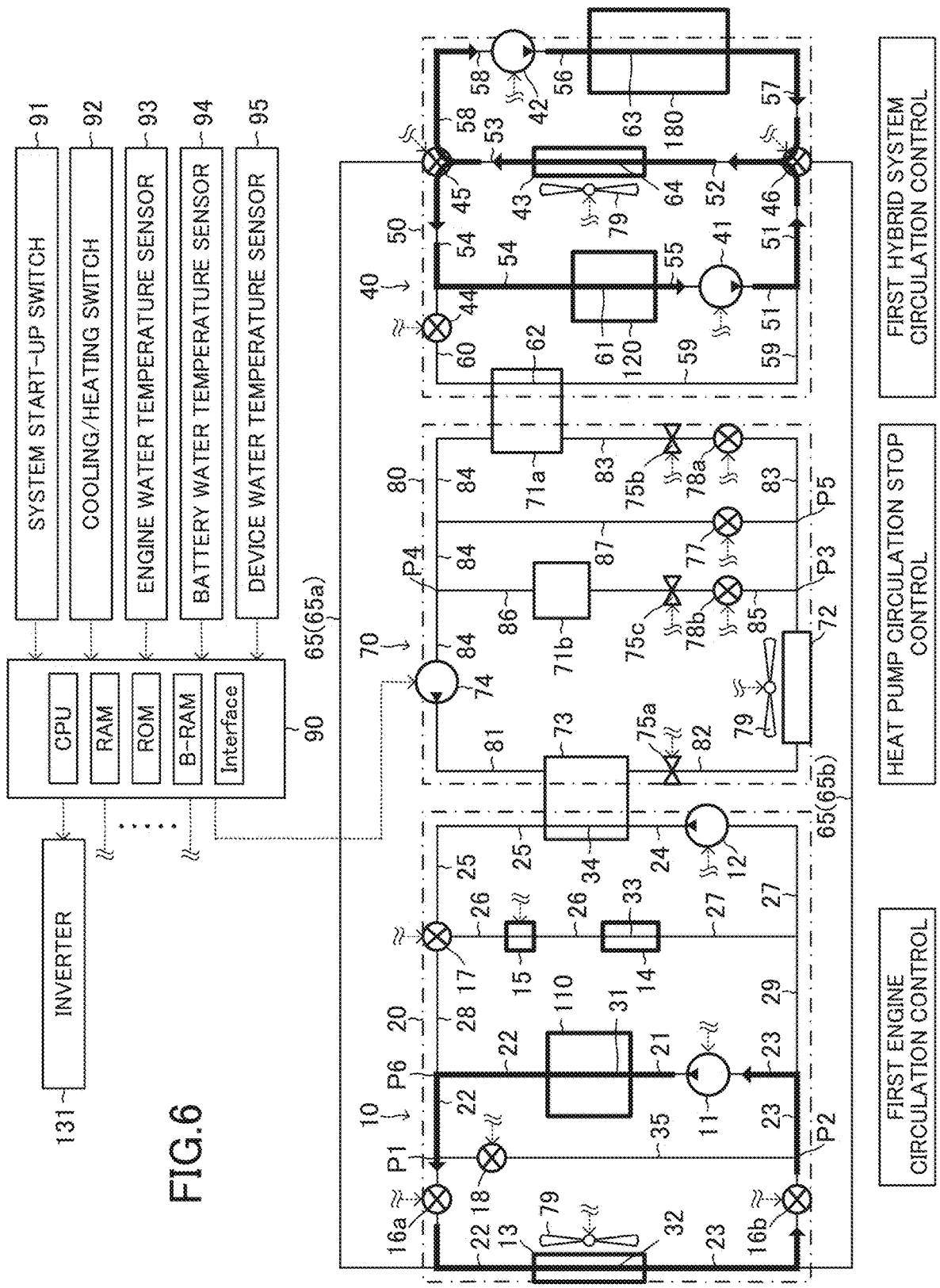
FIG. 6 is a view similar to FIG. 2 and which shows the flow of the cooling water.

When the process of cooling the engine 110 is requested, and the process of heating the heater core 14 is not requested, the embodiment apparatus executes a first engine circulation control for flowing the cooling water in the engine water circulation passage 20 as shown by arrows in FIG. 6. When the embodiment apparatus executes the first engine circulation control, the embodiment apparatus sets the engine flow rate control valve 17 at the closed position, sets the first engine water passage shut-off valve 16a at the open position, sets the second engine water passage shut-off valve 16b at the open position, sets the engine bypass valve 18 at the closed position, activates the engine pump 11, stops activating the heating pump 12, and activates the heat exchanging fan 79. As described later in detail, when the first engine circulation control is executed, the first hybrid system flow rate control valve 45 is set at any of the first, second, third, and closed positions, and the second hybrid system flow rate control valve 46 is set at any of the first, second, third, and closed positions.

When the first engine circulation control is executed, the cooling water discharged from the engine pump 11 flows into the engine internal water passage 31 through the first engine water passage 21. The cooling water flows through the engine internal water passage 31 and then, flows into the engine radiator water passage 32 through the second engine water passage 22. The cooling water flows through the engine radiator water passage 32 and then, is suctioned into the engine pump 11 through the third engine water passage 23.

In this case, the cooling water is heated while the cooling water flows through the engine internal water passage 31. The heated cooling water is cooled by the engine radiator 13 while the cooling water flows through the engine radiator water passage 32. The cooled cooling water is supplied to the engine internal water passage 31. Thereby, the engine 110 is cooled.

<Second Engine Circulation Control>

Figure 7:
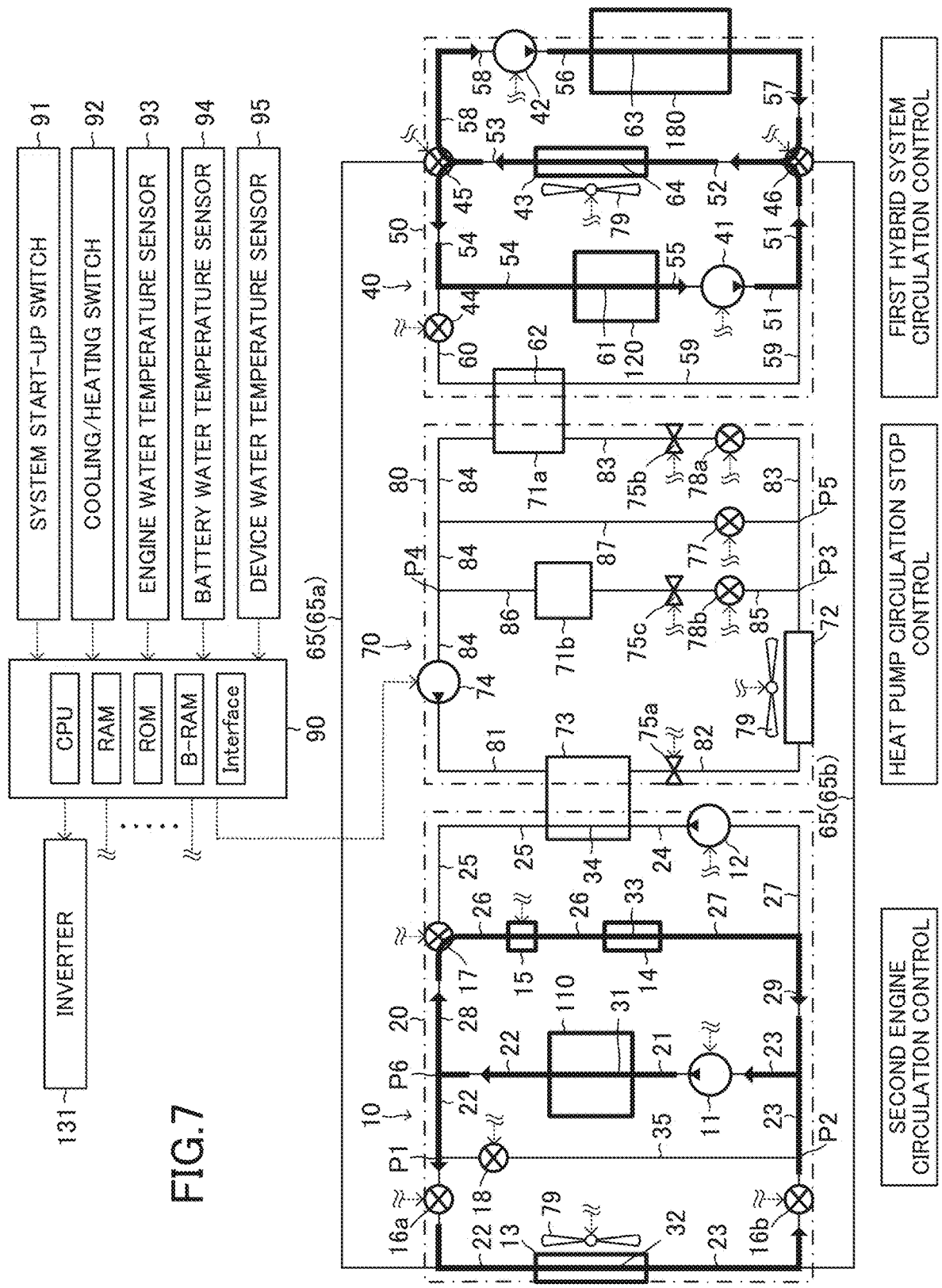
FIG. 7 is a view similar to FIG. 2 and which shows the flow of the cooling water.

When the process of cooling the engine 110 is requested, and the process of heating the heater core 14 is requested, the embodiment apparatus executes a second engine circulation control for flowing the cooling water in the engine water circulation passage 20 as shown by arrows in FIG. 7. When the embodiment apparatus executes the second engine circulation control, the embodiment apparatus sets the engine flow rate control valve 17 at the second position, sets the first engine water passage shut-off valve 16a at the open position, sets the second engine water passage shut-off valve 16b at the open position, sets the engine bypass valve 18 at the closed position, activates the engine pump 11, stops activating the heating pump 12, and activates the heat exchanging fan 79. As described later in detail, when the second engine circulation control is executed, the first hybrid system flow rate control valve 45 is set at any of the first, second, third, and closed positions, and the second hybrid system flow rate control valve 46 is set at any of the first, second, third, and closed positions.

When the second engine circulation control is executed, the cooling water discharged from the engine pump 11 flows into the engine internal water passage 31 through the first engine water passage 21. The cooling water flows through the engine internal water passage 31 and then, flows into the second engine water passage 22. A part of the cooling water flows into the engine radiator water passage 32 through the second engine water passage 22. The cooling water flows through the engine radiator water passage 32 and then, is suctioned into the engine pump 11 through the third engine water passage 23. The remaining of the cooling water flowing into the second engine water passage 22, flows into the core water passage 33 through the second engine water passage 22, the eighth engine water passage 28, the internal water passage of the engine flow rate control valve 17, and the sixth engine water passage 26. The cooling water flows through the core water passage 33 and then, is suctioned into the engine pump 11 through the seventh engine water passage 27, the ninth engine water passage 29, and the third engine water passage 23.

In this case, the part of the cooling water flowing into the second engine water passage 22 from the engine internal water passage 31 is cooled by the engine radiator 13 and supplied to the engine internal water passage 31. The remaining of the cooling water flowing into the second engine water passage 22 from the engine internal water passage 31 is supplied to the core water passage 33 directly. Therefore, the engine 110 is cooled by the cooling water cooled by the engine radiator 13, and the heater core 14 is heated by the cooling water not cooled by the engine radiator 13.

<Engine Circulation Stop Control>

When the process of cooling the engine 110 is not requested, the embodiment apparatus executes an engine circulation stop control for stopping activating the engine pump 11.

<Activations of Hybrid System Temperature Control Apparatus and Heat Pump>

When the electric power is supplied to the first or second motor generator 111 or 112 from the battery 120, the battery 120 generates heat. The battery 120 supplies the electric power efficiently when a temperature Tbat of the battery 120 is maintained within a predetermined battery temperature range WTbat higher than zero degree Celsius. Accordingly, the embodiment apparatus determines that a process (or a second hybrid system cooling process) of cooling the battery 120 is requested when the battery 120 supplies the electric power, and the battery water temperature TWbat is equal to or higher than a battery warmed water temperature TWbat_dan. In this embodiment, the battery warmed water temperature TWbat_dan is the battery water temperature TWbat when the temperature Tbat of the battery 120 corresponds to a lower limit temperature Tbat_lower of the predetermined battery temperature range WTbat. The battery warmed water temperature TWbat_dan may be previously set on the basis of a result of an experiment, etc. Hereinafter, the temperature Tbat will be referred to as "the battery temperature Tbat".

Similarly, when the hybrid device 180 operates, the hybrid device 180 generates heat. The hybrid device 180 operates optimally when a temperature Tdev of the hybrid device 180 is maintained within a predetermined device temperature range WTdev higher than zero degree Celsius. Accordingly, the embodiment apparatus determines that a process (or a second hybrid system cooling process) of cooling the hybrid device 180 is requested when the hybrid device 180 operates, and the device water temperature TWdev is equal to and higher than a device warmed water temperature TWdev_dan. In this embodiment, the device warmed water temperature TWdev_dan corresponds to the device water temperature TWdev when the temperature Tdev of the hybrid device 180 corresponds to a lower limit temperature Tdev_lower of the predetermined device temperature range WTdev. The device warmed water temperature TWdev_dan may be previously set on the basis of the result of the experiment, etc. Hereinafter, the temperature Tdev of the hybrid device 180 will be referred to as "the device temperature Tdev".

When the operation of the engine 110 (hereinafter, will be referred to as "the engine operation") is stopped, the embodiment apparatus determines that the process of cooling the engine 110 is not requested and stops activating the engine pump 11. Therefore, at this time, the engine radiator 13 is not used for cooling the cooling water for cooling the engine 110. If cooling the cooling water for cooling one of the battery 120 and the hybrid device 180 by the hybrid system radiator 43 and cooling the cooling water for cooling remaining of the battery 120 and the hybrid device 180 by the engine radiator 13 while the processes of cooling the battery 120 and cooling the hybrid device 180 are requested, a degree of cooling the cooling water for cooling the battery 120 and a degree of cooling the cooling water for cooling the hybrid device 180 increase. Thus, the battery and device temperatures Tbat and Tdev may be maintained within the predetermined battery and device temperature ranges WTbat and WTdev, respectively.

Accordingly, the embodiment apparatus determines whether a connection condition for connecting the hybrid system water circulation passage 50 to the engine water circulation passage 20 for cooling the cooling water for cooling the hybrid device 180 by the engine radiator 13 when the processes of cooling the battery 120 and cooling the hybrid device 180 are requested. The connection condition is satisfied when a connection permission condition C1 is satisfied, and at least one of a connection permission condition C2, a connection permission condition C3, and a connection request condition C4 is satisfied.

(1) The connection permission condition C1 is satisfied when the process of cooling the engine 110 is not requested.

(2) The connection permission condition C2 is satisfied when the engine water temperature TWeng is equal to or lower than the device water temperature TWdev. That is, the embodiment apparatus determines that the cooling water flowing from the engine water circulation passage 20 into the hybrid system water circulation passage 50 in the state that the engine water circulation passage 20 is fluidically connected to the hybrid system water circulation passage 50 by the connection device 65, has a cooling degree requested for cooling the hybrid device 180 as one of the hybrid system components when the engine water temperature TWeng is equal to or lower than the device water temperature TWdev.

(3) The connection permission condition C3 is satisfied when the engine water temperature TWeng is equal to or lower than a permitted upper limit Tdev_upper of the device temperature Tdev. That is, the embodiment apparatus determines that the cooling water flowing from the engine water circulation passage 20 into the hybrid system water circulation passage 50 in the state that the engine water circulation passage 20 is fluidically connected to the hybrid system water circulation passage 50 by the connection device 65, has the cooling degree requested for cooling the hybrid device 180 as one of hybrid system components when the engine water temperature TWeng is equal to or lower than the permitted upper limit Tdev_upper of the device temperature Tdev. The permitted upper limit Tdev_upper corresponds to an upper limit temperature of the predetermined device temperature range WTdev. The permitted upper limit Tdev_upper is previously set on the basis of a result of an experiment, etc. In this regard, the permitted upper limit Tdev_upper may be set to be a temperature higher than the upper limit temperature of the predetermined device temperature range WTdev and the upper limit of the device temperature Tdev capable of maintaining the hybrid device 180 at a permitted state such as a state that the hybrid device 180 is not thermally deteriorated.

(4) The connection request condition C4 is satisfied when a generated heat amount Htotal corresponding to a sum of an amount Hdev of the heat generated by the hybrid device 180 and an amount Hbat of the heat generated by the battery 120, is larger than a maximum heat amount Hmax, which the hybrid system radiator 43 can discharge. That is, the embodiment apparatus determines that the cooling water flowing from the engine water circulation passage 20 into the hybrid system water circulation passage 50 in the state that the engine water circulation passage 20 is fluidically connected to the hybrid system water circulation passage 50 by the connection device 65, has the cooling degree requested for cooling the hybrid device 180 as one of hybrid system components when the generated heat amount Htotal is larger than the maximum heat amount Hmax. In this embodiment, the generated heat amount Htotal is acquired by applying parameters such as the output power of the first motor generator 111, an amount of heat generated by the first motor generator 111, the output power of the second motor generator 112, an amount of heat generated by the second motor generator 112, and a temperature of lubrication oil for lubricating the hybrid device 180 to a look-up table. Otherwise, the generated heat amount Htotal is acquired by applying the parameters to a calculation expression for calculating the generated heat amount Htotal. Further, the maximum heat amount Hmax is acquired by applying parameters such as the speed SPD of the vehicle 100 and a temperature Ta of the outside air. to a look-up table. Otherwise, the maximum heat amount Hmax is acquired by applying the parameters to a calculation expression for calculating the maximum heat amount Hmax.

<First Hybrid System Circulation Control>

When the process of cooling the battery 120 is requested, the process of cooling the hybrid device 180 is requested, and a heat pump activation condition for activating the compressor 74 of the heat pump 70 is not satisfied, the embodiment apparatus executes a first hybrid system circulation control for flowing the cooling water in the hybrid system water circulation passage 50 as shown by arrows in FIG. 6. The heat pump activation condition is satisfied when the battery water temperature TWbat is higher than the predetermined battery water temperature TWbat_th.

When the embodiment apparatus executes the first hybrid system circulation control, the embodiment apparatus sets the first hybrid system flow rate control valve 45 at the third position, sets the second hybrid system flow rate control valve 46 at the third position, sets the hybrid system water passage shut-off valve 44 at the closed position, and activates the battery pump 41, the device pump 42, and the heat exchanging fan 79.

When the first hybrid system circulation control is executed, the cooling water discharged from the battery pump 41 flows into the hybrid system radiator water passage 64 through the first hybrid system water passage 51, the internal water passage of the second hybrid system flow rate control valve 46, and the second hybrid system water passage 52. On the other hand, the cooling water discharged from the device pump 42 flows into the device water passage 63 through the sixth hybrid system water passage 56. The cooling water flows through the device water passage 63 and then, flows into the hybrid system radiator water passage 64 through the seventh hybrid system water passage 57, the internal water passage of the second hybrid system flow rate control valve 46, and the second hybrid system water passage 52.

The cooling water flows through the hybrid system radiator water passage 64 and then, flows into the internal water passage of the first hybrid system flow rate control valve 45 through the third hybrid system water passage 53. A part of the cooling water flowing into the internal water passage of the first hybrid system flow rate control valve 45, flows into the battery water passage 61 through the fourth hybrid system water passage 54. The cooling water flows through the battery water passage 61 and then, is suctioned into the battery pump 41 through the fifth hybrid system water passage 55. The remaining of the cooling water flowing into the internal water passage of the first hybrid system flow rate control valve 45, is suctioned into the device pump 42 through the eighth hybrid system water passage 58.

When the first hybrid system circulation control is executed, the cooling water is cooled by the hybrid system radiator 43 while the cooling water flows through the hybrid system radiator water passage 64. The cooled cooling water is supplied to the battery water passage 61 and the device water passage 63. Thereby, the battery 120 and the hybrid device 180 are cooled.

<Hybrid System Connection Circulation Control>

Figure 8:
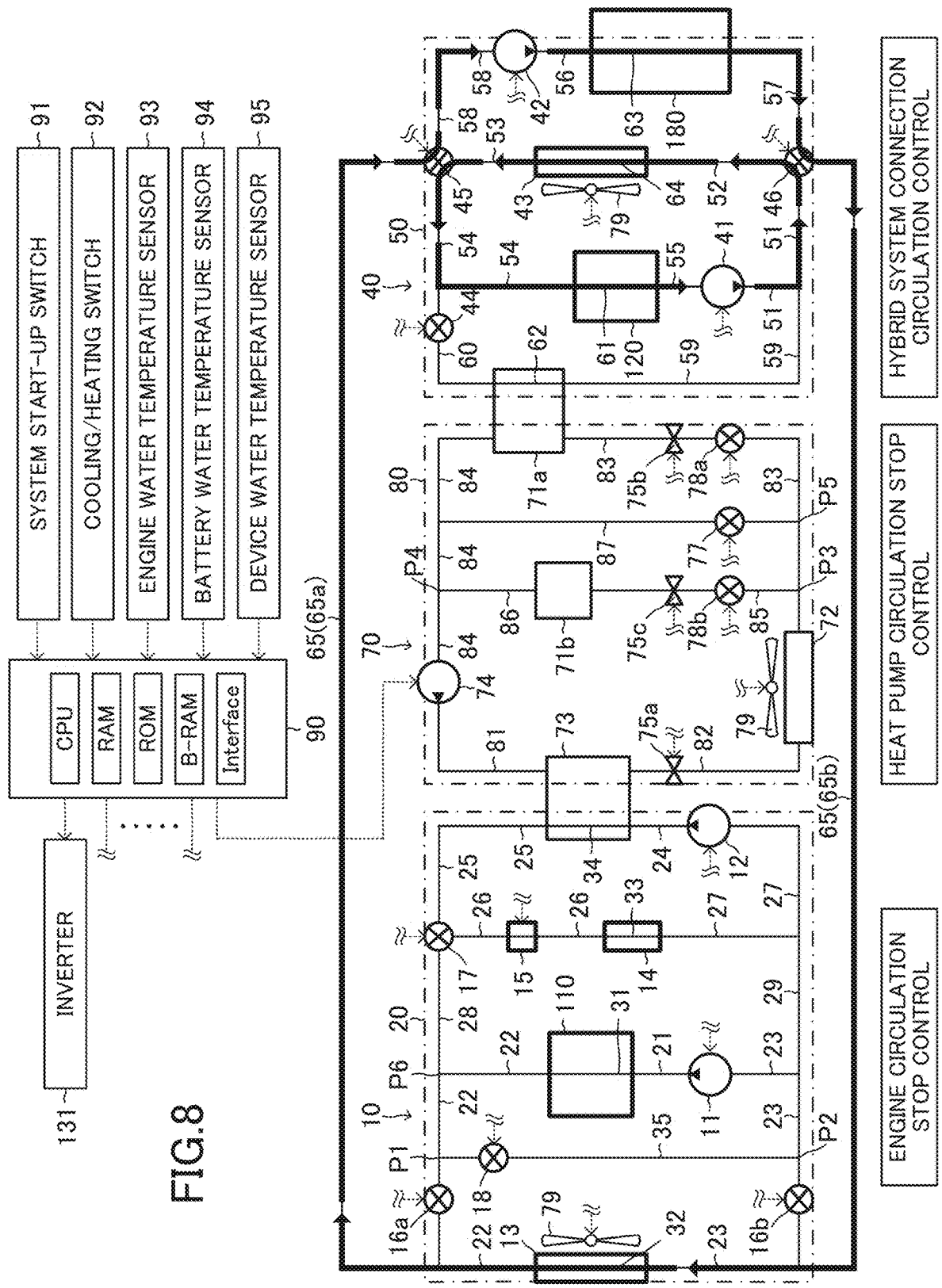
FIG. 8 is a view similar to FIG. 2 and which shows the flow of the cooling water.

On the other hand, when the process of cooling the battery 120 is requested, the process of cooling the hybrid device 180 is requested, and the connection condition is satisfied, the embodiment apparatus executes a hybrid connection circulation control for flowing the cooling water in the hybrid system water circulation passage 50, the first connection water passage 65a, the second connection water passage 65b, and the engine water circulation passage 20 as shown by arrows in FIG. 8. When the embodiment apparatus executes the hybrid system connection circulation control, the embodiment apparatus sets the first hybrid system flow rate control valve 45 at the fourth position, sets the second hybrid system flow rate control valve 46 at the fourth position, sets the hybrid system water passage shut-off valve 44 at the closed position, sets the first engine water passage shut-off valve 16a at the closed position, sets the second engine water passage shut-off valve 16b at the closed position, and activates the battery pump 41, the device pump 42, and the heat exchanging fan 79.

When the hybrid system connection control is executed, the cooling water discharged from the battery pump 41 flows into the hybrid system radiator water passage 64 through the first hybrid system water passage 51, the internal water passage of the second hybrid system flow rate control valve 46, and the second hybrid system water passage 52. The cooling water flows through the hybrid system radiator water passage 64 and then, flows into the battery water passage 61 through the third hybrid system water passage 53, the internal water passage of the first hybrid system flow rate control valve 45, and the fourth hybrid system water passage 54. The cooling water flows through the battery water passage 61 and then, is suctioned into the battery pump 41 through the fifth hybrid system water passage 55.

On the other hand, the cooling water discharged from the device pump 42 flows into the device water passage 63 through the sixth hybrid system water passage 56. The cooling water flows through the device water passage 63 and then, flows into the engine radiator water passage 32 through the seventh hybrid system water passage 57, the internal water passage of the second hybrid system flow rate control valve 46, the second connection water passage 65b, and the third engine water passage 23. The cooling water flows through the engine radiator water passage 32 and then, is suctioned into the device pump 42 through the second engine water passage 22, the first connection water passage 65a, the internal water passage of the first hybrid system flow rate control valve 45, and the eighth hybrid system water passage 58.

When the first hybrid system circulation control is executed, the cooling water supplied to the battery water passage 61 and the cooling water supplied to the device water passage 63 are cooled by the hybrid system radiator 43. On the other hand, when the hybrid system connection circulation control is executed, the cooling water supplied to the battery water passage 61 is cooled by the hybrid system radiator 43, and the cooling water supplied to the device water passage 63 is cooled by the engine radiator 13. Therefore, when the hybrid system connection circulation control is executed, the temperature of the cooling water supplied to the battery water passage 61 and the temperature of the cooling water supplied to the device water passage 63 are low, compared to when the first hybrid system circulation control is executed. Thus, the battery and device temperatures Tbat and Tdev may be maintained within the predetermined battery and device temperature ranges WTbat and WTdev, respectively. Hereinafter, the cooling water supplied to the battery water passage 61 will be referred to as "the battery cooling water", and the cooling water supplied to the device water passage 63 will be referred to as "the device cooling water".

When the process of cooling the battery 120 is not requested, and the process of cooling the hybrid device 180 is not requested, the embodiment apparatus executes a hybrid system circulation stop control for stopping activating the battery pump 41 and the device pump 42.

The summary of the operation of the embodiment apparatus has been described. The battery temperature Tbat may be maintained within the predetermined battery temperature range WTbat by executing the hybrid system connection circulation control.

<Concrete Operation of Embodiment Apparatus>

Figure 9:
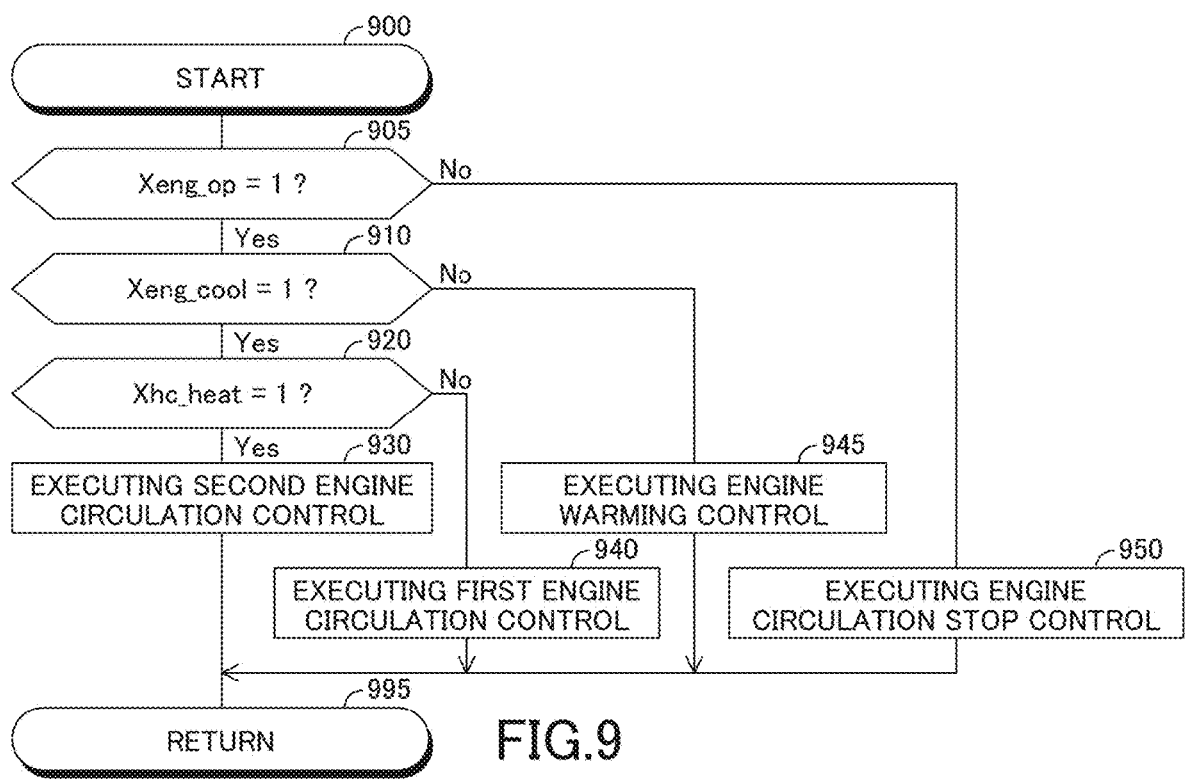
FIG. 9 is a view for showing a flowchart of a routine executed by a CPU of an ECU shown in FIG. 2.

Next, a concrete operation of the embodiment apparatus will be described. The CPU of the ECU 90 of the embodiment apparatus is configured or programmed to execute a routine shown by a flowchart in FIG. 9 each time a predetermined time elapses when the system start-up switch 91 is set at the ON position.

Therefore, at a predetermined timing, the CPU starts a process from a step 900 and then, proceeds with the process to a step 905 to determine whether a value of an engine operation flag Xeng_op is "1". The value of the engine operation flag Xeng_op is set to "1" when the engine 110 is operated. The value of the engine operation flag Xeng_op is set to "0" when the engine operation is stopped.

When the value of the engine operation flag Xeng_op is "1", the CPU determines "Yes" at the step 905 and then, proceeds with the process to a step 910 to determine whether a value of an engine cooling request flag Xeng_cool is "1".

The value of the engine cooling request flag Xeng_cool is set to "1" when the process of cooling the engine 110 is requested. On the other hand, the value of the engine cooling request flag Xeng_cool is set to "0" when the process of cooling the engine 110 is not requested.

When the value of the engine cooling request flag Xeng_cool is "1", the CPU determines "Yes" at the step 910 and then, proceeds with the process to a step 920 to determine whether a value of a core heating request flag Xhc_heat is "1". The value of the core heating request flag Xhc_heat is set to "1" when the process of heating the heater core 14 is requested. On the other hand, the value of the core heating request flag Xhc_heat is set to "0" when the process of heating the heater core 14 is not requested.

When the value of the core heating request flag Xhc_heat is "1", the CPU determines "Yes" at the step 920 and then, execute a process of a step 930 described below. Then, the CPU proceeds with the process to a step 995 to terminate this routine once.

Step 930: The CPU executes the second engine circulation control. In this case, the cooling water flows in the engine water circulation passage 20 as shown by arrows in FIG. 7.

On the other hand, when the value of the core heating request flag Xhc_heat is "0", the CPU determines "No" at the step 920 and then, executes a process of a step 940 described below. Then, the CPU proceeds with the process to the step 995 to terminate this routine once.

Step 940: The CPU executes the first engine circulation control. In this case, the cooling water flows in the engine water circulation passage 20 as shown by arrows in FIG. 6.

When the value of the engine cooling request flag Xeng_cool is "0" at a time of executing a process of the step 910, the CPU determines "No" at the step 910 and then, executes a process of a step 945 described below. Then, the CPU proceeds with the process to the step 995 to terminate this routine once.

Step 945: The CPU executes an engine warming control for increasing the engine temperature Teng to the engine warmed temperature Teng_dan. When the CPU executes the engine warming control, the CPU sets the engine flow rate control valve 17 at any of the closed and first positions, depending on whether the process of heating the heater core 14 is requested, sets the first engine water passage shut-off valve 16a at the closed position, sets the second engine water passage shut-off valve 16b at the closed position, sets the engine bypass valve 18 at the open position, and activates the engine pump 11 to flow the cooling water in the engine water circulation passage 20 as shown by arrows in FIG. 13.

When the CPU executes an engine warming control, the cooling water discharged from the engine pump 11 flows into the engine internal water passage 31 through the first engine water passage 21. The cooling water flows through the engine internal water passage 31 and then, is suctioned into the engine pump 11 through the second engine water passage 22, the engine bypass water passage 35, and the third engine water passage 23. Thereby, the cooling water is heated by the heat of the engine 110 while the cooling water flows through the engine internal water passage 31. The heated cooling water is supplied to the engine internal water passage 31 without being cooled by the engine radiator 13, etc. Thus, the engine temperature Teng can be increased promptly to the engine warmed temperature Teng_dan.

When the value of the engine operation flag Xeng_op is "0" at a time of executing a process of the step 905, the CPU determines "No" at the step 905 and then, executes a process of a step 950 described below. Then, the CPU proceeds with the process to the step 995 to terminate this routine once.

Step 950: The CPU executes the engine circulation stop control for stopping activating the engine pump 11.

Figure 10:
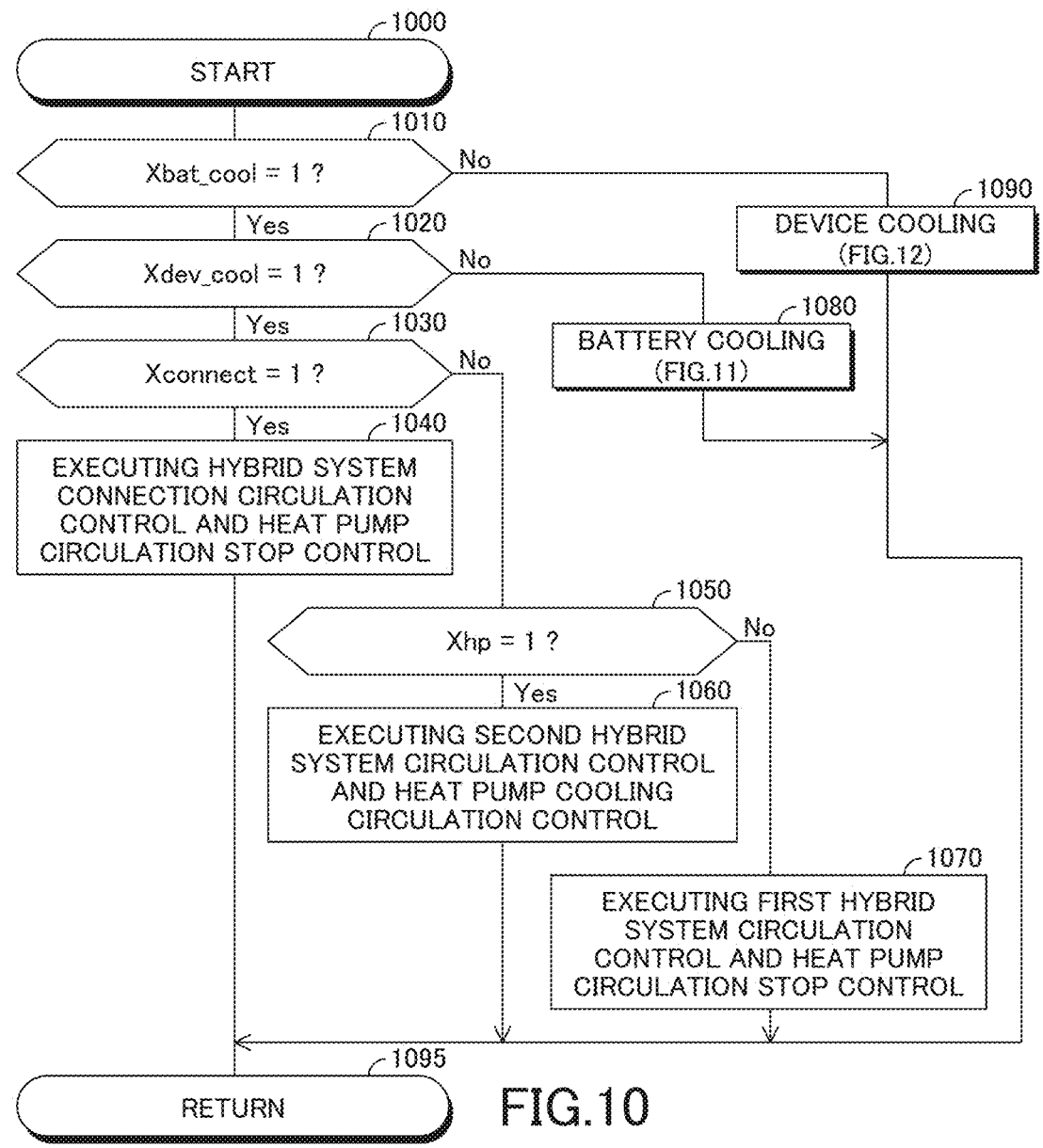
FIG. 10 is a view for showing a flowchart of a routine executed by the CPU.

Further, the CPU is configured or programmed to execute a routine shown by a flowchart in FIG. 10 each time a predetermined time elapses. Therefore, at a predetermined timing, the CPU starts a process from a step 1000 in FIG. 10 and then, proceeds with the process to a step 1010 to determine whether a value of a battery cooling request flag Xbat_cool is "1". The value of the battery cooling request flag Xbat_cool is set to "1" when the process of cooling the battery 120 is requested. On the other hand, the value of the battery cooling request flag Xbat_cool is set to "0" when the process of cooling the battery 120 is not requested.

When the value of the battery cooling request flag Xbat_cool is "1", the CPU determines "Yes" at the step 1010 and then, proceeds with the process to a step 1020 to determine whether a value of a device cooling request flag Xdev_cool is "1". The value of the device cooling request flag Xdev_cool is set to "1" when the process of cooling the hybrid device 180 is requested. On the other hand, the value of the device cooling request flag Xdev_cool is set to "0" when the process of cooling the hybrid device 180 is not requested.

When the value of the device cooling request flag Xdev_cool is "1", the CPU determines "Yes" at the step 1020 and then, proceeds with the process to a step 1030 to determine whether a value of a connection condition flag Xconnect is "1". The value of the connection condition flag Xconnect is set to "1" when the connection condition is satisfied. On the other hand, the value of the connection condition flag Xconnect is set to "0" when the connection condition is not satisfied.

When the value of the connection condition flag Xconnect is "1", the CPU determines "Yes" at the step 1030 and then, executes a process of a step 1040 described below. Then, the CPU proceeds with the process to a step 1095 to terminate this routine once.

Step 1040: The CPU executes the hybrid system connection circulation control and the heat pump circulation stop control. In this case, the cooling water flows in the hybrid system water circulation passage 50, the first connection water passage 65a, the second connection water passage 65b, and the engine water circulation passage 20 as shown by arrows in FIG. 8. In addition, a flow of the cooling medium in the cooling medium circulation passage 80 is stopped.

On the other hand, when the value of the connection condition flag Xconnect is "0", the CPU determines "No" at the step 1030 and then, proceeds with the process to a step 1050 to determine whether a value of a heat pump activation condition flag Xhp is "1". The value of the heat pump activation condition flag Xhp is set to "1" when the heat pump activation condition is satisfied. On the other hand, the value of the heat pump activation condition flag Xhp is set to "0" when the heat pump activation condition is not satisfied.

When the value of the heat pump activation condition flag Xhp is "1", the CPU determines "Yes" at the step 1050 and then, executes a process of a step 1060 described below. Then, the CPU proceeds with the process to the step 1095 to terminate this routine once.

Figure 14:
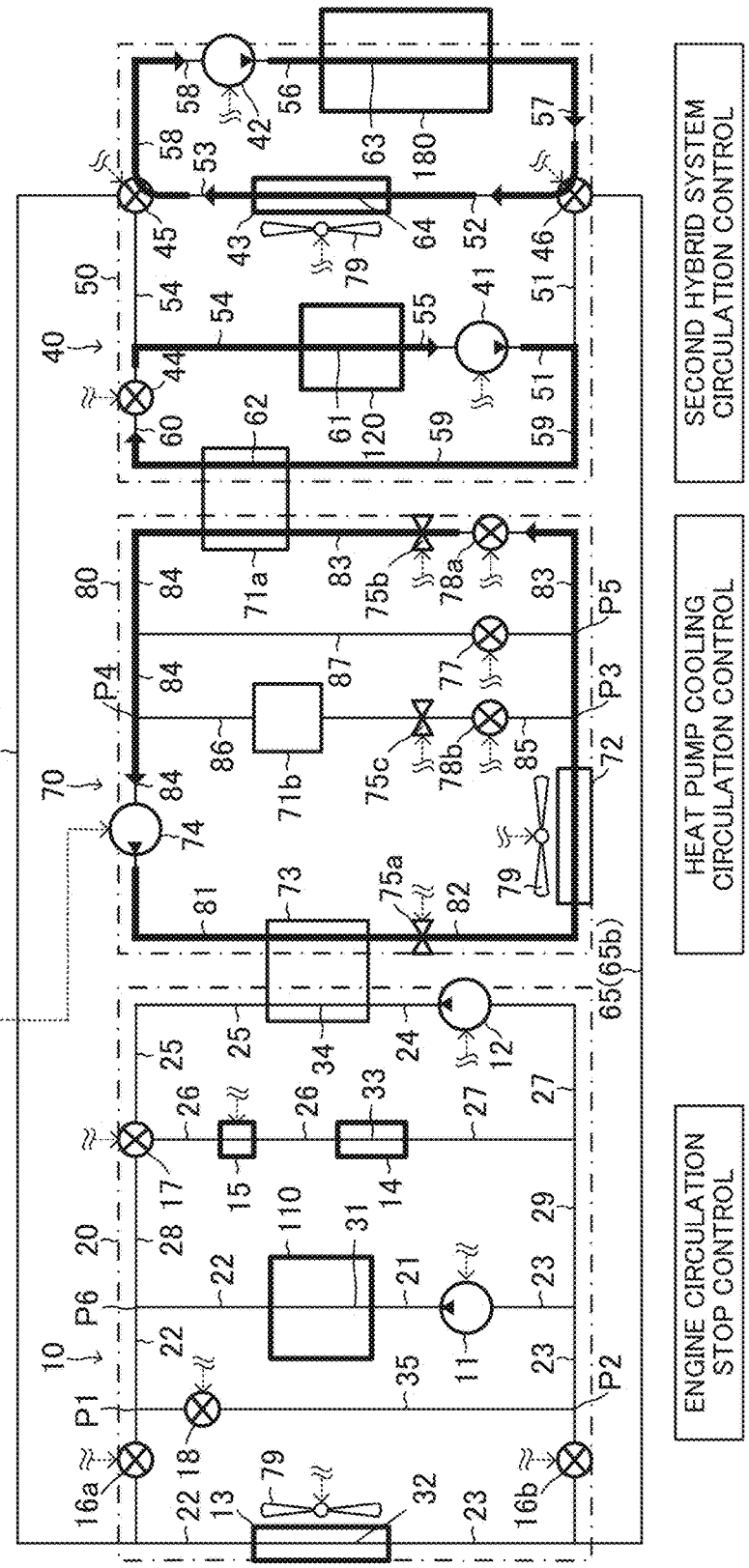
FIG. 14 is a view similar to FIG. 2 and which shows the flow of the cooling water and a flow of cooling medium.

Step 1060: The CPU executes a second hybrid system circulation control for flowing the cooling water in the hybrid system water circulation passage 50 as shown in FIG. 14 and a heat pump cooling circulation control for flowing the cooling medium in the cooling medium circulation passage 80 as shown in FIG. 14.

When the CPU executes the second hybrid system circulation control, the CPU sets the first hybrid system flow rate control valve 45 at the first position, sets the second hybrid system flow rate control valve 46 at the first position, sets the hybrid system water passage shut-off valve 44 at the open position, and activates the battery pump 41, the device pump 42, and the heat exchanging fan 79. When the CPU executes the heat pump cooling circulation control, the CPU sets the first cooling medium passage shut-off valve 78a at the open position, sets the second cooling medium passage shut-off valve 78b at the closed position, sets the heat pump bypass valve 77 at the closed position, sets the first expansion valve 75a at the non-decompression position, sets the second expansion valve 75b at the decompression position, and activates the compressor 74.

When the second hybrid system circulation control is executed, the cooling water discharged from the device pump 42 flows into the device water passage 63 through the sixth hybrid system water passage 56. The cooling water flows through the device water passage 63 and then, flows into the hybrid system radiator water passage 64 through the seventh hybrid system water passage 57, the internal water passage of the second hybrid system flow rate control valve 46 and the second hybrid system water passage 52. The cooling water flows through the hybrid system radiator water passage 64 and then, is suctioned into the device pump 42 through the third hybrid system water passage 53, the internal water passage of the first hybrid system flow rate control valve 45, and the eighth hybrid system water passage 58.

The cooling water is cooled by the hybrid system radiator 43 while the cooling water flows through the hybrid system radiator water passage 64. The cooled cooling water is supplied to the device water passage 63. The hybrid device 180 is cooled by the supplied cooling water.

On the other hand, the cooling water discharged from the battery pump 41 flows into the evaporator water passage 62 through the first hybrid system water passage 51 and the ninth hybrid system water passage 59. The cooling water flows through the evaporator water passage 62 and then, flows into the battery water passage 61 through the tenth hybrid system water passage 60 and the fourth hybrid system water passage 54. The cooling water flows through the battery water passage 61 and then, is suctioned into the battery pump 41 through the fifth hybrid system water passage 55.

The cooling medium discharged from the compressor 74 flows into the condenser 73 through the first cooling medium passage 81. The cooling medium flows through the condenser 73 and then, flows into the outside air heat exchanger 72 through the second cooling medium passage 82. The cooling medium flows through the outside air heat exchanger 72 and then, flows into the first evaporator 71a through the third cooling medium passage 83. The cooling medium flows through the first evaporator 71a and then, is suctioned into the compressor 74 through the fourth cooling medium passage 84.

When the heat pump cooling circulation control is executed, the first expansion valve 75a is set at the non-decompression position, and the second expansion valve 75b is set at the decompression position. Therefore, the cooling medium having the temperature increased by a compression by the compressor 74, discharges its heat to the outside air while the cooling medium flows through the outside air heat exchanger 72. Thereby, the temperature of the cooling medium decreases.

The cooling medium having the decreased temperature flows through the second expansion valve 75b. The pressure of the cooling medium decreases while the cooling medium flows through the second expansion valve 75b. The cooling medium having the decreased temperature and the decreased pressure, flows through the first evaporator 71a. The cooling medium receives the heat from the cooling water flowing through the evaporator water passage 62 of the hybrid system water circulation passage 50 to evaporate while the cooling medium flows through the first evaporator 71a. Thereby, the cooling water is cooled. The cooled cooling water is supplied to the battery water passage 61. The battery 120 is cooled by the supplied cooling water.

When the value of the heat pump activation condition flag Xhp is "0" at a time of executing a process of the step 1050, the CPU determines "No" at the step 1050 and then, executes a process of a step 1070 described below. Then, the CPU proceeds with the process to the step 1095 to terminate this routine once.

Step 1070: The CPU executes the first hybrid system circulation control and the heat pump circulation stop control.

Figure 11:
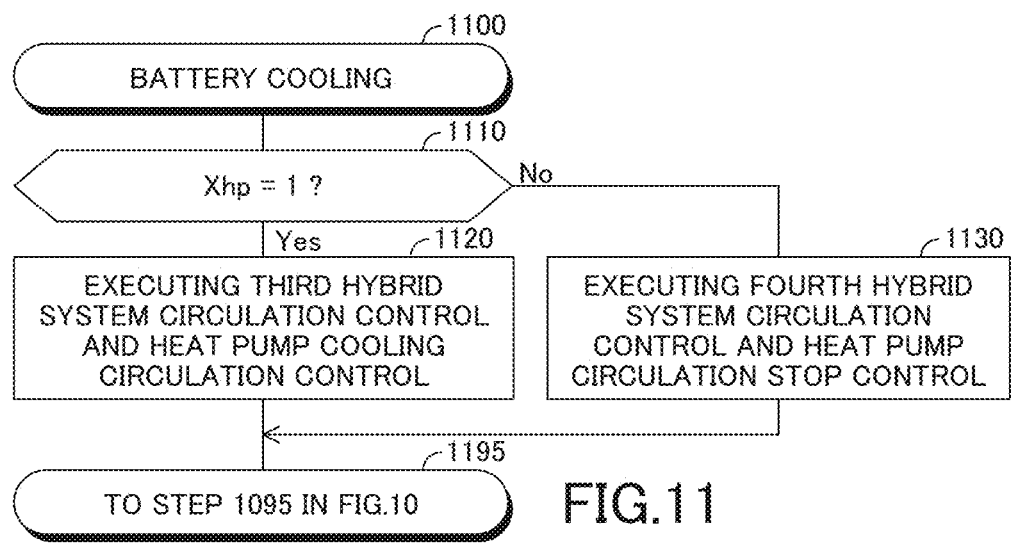
FIG. 11 is a view for showing a flowchart of a routine executed by the CPU.

When the value of the device cooling request flag Xdev_cool is "0" at a time of executing a process of the step 1020, the CPU determines "No" at the step 1020 and then, proceeds with the process to a step 1080 to execute a routine shown by a flowchart in FIG. 11.

Therefore, when the CPU proceeds with the process to the step 1080, the CPU starts a process from a step 1110 and then, proceeds with the process to a step 1110 to determine whether the value of the heat pump activation condition flag Xhp is "1".

When the value of the heat pump activation condition flag Xhp is "1", the CPU determines "Yes" at the step 1110 and then, executes a process of a step 1120 described below. Then, the CPU proceeds with the process to the step 1095 in FIG. 10 via a step 1195 to terminate this routine once.

Figure 15:
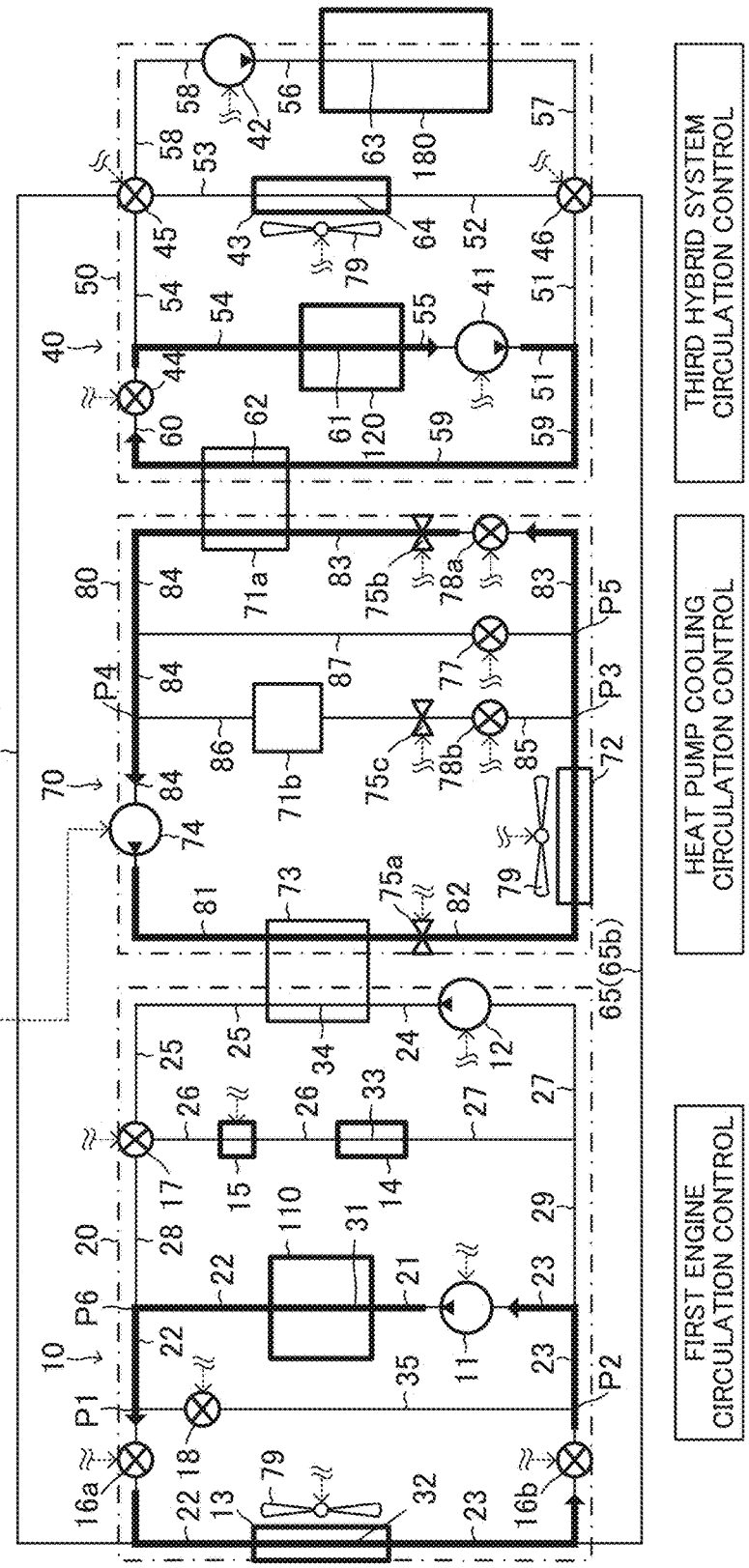
FIG. 15 is a view similar to FIG. 2 and which shows the flow of the cooling water and the flow of the cooling medium.

Step 1120: The CPU executes a third hybrid system circulation control for flowing the cooling water in the hybrid system water circulation passage 50 as shown by arrows in FIG. 15 and the heat pump cooling circulation control. When the CPU executes the third hybrid system circulation control, the CPU sets the first hybrid system flow rate control valve 45 at the closed position, sets the second hybrid system flow rate control valve 46 at the closed position, sets the hybrid system water passage shut-off valve 44 at the open position, activates the battery pump 41, stops activating the device pump 42, and activates the heat exchanging fan 79.

When the third hybrid system circulation control is executed, the cooling water discharged from the battery pump 41 flows into the evaporator water passage 62 through the first hybrid system water passage 51 and the ninth hybrid system water passage 59. The cooling water flows through the evaporator water passage 62 and then, flows into the battery water passage 61 through the tenth hybrid system water passage 60 and the fourth hybrid system water passage 54. The cooling water flows into the battery water passage 61 and then, is suctioned into the battery pump 41 through the fifth hybrid system water passage 55.

At this time, the heat pump cooling circulation control is executed. Thus, the cooling medium having the temperature increased by the compression of the compressor 74, discharges its heat to the outside air while the cooling medium flows through the outside air heat exchanger 72. Thereby, the temperature of the cooling medium decreases. The pressure of the cooling medium having the decreased temperature, decreases while the cooling medium flows through the second expansion valve 75b. The cooling medium having the decreased temperature and the decreased pressure, receives the heat from the cooling water flowing through the evaporator water passage 62 of the hybrid system water circulation passage 50 to evaporate while the cooling medium flows through the first evaporator 71a. Thereby, the cooling water is cooled. The cooled cooling water is supplied to the battery water passage 61. The battery 120 is cooled by the supplied cooling water.

On the other hand, when the value of the heat pump activation condition flag Xhp is "0" at a time of executing a process of the step 1110, the CPU determines "No" at the step 1110 and then, executes a process of a step 1130 described below. Then, the CPU proceeds with the process to the step 1095 in FIG. 10 via the step 1195 to terminate this routine once.

Figure 16:
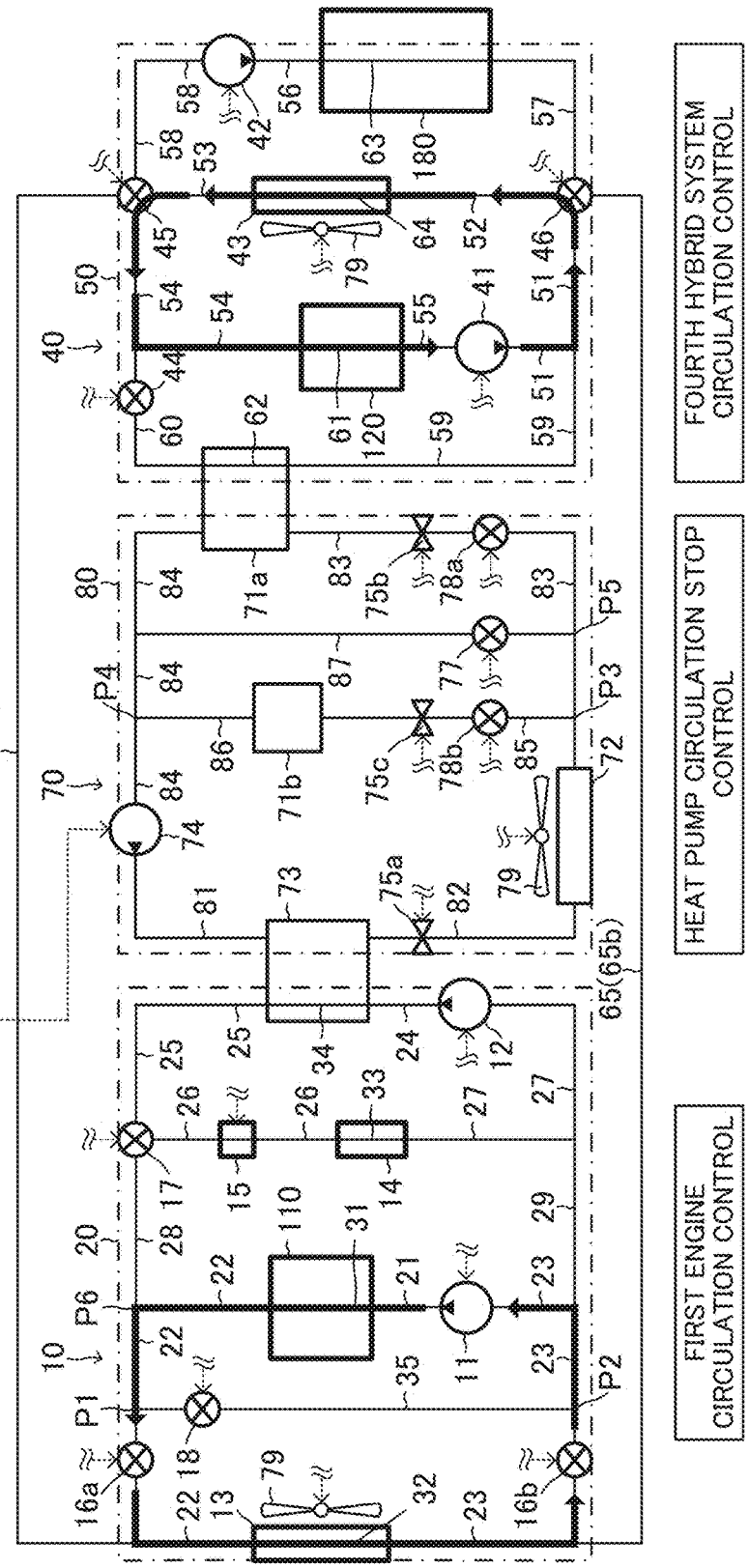
FIG. 16 is a view similar to FIG. 2 and which shows the flow of the cooling water.

Step: The CPU executes a fourth hybrid system circulation control for flowing the cooling water in the hybrid system water circulation passage 50 as shown by arrows in FIG. 16 and the heat pump circulation stop control. When the CPU executes the fourth hybrid system circulation control, the CPU sets the first hybrid system flow rate control valve 45 at the second position, sets the second hybrid system flow rate control valve 46 at the second position, sets the hybrid system water passage shut-off valve 44 at the closed position, activates the battery pump 41, stops activating the device pump 42, and activates the heat exchanging fan 79.

When the fourth hybrid system circulation control is executed, the cooling water discharged from the battery pump 41 flows into the hybrid system radiator water passage 64 through the first hybrid system water passage 51, the internal water passage of the second hybrid system flow rate control valve 46, and the second hybrid system water passage 52. The cooling water flows through the hybrid system radiator water passage 64 and then, flows into the battery water passage 61 through the third hybrid system water passage 53, the internal water passage of the first hybrid system flow rate control valve 45, and the fourth hybrid system water passage 54. The cooling water flows through the battery water passage 61 and then, is suctioned into the battery pump 41 through the fifth hybrid system water passage 55. Thereby, the cooling water cooled by the hybrid system radiator 43 is supplied to the battery water passage 61, and the battery 120 is cooled by the supplied cooling water.

Figure 12:
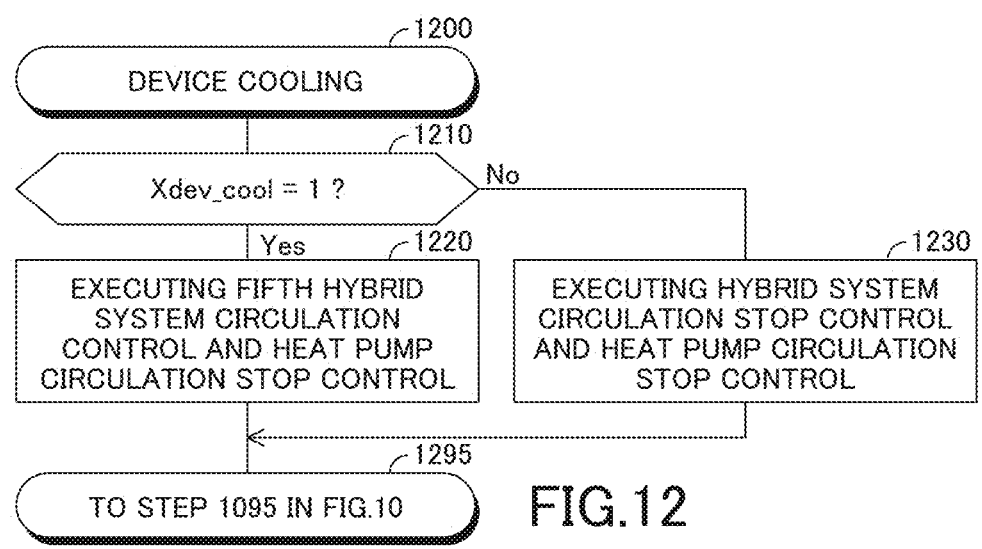
FIG. 12 is a view for showing a flowchart of a routine executed by the CPU.

When the value of the battery cooling request flag Xbat_cool is "0" at a time of executing a process of the step 1010 in FIG. 10, the CPU determines "No" at the step 1010 and then, proceeds with the process to a step 1090 to execute a routine shown by a flowchart in FIG. 12.

Therefore, when the CPU proceeds with the process to the step 1090, the CPU starts a process from a step 1200 in FIG. 12 and then, proceeds with the process to a step 1210 to determine whether the value of the device cooling request flag Xdev_cool is "1".

When the value of the device cooling request flag Xdev_cool is "1", the CPU determines "Yes" at the step 1210 and then, executes a process of a step 1220 described below. Then, the CPU proceeds with the process to the step 1095 in FIG. 10 via a step 1295 to terminate this routine once.

Figure 17:
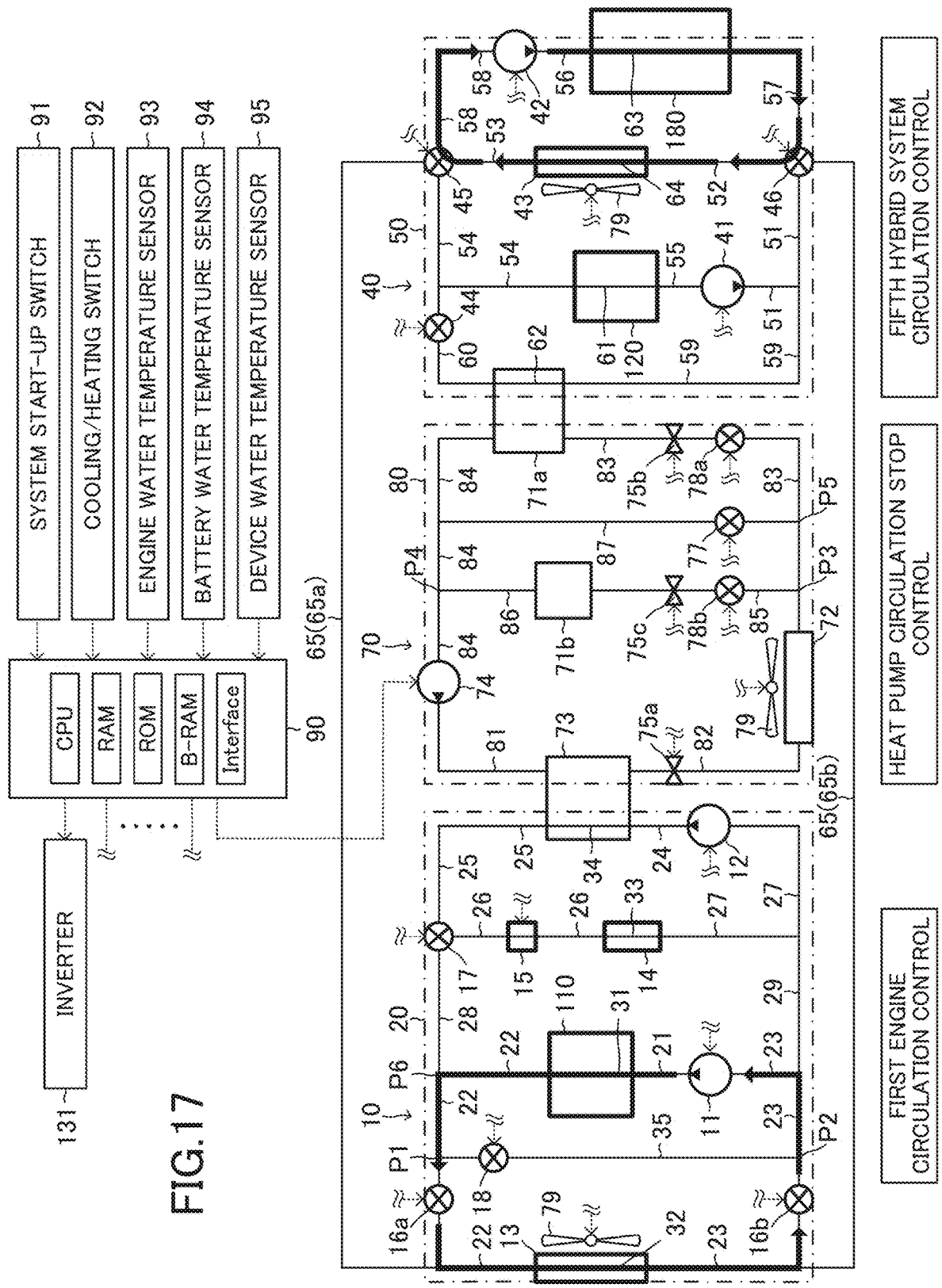
FIG. 17 is a view similar to FIG. 2 and which shows the flow of the cooling water.

Step 1220: The CPU executes a fifth hybrid system circulation control for flowing the cooling water in the hybrid system water circulation passage 50 as shown by arrows in FIG. 17 and the heat pump circulation stop control. When the CPU executes the fifth hybrid system circulation control, the CPU sets the first hybrid system flow rate control valve 45 at the first position, sets the second hybrid system flow rate control valve 46 at the first position, stops activating the battery pump 41, and activates the device pump 42 and the heat exchanging fan 79. At this time, the hybrid system water passage shut-off valve 44 may be set at any of the open and closed positions.

When the fifth hybrid system circulation control is executed, the cooling water discharged from the device pump 42 flows into the device water passage 63 through the sixth hybrid system water passage 56. The cooling water flows through the device water passage 63 and then, flows into the hybrid system radiator water passage 64 through the seventh hybrid system water passage 57, the internal water passage of the second hybrid system flow rate control valve 46, and the second hybrid system water passage 52. The cooling water flows through the hybrid system radiator water passage 64 and then, is suctioned into the device pump 42 through the third hybrid system water passage 53, the internal water passage of the first hybrid system flow rate control valve 45, and the eighth hybrid system water passage 58. Thereby, the cooling water cooled by the hybrid system radiator 43 is supplied to the device water passage 63 and the hybrid device 180 is cooled by the supplied cooling water.

On the other hand, when the value of the device cooling request flag Xdev_cool is "0", the CPU determines "No" at the step 1210 and then, executes a step 1230 described below. Then, the CPU proceeds with the process to the step 1095 in FIG. 10 via the step 1295 to terminate this routine once.

Step 1230: The CPU executes a hybrid system circulation stop control for stopping flowing the cooling water in the hybrid system water circulation passage 50 and the heat pump circulation stop control. When the CPU executes the hybrid system circulation stop control, the CPU stops activating the battery pump 41 and the device pump 42.

The concrete operation of the embodiment apparatus has been described. When the connection condition is satisfied (i.e., when the CPU determines "Yes" at the step 1030 in FIG. 10), the embodiment apparatus executes the hybrid system connection circulation control (see the process of the step 1040 in FIG. 10). Thereby, the device cooling water is cooled by the engine radiator 13, and the battery cooling water is cooled by the hybrid system radiator 43. Therefore, the device cooling water and the battery cooling water have lower temperatures, respectively, compared to when the device cooling water and the battery cooling water are cooled by the hybrid system radiator 43 only. Thus, the device and battery temperatures Tdev and Tbat may be maintained within the predetermined device and battery temperature ranges WTdev and WTbat, respectively.

<Heat Pump Interior-Cooling Circulation Control>

Figure 18:
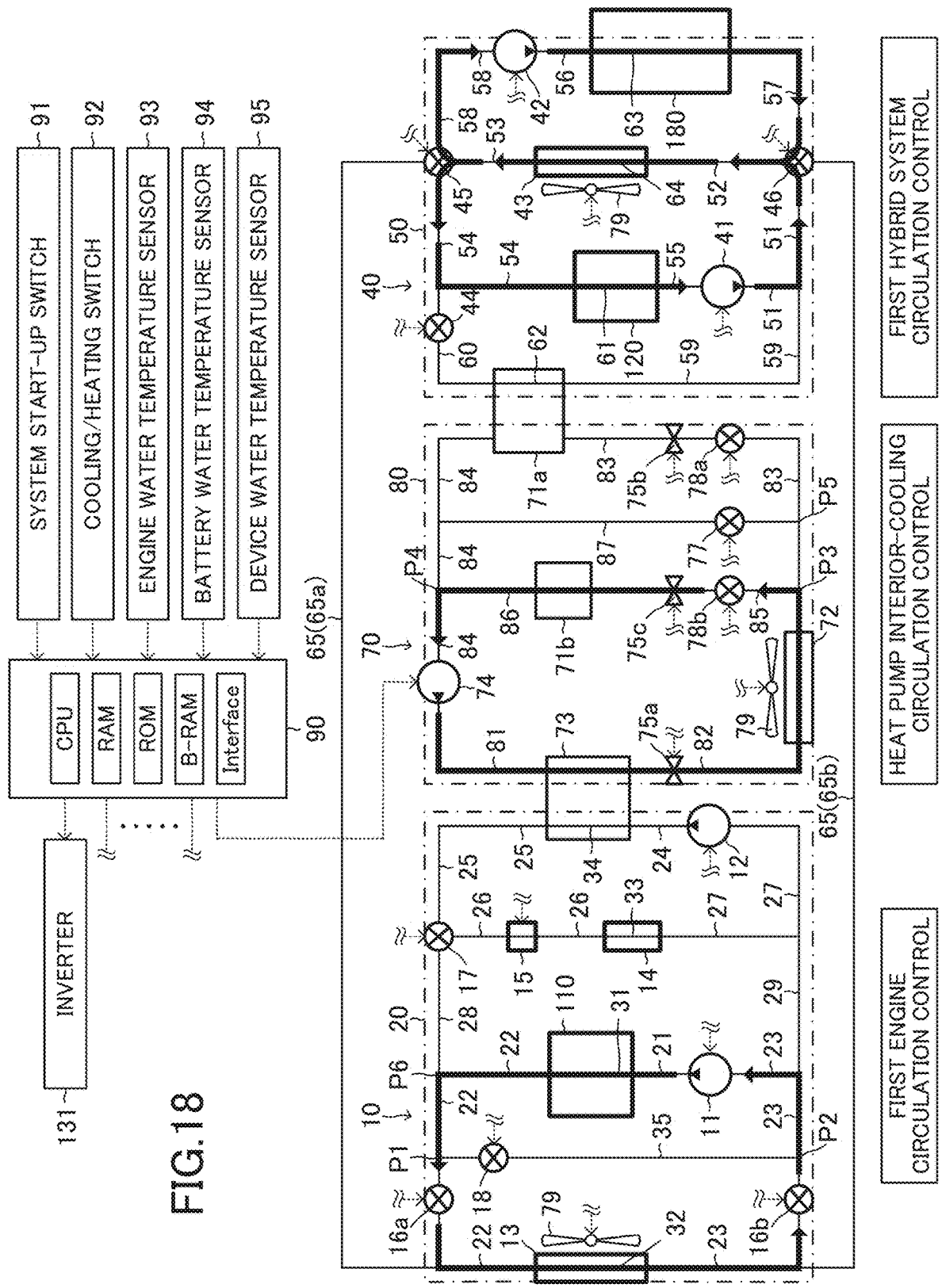
FIG. 18 is a view similar to FIG. 2 and which shows the flow of the cooling water and the flow of the cooling medium.

Further, the embodiment apparatus is configured to activate the heat pump 70 to supply the air cooled by the second evaporator 71b to the interior of the vehicle 100, for example, when the heat pump activation condition is not satisfied, the process of heating the interior of the vehicle 100 is not requested, and the process of cooling the interior of the vehicle 100. In particular, when the heat pump activation condition is not satisfied, the process of heating the interior of the vehicle 100 is not requested, and the process of cooling the interior of the vehicle 100 is requested, the embodiment apparatus executes a heat pump interior-cooling circulation control for flowing the cooling medium in the cooling medium circulation passage 80 as shown by arrows in FIG. 18. When the embodiment apparatus executes the heat pump interior-cooling circulation control, the embodiment apparatus sets the first expansion valve 75a at the non-decompression position, sets the third expansion valve 75c at the decompression position, sets the first cooling medium passage shut-off valve 78a at the closed position, sets the second cooling medium passage shut-off valve 78b at the open position, sets the heat pump bypass valve 77 at the closed position, and activates the compressor 74 and the heat exchanging fan 79.

In this case, the cooling medium discharged from the compressor 74 flows into the condenser 73 through the first cooling medium passage 81. The cooling medium flows through the condenser 73 and then, flows into the outside air heat exchanger 72 through the second cooling medium passage 82. The cooling medium flows through the outside air heat exchanger 72 and then, flows into the second evaporator 71b through the third cooling medium passage 83 and the fifth cooling medium passage 85. The cooling medium flows through the second evaporator 71b and then, is suctioned into the compressor 74 through the sixth cooling medium passage 86 and the fourth cooling medium passage 84.

Thereby, the cooling medium having the temperature increased by the compression by the compressor 74, discharges its heat to the outside air at the outside air heat exchanger 72. Thereby, the cooling medium is cooled. The cooled cooling medium flows into the second evaporator 71b through the third cooling medium passage 83 and the fifth cooling medium passage 85. The cooling medium flows through the third expansion valve 75c while the cooling medium flows through the fifth cooling medium passage 85. While the cooling medium flows through the third expansion valve 75c, the pressure of the cooling medium decreases and becomes likely to evaporate. Therefore, the cooling medium flowing into the second evaporator 71b receives the heat from the air supplied thereto by the fan and evaporates. Thereby, the temperature of the air supplied to the second evaporator 71b by the fan, decreases. The air having the decreased temperature is supplied to the interior of the vehicle 100. The cooling medium having the temperature increased by an evaporation of the cooling medium at the second evaporator 71b, is suctioned into the compressor 74 through the sixth cooling medium passage 86 and the fourth cooling medium passage 84. Then, the temperature of the cooling medium is further increased by the compression by the compressor 74.

<Heat Pump Cooling/Interior Cooling Circulation Control>

Figure 19:
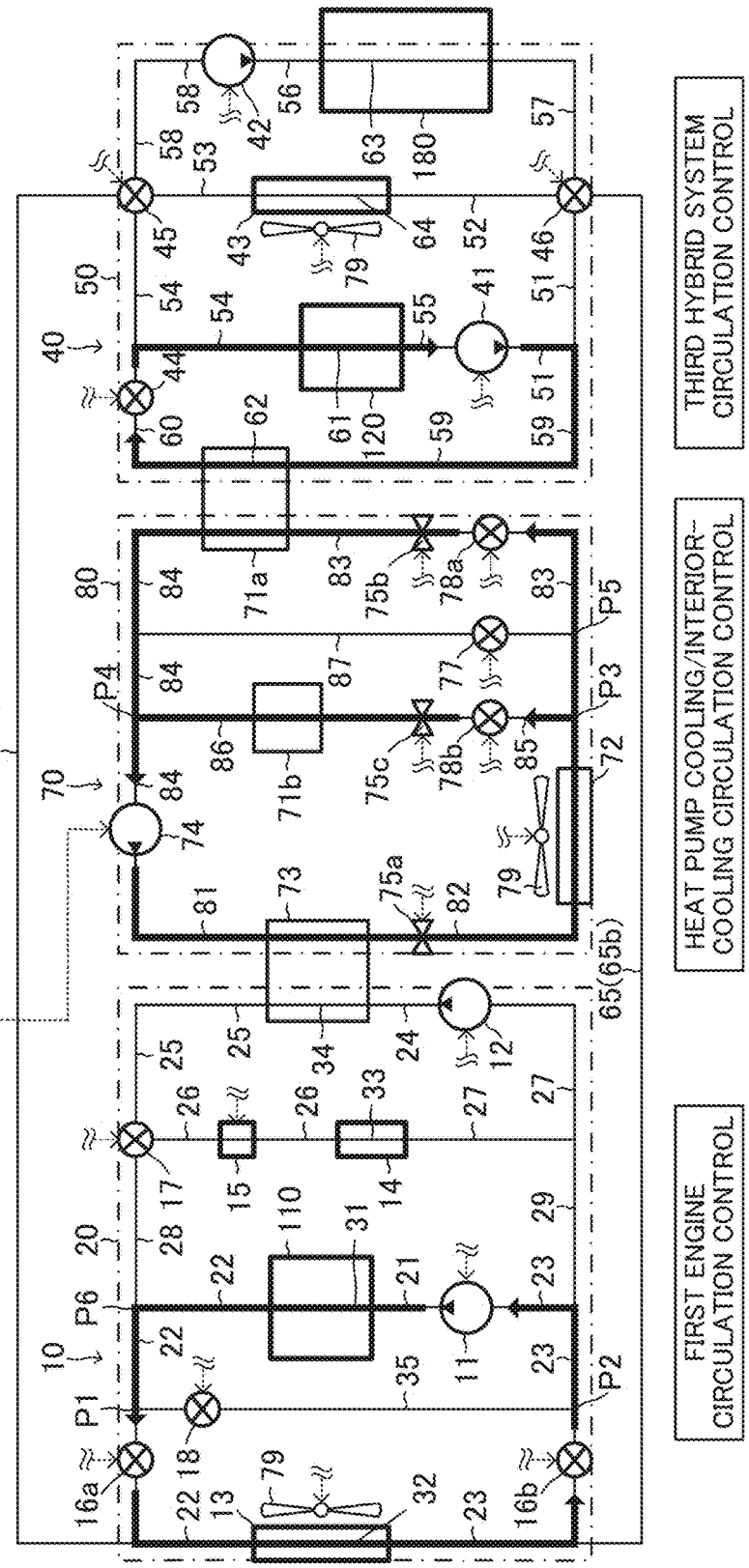
FIG. 19 is a view similar to FIG. 2 and which shows the flow of the cooling water and the flow of the cooling medium.

When the heat pump activation condition is satisfied, the process of heating the interior of the vehicle 100 is not requested, and the process of cooling the interior of the vehicle 100 is requested, the embodiment apparatus executes a heat pump cooling/interior-cooling circulation control for flowing the cooling medium in the cooling medium circulation passage 80 as shown by arrows in FIG. 19. When the embodiment apparatus executes the heat pump cooling/interior-cooling circulation control, the embodiment apparatus sets the first expansion valve 75a at the non-decomposition position, sets the second expansion valve 75b at the decomposition position, sets the third expansion valve 75c at the decomposition position, sets the first cooling medium passage shut-off valve 78a at the open position, sets the second cooling medium passage shut-off valve 78b at the open position, sets the heat pump bypass valve 77 at the closed position, and activates the compressor 74 and the heat exchanging fan 79.

At this time, the heat pump activation condition is satisfied. Thus, the embodiment apparatus executes the third hybrid system circulation control.

When the embodiment apparatus executes the heat pump cooling/interior-cooling circulation control, the cooling medium discharged from the compressor 74 flows into the condenser 73 through the first cooling medium passage 81. The cooling medium flows through the condenser 73 and then, flows into the outside air heat exchanger 72 through the second cooling medium passage 82. The cooling medium flows through the outside air heat exchanger 72 and then, flows into the third cooling medium passage 83. A part of the cooling medium flows into the first evaporator 71a through the third cooling medium passage 83. The cooling medium flows through the first evaporator 71a and then, is suctioned into the compressor 74 through the fourth cooling medium passage 84.

On the other hand, the remaining of the cooling medium flowing into the third cooling medium passage 83, flows into the second evaporator 71b through the third cooling medium passage 83 and the fifth cooling medium passage 85. The cooling medium flows through the second evaporator 71b and then, is suctioned into the compressor 74 through the sixth cooling medium passage 86 and the fourth cooling medium passage 84.

Thereby, the cooling medium having the temperature increased by the compression by the compressor 74, discharges its heat to the outside air at the outside air heat exchanger 72. Thereby, the cooling medium is cooled. A part of the cooled cooling medium flows through the second expansion valve 75b. The pressure of the cooling medium decreases while the cooling medium flows through the second expansion valve 75b. The cooling medium having the decreased temperature and the decreased pressure, flows through the first evaporator 71a. The cooling medium receives the heat from the cooling water flowing through the evaporator water passage 62 of the hybrid system water circulation passage 50 and evaporates while the cooling medium flows through the first evaporator 71a. Thereby, the cooling water is cooled. The cooled cooling water is supplied to the battery water passage 61. The battery 120 is cooled by the supplied cooling water.

On the other hand, the remaining of the cooling medium cooled at the outside air heat exchanger 72, flows into the second evaporator 71b through the third cooling medium passage 83 and the fifth cooling medium passage 85. The cooling medium flows through the third expansion valve 75c while the cooling medium flows through the fifth cooling medium passage 85. While the cooling medium flows through the third expansion valve 75c, the pressure of the cooling medium decreases and becomes likely to evaporate. Therefore, the cooling medium flowing into the second evaporator 71b receives the heat from the air supplied thereto by the fan and evaporates. Thereby, the temperature of the air supplied to the second evaporator 71b by the fan, decreases. The air having the decreased temperature is supplied to the interior of the vehicle 100. The cooling medium having the temperature increased by its evaporation at the second evaporator 71b, is suctioned into the compressor 74 through the sixth cooling medium passage 86 and the fourth cooling medium passage 84. The temperature of the cooling medium is further increased by the compression by the compressor 74.

<Engine Interior-Heating Circulation Control and Heat Pump Interior-Heating Circulation Control>

Figure 20:
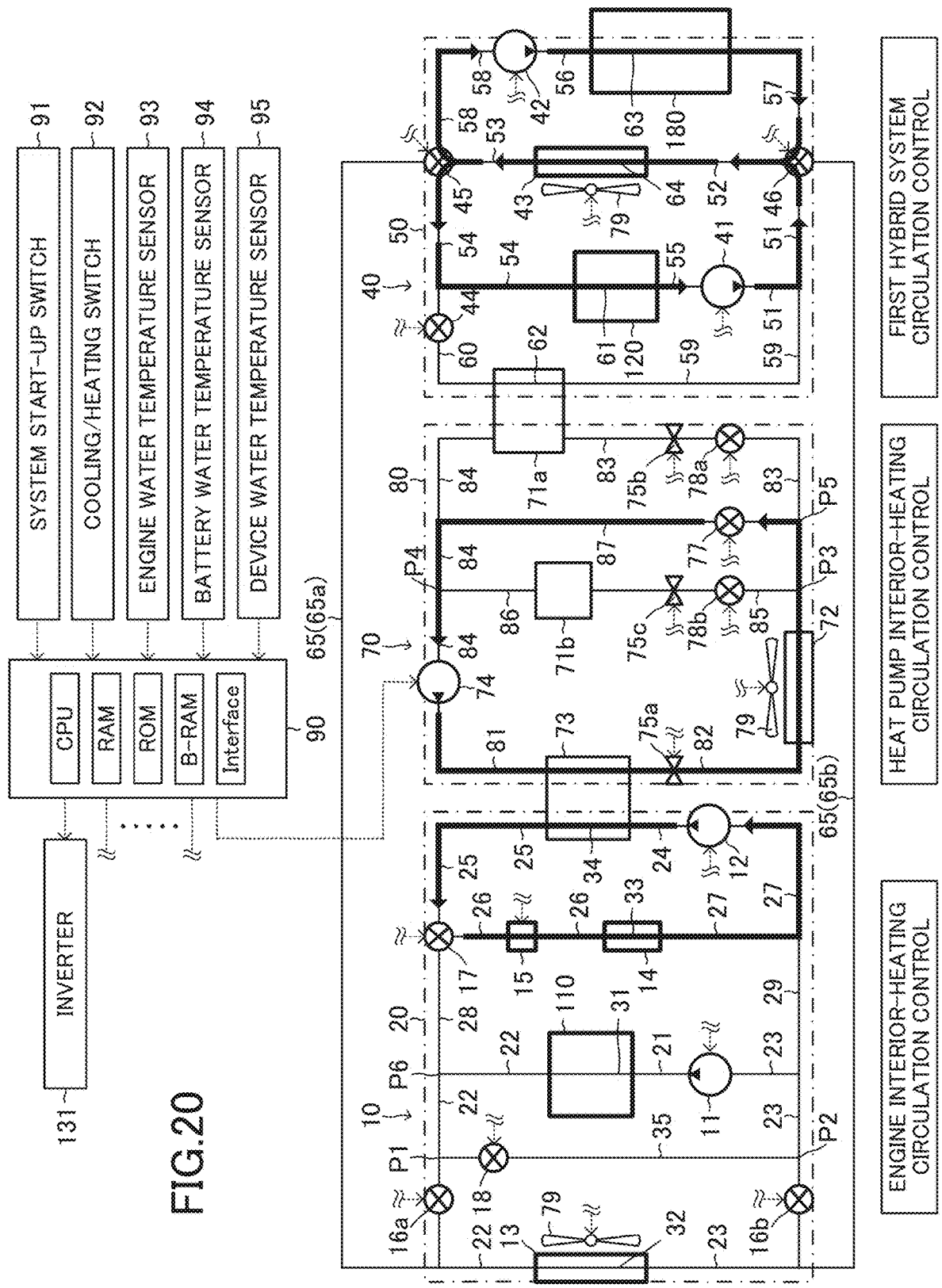
FIG. 20 is a view similar to FIG. 2 and which shows the flow of the cooling water and the flow of the cooling medium.

Further, the embodiment apparatus is configured to activate the heat pump 70 for heating the heater core 14, for example, when the process of heating the interior of the vehicle 100 is requested, the heat pump activation condition is not satisfied, and the cooling water having a predetermine temperature cannot be supplied to the core water passage 33 even by heating the cooling water by the electric heater 15 while the engine operation is stopped. Therefore, when the process of heating the interior of the vehicle 100 is requested, and the heat pump activation condition is not satisfied while the engine operation is stopped, the embodiment apparatus executes an engine interior-heating circulation control for flowing the cooling water in the engine water circulation passage 20 as shown by arrows in FIG. 20 and a heat pump interior-heating circulation control for flowing the cooling medium in the cooling medium circulation passage 80 as shown by arrows in FIG. 20. When the embodiment apparatus executes the engine interior-heating circulation control, the embodiment apparatus sets the engine flow rate control valve 17 at the first position and activates the heating pump 12. Further, when the embodiment apparatus executes the heat pump interior-cooling circulation control, the embodiment apparatus sets the first expansion valve 75a at the decomposition position, sets the first cooling medium passage shut-off valve 78a at the closed position, sets the heat pump bypass valve 77 at the open position, and activates the compressor 74 and the heat exchanging fan 79.

When the engine interior-heating circulation control is executed, the cooling water discharged from the heating pump 12 flows into the condenser water passage 34 through the fourth engine water passage 24. The cooling water flows through the condenser water passage 34 and then, flows into the core water passage 33 through the fifth engine water passage 25, the internal water passage of the engine flow rate control valve 17, and the sixth engine water passage 26. The cooling water flows through the core water passage 33 and then, is suctioned into the heating pump 12 through the seventh engine water passage 27.

On the other hand, the cooling medium discharged from the compressor 74 flows into the condenser 73 through the first cooling medium passage 81. The cooling medium flows through the condenser 73 and then, flows into the outside air heat exchanger 72 through the second cooling medium passage 82. The cooling medium flows through the outside air heat exchanger 72 and then, is suctioned into the compressor 74 through the third cooling medium passage 83, the bypass passage 87 and the fourth cooling medium passage 84.

Thereby, the cooling medium having the temperature increased by the compression by the compressor 74, discharges its heat to the cooling water flowing through the condenser water passage 34 at the condenser 73. Thereby, the cooling water flowing through the condenser water passage 34 is heated. The heated cooling water is supplied to the core water passage 33. The heater core 14 is heated by the supplied cooling water.

The cooling medium discharging its heat to the cooling water at the condenser 73, flows into the outside air heat exchanger 72 through the second cooling medium passage 82. The cooling medium flows through the first expansion valve 75a while the cooling medium flows through the second cooling medium passage 82. Thereby, the pressure of the cooling medium decreases and becomes likely to evaporate. Therefore, the cooling medium flowing into the outside air heat exchanger 72 receives the heat from the outside air and evaporates. Thereby, the temperature of the cooling medium increases. The cooling medium having the increased temperature is suctioned into the compressor 74 through the third cooling medium passage 83, the bypass passage 87, and the fourth cooling medium passage 84. Then, the temperature of the cooling medium is further increased by the compression by the compressor 74.

<First Modified Apparatus>

Figure 21:
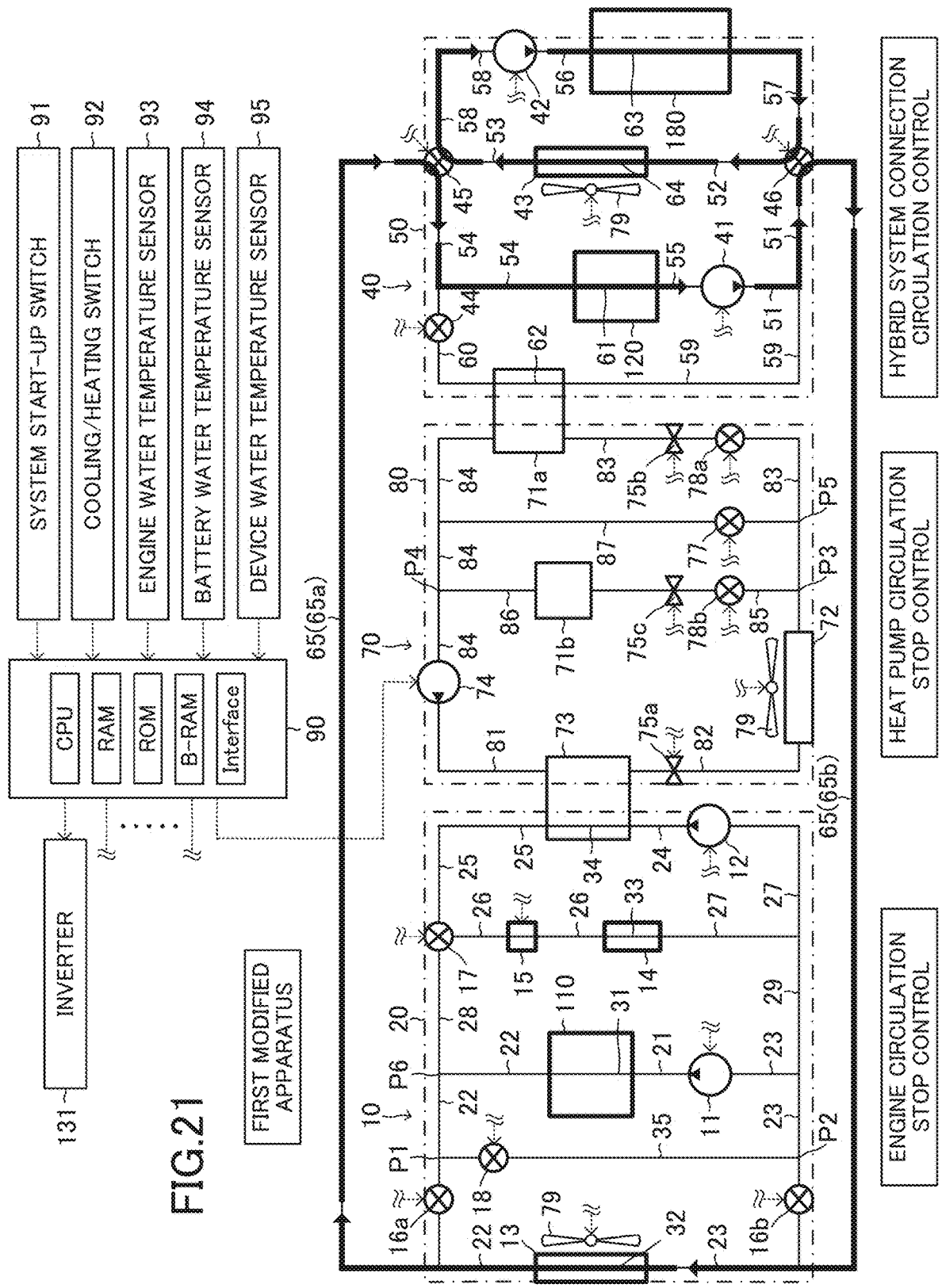
FIG. 21 is a view similar to FIG. 2 and which shows the flow of the cooling water.

Next, a cooling apparatus of the vehicle driving system 200 according to a first modified example of the embodiment of the invention, will be described. Hereinafter, the cooling apparatus according to the first modified example will be referred to as "the first modified apparatus". The embodiment apparatus is configured to execute the hybrid system connection circulation control for flowing the cooling water in the hybrid system water circulation passage 50, the first connection water passage 65a, the second connection water passage 65b, and the engine water circulation passage 20 as shown in FIG. 8 when the process of cooling the hybrid device 180 is requested, the process of cooling the battery 120 is requested, and the connection condition is satisfied. However, the first modified apparatus is configured to the hybrid system connection circulation control for flowing the cooling water in the hybrid system water circulation passage 50, the first connection water passage 65a, the second connection water passage 65b, and the engine water circulation passage 20 as shown in FIG. 21 when the process of cooling the hybrid device 180 is requested, the process of cooling the battery 120 is requested, and the connection condition is satisfied.

In this modified example, the connection condition is satisfied when the connection permission condition C1 described below is satisfied, and at least one of a connection permission condition C5, a connection permission condition C6, and the connection request condition C4 described below, is satisfied.

(1) The connection permission condition C1 is satisfied when the process of cooling the engine 110 is not requested.

(2) The connection permission condition C5 is satisfied when the engine water temperature TWeng is equal to or lower than the battery water temperature TWbat. That is, the first modified apparatus determines that the cooling water flowing from the engine water circulation passage 20 into the hybrid system water circulation passage 50 in the state that the engine water circulation passage 20 is fluidically connected to the hybrid system water circulation passage 50 by the connection device 65, has a cooling degree requested for cooling the battery 120 as one of the hybrid system components when the engine water temperature TWeng is equal to or lower than the battery water temperature TWbat.

(3) The connection permission condition C6 is satisfied when the engine water temperature TWeng is equal to or lower than a permitted upper limit Tbat_upper of the battery temperature Tbat. That is, the first modified apparatus determines that the cooling water flowing from the engine water circulation passage 20 into the hybrid system water circulation passage 50 in the state that the engine water circulation passage 20 is fluidically connected to the hybrid system water circulation passage 50 by the connection device 65, has the cooling degree requested for cooling the battery 120 as one of the hybrid system components when the engine water temperature TWeng is equal to or lower than the permitted upper limit Tbat_upper of the battery temperature Tbat. The permitted upper limit Tbat_upper is an upper limit temperature of the predetermined battery temperature range WTbat. The permitted upper limit Tbat_upper is previously set on the basis of a result of an experiment, etc. In this regard, the permitted upper limit Tbat_upper may be set to be a temperature higher than the upper limit temperature of the predetermined battery temperature range WTbat and the upper limit of the battery temperature Tbat capable of maintaining the battery 120 at a permitted state such as a state that the battery 120 is not thermally deteriorated.

(4) The connection request condition C4 is satisfied when the generated heat amount Htotal corresponding to the sum of the amount Hbat of the heat generated by the battery 120 and the amount Hdev of the heat generated by the hybrid device 180, is larger than the maximum heat amount Hmax, which the hybrid system radiator 43 can discharge. That is, the first modified apparatus determines that the cooling water flowing from the engine water circulation passage 20 into the hybrid system water circulation passage 50 in the state that the engine water circulation passage 20 is fluidically connected to the hybrid system water circulation passage 50 by the connection device 65, has the cooling degree requested for cooling the battery 120 as one of the hybrid system components when the generated heat amount Htotal is larger than the maximum heat amount Hmax.

When the first modified apparatus executes the hybrid system connection circulation control, the first modified apparatus sets the first hybrid system flow rate control valve 45 at the fifth position, sets the second hybrid system flow rate control valve 46 at the fifth position, sets the hybrid system water passage shut-off valve 44 at the closed position, sets the first engine water passage shut-off valve 16a at the closed position, sets the second engine water passage shut-off valve 16b at the closed position, and activates the battery pump 41, the device pump 42, and the heat exchanging fan 79.

When the hybrid system connection circulation control is executed, the cooling water discharged from the battery pump 41 flows into the engine radiator water passage 32 through the first hybrid system water passage 51, the internal water passage of the second hybrid system flow rate control valve 46, the second connection water passage 65b, and the third engine water passage 23. The cooling water flows through the engine radiator water passage 32 and then, flows into the battery water passage 61 through the second engine water passage 22, the first connection water passage 65a, the internal water passage of the first hybrid system flow rate control valve 45, and the fourth hybrid system water passage 54. The cooling water flows through the battery water passage 61 and then, is suctioned into the battery pump 41 through the fifth hybrid system water passage 55.

On the other hand, the cooling water discharged from the device pump 42 flows into the device water passage 63 through the sixth hybrid system water passage 56. The cooling water flows through the device water passage 63 and then, flows into the hybrid system radiator water passage 64 through the seventh hybrid system water passage 57, the internal water passage of the second hybrid system flow rate control valve 46, and the second hybrid system water passage 52. The cooling water flows through the hybrid system radiator water passage 64 and then, is suctioned into the device pump 42 through the third hybrid system water passage 53, the internal water passage of the first hybrid system flow rate control valve 45, and the eighth hybrid system water passage 58.

When the hybrid system connection circulation control is executed, the battery cooling water is cooled by the engine radiator 13, and the device cooling water is cooled by the hybrid system radiator 43. Therefore, when the hybrid system connection circulation control is executed, the temperatures of the battery cooling water and the device cooling water are low, compared to when the first hybrid system circulation control is executed. Thus, the battery and device temperatures Tbat and Tdev may be maintained within the predetermined battery and device temperature ranges WTbat and WTdev, respectively.

Second Modified Example

Next, a cooling apparatus of the vehicle driving system 200 according to a second modified example of the embodiment of the invention will be described. Hereinafter, the cooling apparatus according to the second modified example will be referred to as "the second modified apparatus". The second modified apparatus is configured to execute the hybrid system connection circulation control for flowing the cooling water as shown in FIG. 8 when the process of cooling the hybrid device 180 is requested, the process of cooling the battery 120 is requested, a device connection condition is satisfied, and a battery connection condition is not satisfied.

In this example, the device connection condition is satisfied when the connection permission condition C1 described below is satisfied, and at least one of the connection permission condition C2, the connection permission condition C3, and the connection request condition C4 described below is satisfied.

(1) The connection permission condition C1 is satisfied when the process of cooling the engine 110 is not requested.

(2) The connection permission condition C2 is satisfied when the engine water temperature TWeng is equal to or lower than the device water temperature TWdev. That is, the second modified apparatus determines that the cooling water flowing from the engine water circulation passage 20 into the hybrid system water circulation passage 50 in the state that the engine water circulation passage 20 is fluidically connected to the hybrid system water circulation passage 50 by the connection device 65, has the cooling degree requested for cooling the hybrid device 180 as one of the hybrid system components when the engine water temperature TWeng is equal to or lower than the device water temperature TWdev.

(3) The connection permission condition C3 is satisfied when the engine water temperature TWeng is equal to or lower than the permitted upper limit Tdev_upper of the device temperature Tdev. That is, the second modified apparatus determines that the cooling water flowing from the engine water circulation passage 20 into the hybrid system water circulation passage 50 in the state that the engine water circulation passage 20 is fluidically connected to the hybrid system water circulation passage 50 by the connection device 65, has the cooling degree requested for cooling the hybrid device 180 as one of the hybrid system components when the engine water temperature TWeng is equal to or lower than the permitted upper limit Tdev_upper of the device temperature Tdev.

(4) The connection request condition C4 is satisfied when the generated heat amount Htotal corresponding to the sum of the amount Hdev of the heat generated by the hybrid device 180 and the amount Hbat of the heat generated by the battery 120, is larger than the maximum heat amount Hmax, which the hybrid system radiator 43 can discharge. That is, the second modified apparatus determines that the cooling water flowing from the engine water circulation passage 20 into the hybrid system water circulation passage 50 in the state that the engine water circulation passage 20 is fluidically connected to the hybrid system water circulation passage 50 by the connection device 65, has the cooling degree requested for cooling the hybrid device 180 as one of the hybrid system components when the generated heat amount Htotal is larger than the maximum heat amount Hmax.

On the other hand, the battery connection condition is satisfied when the connection permission condition C1 described below is satisfied, and at least one of the connection permission condition C5, the connection permission condition C6, and the connection request condition C4 described below is satisfied.

(1) The connection permission condition C1 is satisfied when the process of cooling the engine 110 is not requested.

(2) The connection permission condition C5 is satisfied when the engine water temperature TWeng is equal to or lower than the battery water temperature TWbat. That is, the second modified apparatus determines that the cooling water flowing from the engine water circulation passage 20 into the hybrid system water circulation passage 50 in the state that the engine water circulation passage 20 is fluidically connected to the hybrid system water circulation passage 50 by the connection device 65, has the cooling degree requested for cooling the battery 120 as one of the hybrid system components when the engine water temperature TWeng is equal to or lower than the battery water temperature TWbat.

(3) The connection permission condition C6 is satisfied when the engine water temperature TWeng is equal to or lower than the permitted upper limit Tbat_upper of the battery temperature Tbat. That is, the second modified apparatus determines that the cooling water flowing from the engine water circulation passage 20 into the hybrid system water circulation passage 50 in the state that the engine water circulation passage 20 is fluidically connected to the hybrid system water circulation passage 50 by the connection device 65, has the cooling degree requested for cooling the battery 120 as one of the hybrid system components when the engine water temperature TWeng is equal to or lower than the permitted upper limit Tbat_upper of the battery temperature Tbat.

(4) The connection request condition C4 is satisfied when the generated heat amount Htotal corresponding to the sum of the amount Hdev of the heat generated by the hybrid device 180 and the amount Hbat of the heat generated by the battery 120, is larger than the maximum heat amount Hmax, which the hybrid system radiator 43 can discharge. That is, the second modified apparatus determines that the cooling water flowing from the engine water circulation passage 20 into the hybrid system water circulation passage 50 in the state that the engine water circulation passage 20 is fluidically connected to the hybrid system water circulation passage 50 by the connection device 65, has the cooling degree requested for cooling the battery 120 as one of the hybrid system components when the generated heat amount Htotal is larger than the maximum heat amount Hmax.

Further, the second modified apparatus is configured to execute the hybrid system connection circulation control for flowing the cooling water as shown in FIG. 21 when the process of cooling the hybrid device 180 is requested, the process of cooling the battery 120 is requested, the device connection condition is not satisfied, and the battery connection condition is satisfied.

In addition, the second modified apparatus is configured to execute the hybrid system connection circulation control for flowing the cooling water as shown in FIG. 8 when the process of cooling the hybrid device 180 is requested, the process of cooling the battery 120 is requested, the device connection condition is satisfied, and the battery connection condition is satisfied. However, the second modified apparatus may be configured to execute the hybrid system connection circulation control for flowing the cooling water as shown in FIG. 21.

When the hybrid system connection circulation control is executed, the device cooling water is cooled by one of the engine radiator 13 and the hybrid system radiator 43, and the battery cooling water is cooled by the remaining of the engine radiator 13 and the hybrid system radiator 43. Therefore, when the hybrid system connection circulation control is executed, the temperatures of the battery cooling water and the device cooling water are low, compared to when the first hybrid system circulation control is executed. Thus, the battery and device temperatures Tbat and Tdev may be maintained within the predetermined battery and device temperature ranges WTbat and WTdev, respectively.

It should be noted that the present invention is not limited to the aforementioned embodiment and various modifications can be employed within the scope of the present invention.

Third Modified Example

Figure 22:
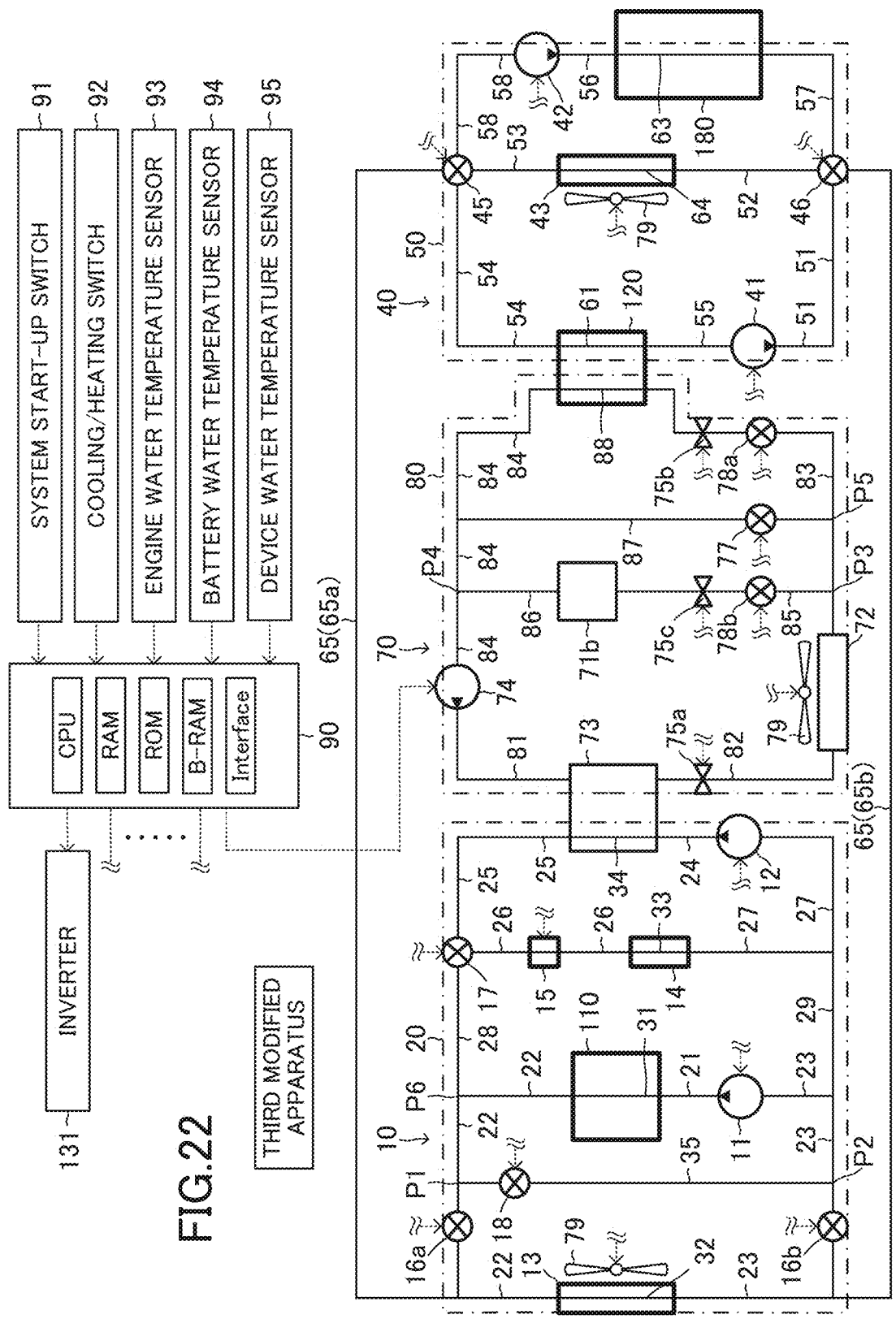
FIG. 22 is a view for showing a cooling apparatus of the vehicle driving system according to a modified example of the embodiment.

For example, the invention may be applied to a cooling apparatus of the vehicle driving system configured as shown in FIG. 22. The cooling apparatus shown in FIG. 22 is the same as the embodiment apparatus except of the hybrid system temperature control apparatus 40 and the heat pump 70. Hereinafter, the cooling apparatus shown in FIG. 22 will be referred to as "the third modified apparatus".

The hybrid system temperature control apparatus 40 of the third modified apparatus includes the battery pump 41, the device pump 42, the hybrid system radiator 43, the first hybrid system flow rate control valve 45, the second hybrid system flow rate control valve 46, and the hybrid system water circulation passage 50. The first and second hybrid system flow rate control valves 45 and 46 of the third modified apparatus are the same as the first and second hybrid system flow rate control valve 45 and 46 of the embodiment apparatus, respectively.

The hybrid system water circulation passage 50 of the third modified apparatus is formed by the battery water passage 61, the device water passage 63, the hybrid system radiator water passage 64, the first hybrid system water passage 51 to the eighth hybrid system water passage 58, the internal water passage of the battery pump 41, the internal water passage of the device pump 42, the internal water passage of the first hybrid system flow rate control valve 45, and the internal water passage of the second hybrid system flow rate control valve 46.

The battery water passage 61, the device water passage 63, the hybrid system radiator water passage 64, and the first hybrid system water passage 51 to the eighth hybrid system water passage 58 of the third modified apparatus are the same as the battery water passage 61, the device water passage 63, the hybrid system radiator water passage 64, and the first hybrid system water passage 51 to the eighth hybrid system water passage 58 of the embodiment apparatus, respectively.

The first and second hybrid system flow rate control valves 45 and 46 of the third modified apparatus are the same as the first and second hybrid system flow rate control valves 45 and 46 of the embodiment apparatus, respectively. The battery and device pumps 41 and 42 of the third modified apparatus are the same as the battery and device pumps 41 and 42 of the embodiment apparatus, respectively.

<Heat Pump>

The heat pump 70 of the third modified apparatus includes the second evaporator 71b, the outside air heat exchanger 72, the condenser 73, the compressor 74, the first expansion valve 75a, the second expansion valve 75b, the third expansion valve 75c, the heat pump bypass valve 77, the first cooling medium passage shut-off valve 78a, the second cooling medium passage shut-off valve 78b, and the cooling medium circulation passage 80.

The cooling medium circulation passage 80 of the third modified apparatus is formed by a battery cooling medium passage 88 provided in the battery 120, the internal passage (not shown) of the outside air heat exchanger 72, the internal passage (not shown) of the condenser 73, the internal passage of the second evaporator 71b, the first to sixth cooling medium passages 81 to 86, and the bypass passage 87.

The first and second cooling medium passages 81 and 82 of the third modified apparatus are the same as the first and second cooling medium passages 81 and 82 of the embodiment apparatus, respectively. The third cooling medium passage 83 of the third modified apparatus is a passage for the cooling medium and fluidically connects the cooling medium outlet of the outside air heat exchanger 72 to the cooling medium inlet of the battery cooling medium passage 88. The fourth cooling medium passage 84 of the third modified apparatus is a passage for the cooling medium and fluidically connects the cooling medium outlet of the battery cooling medium passage 88 to the cooling medium suctioning opening of the compressor 74. The fifth and sixth cooling medium passages 85 and 86 of the third modified apparatus are the same as the fifth and sixth cooling medium passages 85 and 86 of the embodiment apparatus, respectively. The bypass passage 87 of the third modified apparatus is a passage for the cooling medium and fluidically connects a portion of the third cooling medium passage 83 between the connection portion P3 and the cooling medium inlet of the battery cooling medium passage 88 to a portion of the fourth cooling medium passage 84 between the connection portion P4 and the cooling medium outlet of the battery cooling medium passage 88.

The first expansion valve 75a, the second expansion valve 75b, the third expansion valve 75c, the first cooling medium passage shut-off valve 78a, the second cooling medium passage shut-off valve 78b, the heat pump bypass valve 77, and the compressor 74 of the third modified apparatus are the same as the first expansion valve 75a, the second expansion valve 75b, the third expansion valve 75c, the first cooling medium passage shut-off valve 78a, the second cooling medium passage shut-off valve 78b, the heat pump bypass valve 77, and the compressor 74 of the embodiment apparatus, respectively.

The heat pump 70 of the third modified apparatus does not include the first evaporator 71a in contrast to the heat pump 70 of the embodiment apparatus. The heat pump 70 of the third modified apparatus is configured to cool the battery 120 directly. Thus, the hybrid system temperature control apparatus 40 of the third modified apparatus does not include a water passage for supplying the cooling water to the evaporator water passage 62 in contrast to the hybrid system temperature control apparatus 40 of the embodiment apparatus. Therefore, the heat pump 70 and the hybrid system temperature control apparatus 40 of the third modified apparatus are simplified, compared to the heat pump 70 and the hybrid system temperature control apparatus 40 of the embodiment apparatus.

<First Hybrid System Circulation Control by Third Modified Apparatus>

When the third modified apparatus executes the first hybrid system circulation control, the third modified apparatus sets the first hybrid system flow rate control valve 45 at the third position, sets the second hybrid system flow rate control valve 46 at the third position, and activates the battery pump 41, the device pump 42, and the heat exchanging fan 79.

As shown in FIG. 23, a flow of the cooling water discharged from the battery pump 41 and the device pump 42 in the hybrid system water circulation passage 50 when the third modified apparatus executes the first hybrid system circulation control, is the same as a flow of the cooling water discharged from the battery pump 41 and the device pump 42 in the hybrid system water circulation passage 50 when the embodiment apparatus executes the first hybrid system circulation control.

<Hybrid System Connection Circulation Control by Third Modified Apparatus>

When the third modified apparatus executes the hybrid system connection circulation control, the third modified apparatus sets the first hybrid system flow rate control valve 45 at the fourth position, sets the second hybrid system flow rate control valve 46 at the fourth position, sets the first engine water passage shut-off valve 16a at the closed position, sets the second engine water passage shut-off valve 16b at the closed position, and activates the battery pump 41, the device pump 42, and the heat exchanging fan 79.

As shown in FIG. 24, the flow of the cooling water discharged from the battery pump 41 and the device pump 42 when the third modified apparatus executes the hybrid system connection circulation control, is the same as the flow of the cooling water discharged from the battery pump 41 and the device pump 42 when the embodiment apparatus executes the hybrid system connection circulation control.

<Heat Pump Cooling Circulation Control by Third Modified Apparatus>

When the heat pump activation condition is satisfied, the third modified apparatus executes the first hybrid system circulation control and the heat pump cooling circulation control. When the third modified apparatus executes the heat pump cooling circulation control, the third modified apparatus sets the first cooling medium passage shut-off valve 78a at the open position, sets the second cooling medium passage shut-off valve 78b at the closed position, sets the heat pump bypass valve 77 at the closed position, sets the first expansion valve 75a at the non-decompression position, sets the second expansion valve 75b at the decompression position, and activates the compressor 74.

When the third modified apparatus executes the heat pump cooling circulation control, the cooling medium discharged from the compressor 74 flows in the cooling medium circulation passage 80 as shown in FIG. 25. In particular, the cooling medium discharged from the compressor 74 flows into the condenser 73 through the first cooling medium passage 81. The cooling medium flows through the condenser 73 and then, flows into the outside air heat exchanger 72 through the second cooling medium passage 82. The cooling medium flows through the outside air heat exchanger 72 and then, flows into the battery cooling medium passage 88 through the third cooling medium passage 83. The cooling medium flows through the battery cooling medium passage 88 and then, flows into the compressor 74 through the fourth cooling medium passage 84.

When the heat pump cooling circulation control is executed, the cooling medium cooled by the outside air heat exchanger 72 flows through the battery cooling medium passage 88. Thereby, the battery 120 is cooled by the cooling medium.

<Third Hybrid System Circulation Control by Third Modified Apparatus>

When the third modified apparatus executes the third hybrid system circulation control, the third modified apparatus sets the first hybrid system flow rate control valve 45 at the second position, sets the second hybrid system flow rate control valve 46 at the second position, activates the battery pump 41, stops activating the device pump 42, and activates the heat exchanging fan 79.

Figure 26:
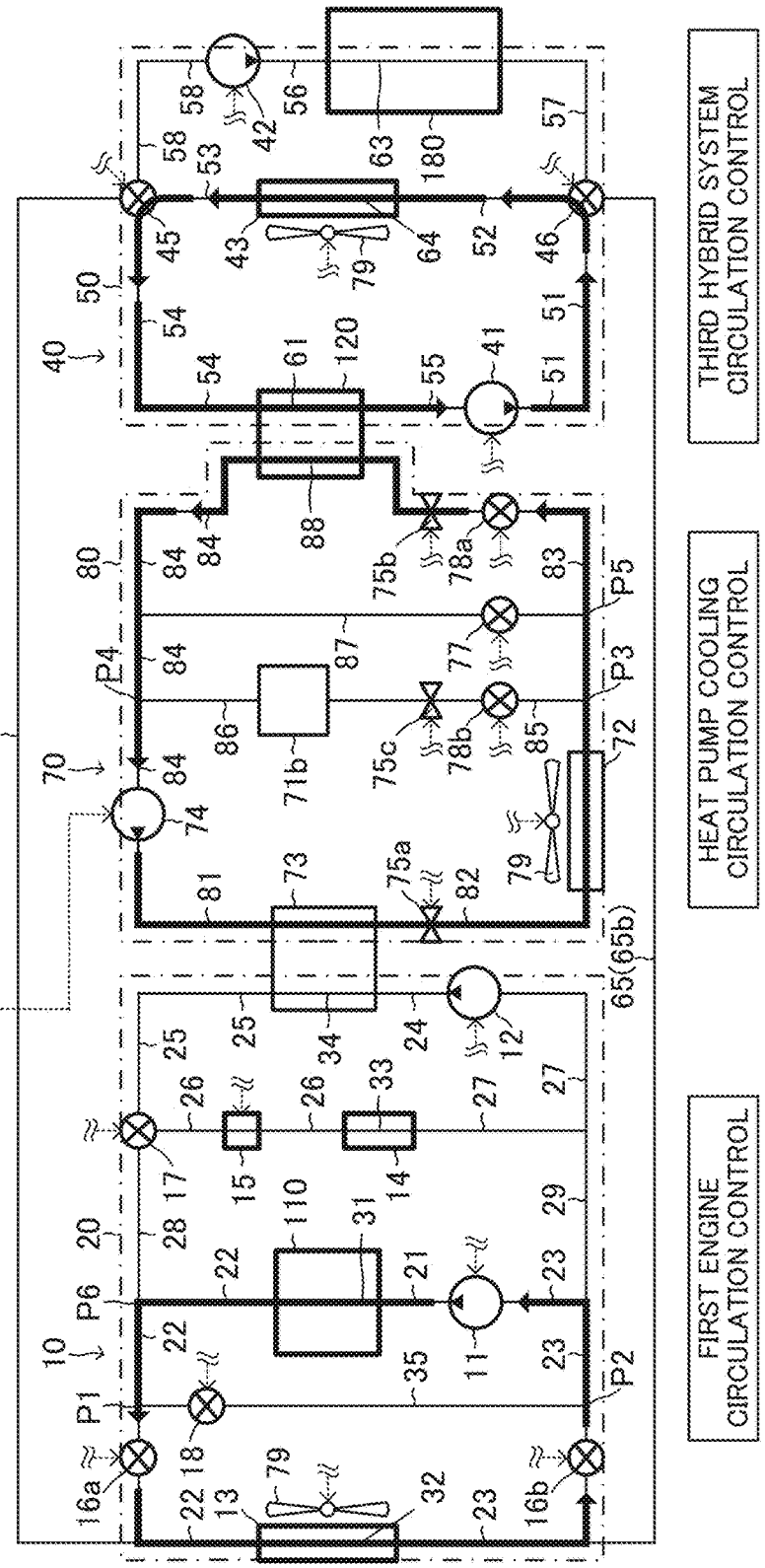
FIG. 26 is a view similar to FIG. 22 and which shows the flow of the cooling water and the flow of the cooling medium.

When the third modified apparatus executes the third hybrid system circulation control, the cooling water discharged from the battery pump 41 flows in the hybrid system water circulation passage 50 as shown in FIG. 26. In particular, the cooling water discharged from the battery pump 41 flows into the hybrid system radiator water passage 64 through the first hybrid system water passage 51, the internal water passage of the second hybrid system flow rate control valve 46, and the second hybrid system water passage 52. The cooling water flows through the hybrid system radiator water passage 64 and then, flows into the battery water passage 61 through the third hybrid system water passage 53, the internal water passage of the first hybrid system flow rate control valve 45, and the fourth hybrid system water passage 54. The cooling water flows through the battery water passage 61 and then, is suctioned into the battery pump 41 through the fifth hybrid system water passage 55.

<Fourth Hybrid System Circulation Control by Third Modified Apparatus>

When the third modified apparatus executes the fourth hybrid system circulation control, the third modified apparatus sets the first hybrid system flow rate control valve 45 at the second position, sets the second hybrid system flow rate control valve 46 at the second position, activates the battery pump 41, stops activating the device pump 42, and activates the heat exchanging fan 79.

As shown in FIG. 27, the flow of the cooling water discharged from the battery pump 41 in the hybrid system water circulation passage 50 when the third modified apparatus executes the fourth hybrid system circulation control, is the same as the flow of the cooling water discharged from the battery pump 41 in the hybrid system water circulation passage 50 when the embodiment apparatus executes the fourth hybrid system circulation control.

<Fifth Hybrid System Circulation Control by Third Modified Apparatus>

When the third modified apparatus executes the fifth hybrid system circulation control, the third modified apparatus sets the first hybrid system flow rate control valve 45 at the first position, sets the second hybrid system flow rate control valve 46 at the first position, stops activating the battery pump 41, activates the device pump 42, and activates the heat exchanging fan 79.

Figure 28:
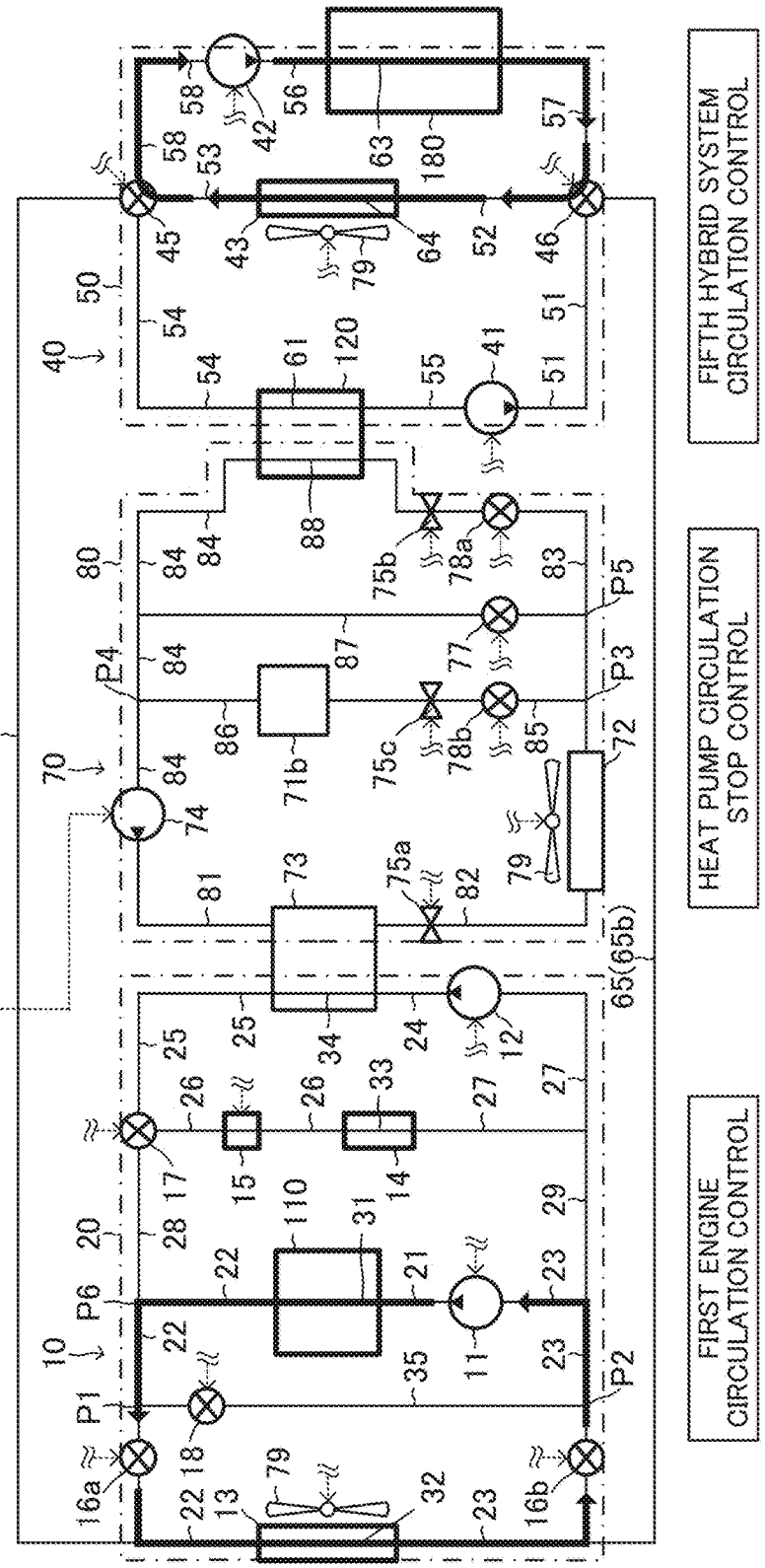
FIG. 28 is a view similar to FIG. 22 and which shows the flow of the cooling water.

As shown in FIG. 28, the flow of the cooling water discharged from the device pump 42 in the hybrid system water circulation passage 50 when the third modified apparatus executes the fifth hybrid system circulation control, is the same as the flow of the cooling water discharged from the device pump 42 in the hybrid system water circulation passage 50 when the embodiment apparatus executes the fifth hybrid system circulation control.

<Hybrid System Circulation Stop Control>

When the third modified apparatus executes the hybrid system circulation stop control, the third modified apparatus stops activating the battery pump 41 and the device pump 42.

The control of the engine system temperature control apparatus 10 and the heat pump 70 executed by the third modified apparatus is the same as the control of the engine system temperature control apparatus 10 and the heat pump 70 executed by the embodiment apparatus.

Fourth Modified Example

Figure 29:
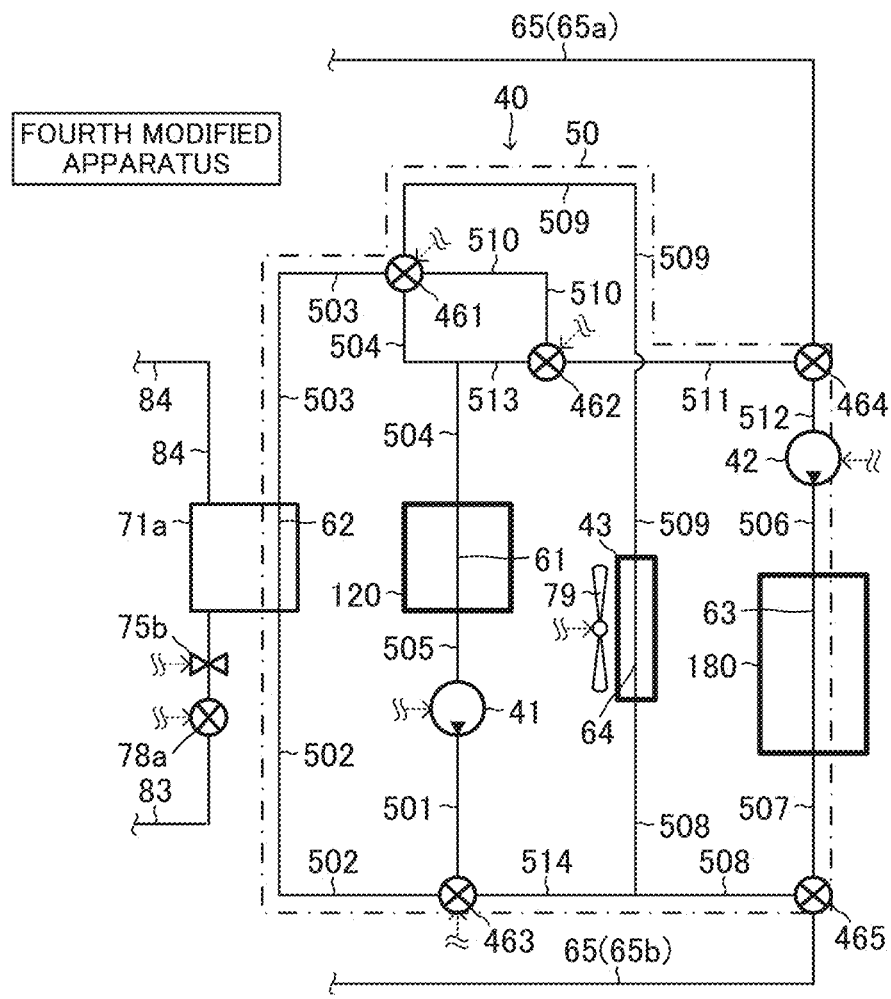
FIG. 29 is a view for showing a cooling apparatus of the vehicle driving system according to another modified example of the embodiment.

Further, the invention may be applied to a cooling apparatus of the vehicle driving system 200 including the hybrid system temperature control apparatus 40 configured as shown in FIG. 29. The cooling apparatus shown in FIG. 29 is the same as the embodiment apparatus except of the hybrid system temperature control apparatus 40. Hereinafter, the cooling apparatus shown in FIG. 29 will be referred to as "the fourth modified apparatus".

The hybrid system temperature control apparatus 40 of the fourth modified apparatus includes the battery pump 41, the device pump 42, the hybrid system radiator 43, first to fifth hybrid system flow rate control valves 461 to 465, and the hybrid system water circulation passage 50.

Figure 30A:
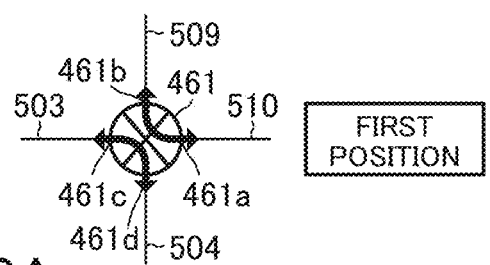
FIG. 30A is a view for showing the flow of the cooling water when a first hybrid system flow rate control valve shown in FIG. 29 is set at a first position.
Figure 31A:
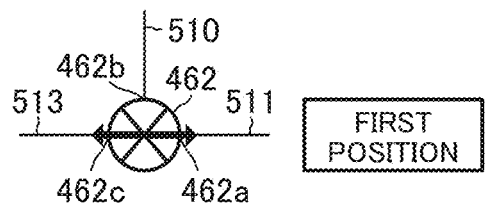
FIG. 31A is a view for showing the flow of the cooling water when a second hybrid system flow rate control valve shown in FIG. 29 is set at a first position.
Figure 32A:
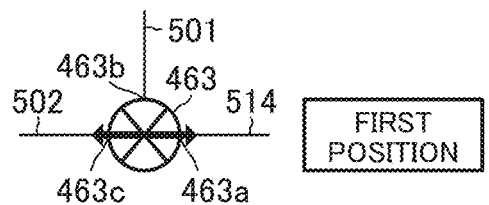
FIG. 32A is a view for showing the flow of the cooling water when a third hybrid system flow rate control valve shown in FIG. 29 is set at a first position.
Figure 34A:
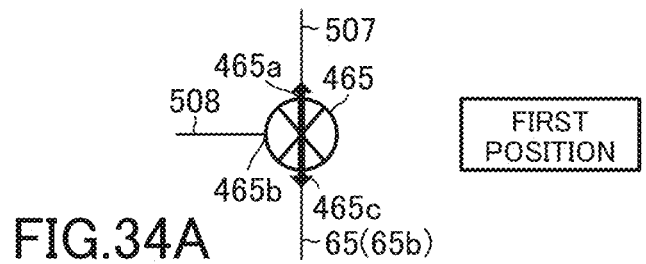
FIG. 34A is a view for showing the flow of the cooling water when a fifth hybrid system flow rate control valve shown in FIG. 29 is set at a first position.

As shown in FIG. 30A, the first hybrid system flow rate control valve 461 includes a first hybrid system port 461a, a second hybrid system port 461b, a third hybrid system port 461c, and a fourth hybrid system port 461d. As shown in FIG. 31A, the second hybrid system flow rate control valve 462 includes a first hybrid system port 462a, a second hybrid system port 462b, and a third hybrid system port 462c. As shown in FIG. 32A, the third hybrid system flow rate control valve 463 includes a first hybrid system port 463a, a second hybrid system port 463b, and a third hybrid system port 463c. As shown in FIG. 33A, the fourth hybrid system flow rate control valve 464 includes a first hybrid system port 464a, a second hybrid system port 464b, and a third hybrid system port 464c. As shown in FIG. 34A, the fifth hybrid system flow rate control valve 465 includes a first hybrid system port 465a, a second hybrid system port 465b, and a third hybrid system port 465c.

As shown in FIG. 29, the hybrid system water circulation passage 50 of the fourth modified apparatus is formed by the battery water passage 61, the evaporator water passage 62, the device water passage 63, the hybrid system radiator water passage 64, a first to fourteenth hybrid system water passages 501 to 514, the internal water passage of the battery pump 41, the internal water passage of the device pump 42, and the internal water passages of the first to fifth hybrid system control rate valves 461 to 465.

The battery water passage 61, the evaporator water passage 62, the device water passage 63, and the hybrid system radiator water passage 64 of the fourth modified apparatus are the same as the battery water passage 61, the evaporator water passage 62, the device water passage 63, and the hybrid system radiator water passage 64 of the embodiment apparatus, respectively.

The first hybrid system water passage 501 is a passage for the cooling water and fluidically connects the cooling water discharging opening of the battery pump 41 to the second hybrid system port 463b of the third hybrid system flow rate control valve 463. The second hybrid system water passage 502 is a passage for the cooling water and fluidically connects the third hybrid system port 463c of the third hybrid system flow rate control valve 463 to the inlet of the evaporator water passage 62. The third hybrid system water passage 503 is a passage for the cooling water and fluidically connects the outlet of the evaporator water passage 62 to the third hybrid system port 461*c* of the first hybrid system flow rate control valve 461. The fourth hybrid system water passage 504 is a passage for the cooling water and fluidically connects the fourth hybrid system port 461*d* of the first hybrid system flow rate control valve 461 to the inlet of the battery water passage 61. The fifth hybrid system water passage 505 is a passage for the cooling water and fluidically connects the outlet of the battery water passage 61 to the cooling water suctioning opening of the battery pump 41.

The sixth hybrid system water passage 506 is a passage for the cooling water and fluidically connects the cooling water discharging opening of the device pump 42 to the inlet of the device water passage 63. The seventh hybrid system water passage 507 is a passage for the cooling water and fluidically connects the outlet of the device water passage 63 to the first hybrid system port 465*a* of the fifth hybrid system flow rate control valve 465. The eighth hybrid system water passage 508 is a passage for the cooling water and fluidically connects the second hybrid system port 465*b* of the fifth hybrid system flow rate control valve 465 to the inlet of the hybrid system radiator water passage 64. The ninth hybrid system water passage 509 is a passage for the cooling water and fluidically connects the outlet of the hybrid system radiator water passage 64 to the second hybrid system port 461*b* of the first hybrid system flow rate control valve 461. The tenth hybrid system water passage 510 is a passage for the cooling water and fluidically connects the first hybrid system port 461*a* of the first hybrid system flow rate control valve 461 to the second hybrid system port 462*b* of the second hybrid system flow rate control valve 462. The eleventh hybrid system water passage 511 is a passage for the cooling water and fluidically connects the first hybrid system port 462*a* of the second hybrid system flow rate control valve 462 to the second hybrid system port 464*b* of the fourth hybrid system flow rate control valve 464. The twelfth hybrid system water passage 512 is a passage for the cooling water and fluidically connects the third hybrid system port 464*c* of the fourth hybrid system flow rate control valve 464 to the cooling water suctioning opening of the device pump 42.

The thirteenth hybrid system water passage 513 is a passage for the cooling water and fluidically connects the third hybrid system port 462*c* of the second hybrid system flow rate control valve 462 to the fourth hybrid system water passage 504. The fourteenth hybrid system water passage 514 is a passage for the cooling water and fluidically connects the first hybrid system port 463*a* of the third hybrid system flow rate control valve 463 to the eighth hybrid system water passage 508.

The first connection water passage 65*a* is fluidically connected to the first hybrid system port 464*a* of the fourth hybrid system flow rate control valve 464. The second connection water passage 65*b* is fluidically connected to the third hybrid system port 465*c* of the fifth hybrid system flow rate control valve 465.

Figure 30B:
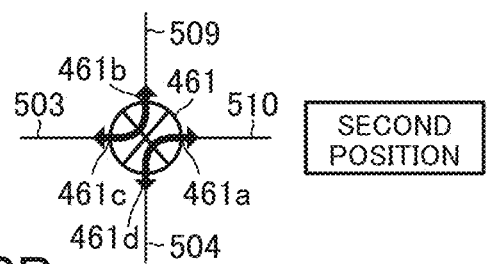
FIG. 30B is a view for showing the flow of the cooling water when the first hybrid system flow rate control valve shown in FIG. 29 is set at a second position.

The first hybrid system flow rate control valve 461 is electrically connected to the ECU 90. A setting position of the first hybrid system flow rate control valve 461 is controlled by the ECU 90. When the first hybrid system flow rate control valve 461 is set at a first position, the first hybrid system flow rate control valve 461 fluidically connects the third and fourth hybrid system water passages 503 and 504 to each other and connects the ninth and tenth hybrid system water passages 509 and 510 to each other as shown in FIG. 30A. When the first hybrid system flow rate control valve 461 is set at a second position, the first hybrid system flow rate control valve 461 fluidically connects the third and ninth hybrid system water passages 503 and 509 to each other and connects the fourth tenth hybrid system water passages 504 and 510 to each other as shown in FIG. 30B.

Figure 31B:
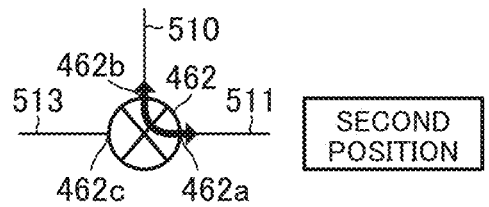
FIG. 31B is a view for showing the flow of the cooling water when the second hybrid system flow rate control valve shown in FIG. 29 is set at a second position.

The second hybrid system flow rate control valve 462 is electrically connected to the ECU 90. A setting position of the second hybrid system flow rate control valve 462 is controlled by the ECU 90. When the second hybrid system flow rate control valve 462 is set at a first position, the second hybrid system flow rate control valve 462 fluidically connects the eleventh and thirteenth hybrid system water passages 511 and 513 to each other as shown in FIG. 31A. When the second hybrid system flow rate control valve 462 is set at a second position, the second hybrid system flow rate control valve 462 fluidically connects the tenth and eleventh hybrid system water passages 510 and 511 to each other as shown in FIG. 31B.

Figure 31C:
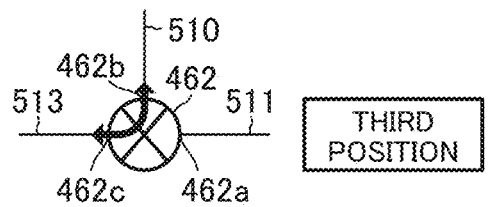
FIG. 31C is a view for showing the flow of the cooling water when the second hybrid system flow rate control valve shown in FIG. 29 is set at a third position.
Figure 31D:
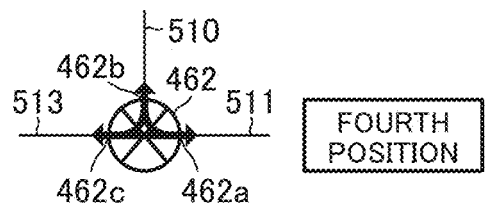
FIG. 31D is a view for showing the flow of the cooling water when the second hybrid system flow rate control valve shown in FIG. 29 is set at a fourth position.

When the second hybrid system flow rate control valve 462 is set at a third position, the second hybrid system flow rate control valve 462 fluidically connects the tenth and thirteenth hybrid system water passages 510 and 513 to each other as shown in FIG. 31C. When the second hybrid system flow rate control valve 462 is set at a fourth position, the second hybrid system flow rate control valve 462 fluidically connects the tenth and eleventh hybrid system water passages 510 and 511 to each other, connects the tenth and thirteenth hybrid system water passages 510 and 513 to each other, and connects the eleventh and thirteenth hybrid system water passages 511 and 513 as shown in FIG. 31D.

Figure 32B:
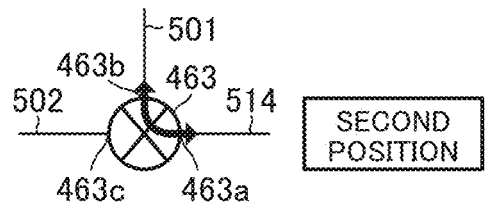
FIG. 32B is a view for showing the flow of the cooling water when the third hybrid system flow rate control valve shown in FIG. 29 is set at a second position.

The third hybrid system flow rate control valve 463 is electrically connected to the ECU 90. A setting position of the third hybrid system flow rate control valve 463 is controlled by the ECU 90. When the third hybrid system flow rate control valve 463 is set at a first position, the third hybrid system flow rate control valve 463 fluidically connects the second and fourteenth hybrid system water passages 502 and 514 to each other as shown in FIG. 32A. When the third hybrid system flow rate control valve 463 is set at a second position, the third hybrid system flow rate control valve 463 fluidically connects the first and fourteenth hybrid system water passages 501 and 514 to each other as shown in FIG. 32B.

Figure 32C:
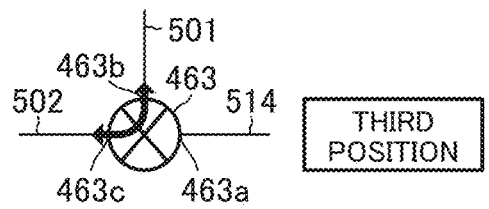
FIG. 32C is a view for showing the flow of the cooling water when the third hybrid system flow rate control valve shown in FIG. 29 is set at a third position.
Figure 32D:
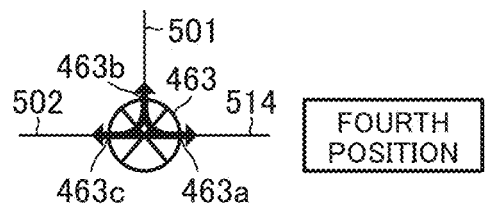
FIG. 32D is a view for showing the flow of the cooling water when the third hybrid system flow rate control valve shown in FIG. 29 is set at a fourth position.

When the third hybrid system flow rate control valve 463 is set at a third position, the third hybrid system flow rate control valve 463 fluidically connects the first and second hybrid system water passages 501 and 502 to each other as shown in FIG. 32C. When the third hybrid system flow rate control valve 463 is set at a fourth position, the third hybrid system flow rate control valve 463 fluidically connects the first and second hybrid system water passages 501 and 502 to each other, connects the first and fourteenth hybrid system water passage 501 and 514 to each other, and connects the second and fourteenth hybrid system water passages 502 and 514 as shown in FIG. 32D.

The fourth hybrid system flow rate control valve 464 is electrically connected to the ECU 90. A setting position of the fourth hybrid system flow rate control valve 464 is controlled by the ECU 90. When the fourth hybrid system flow rate control valve 464 is set at a first position, the fourth hybrid system flow rate control valve 464 fluidically connects the first connection water passage 65*a* and the twelfth hybrid system water passage 512 to each other as shown in FIG. 33A. When the fourth hybrid system flow rate control valve 464 is set at a second position, the fourth hybrid system flow rate control valve 464 fluidically connects the eleventh and twelfth hybrid system water passages 511 and 512 to each other as shown in FIG. 33B.

When the fourth hybrid system flow rate control valve 464 is set at a third position, the fourth hybrid system flow rate control valve 464 fluidically connects the first connection water passage 65*a* and the eleventh hybrid system water passage 511 to each other as shown in FIG. 33C. When the fourth hybrid system flow rate control valve 464 is set at a fourth position, the fourth hybrid system flow rate control valve 464 fluidically connects the first connection water passage 65*a* and the eleventh hybrid system water passage 511 to each other, connects the first connection water passage 65*a* and the twelfth hybrid system water passage 512 to each other, and connects the eleventh and twelfth hybrid system water passages 511 and 512 to each other as shown in FIG. 33D.

Figure 34B:
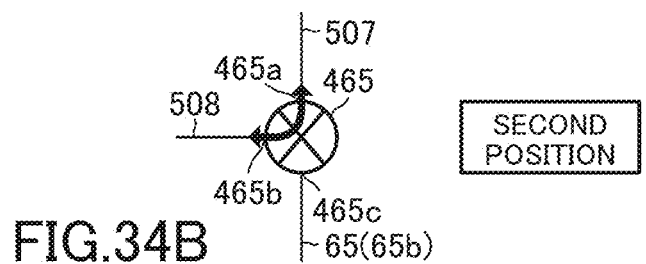
FIG. 34B is a view for showing the flow of the cooling water when the fifth hybrid system flow rate control valve shown in FIG. 29 is set at a second position.

The fifth hybrid system flow rate control valve 465 is electrically connected to the ECU 90. A setting position of the fifth hybrid system flow rate control valve 465 is controlled by the ECU 90. When the fifth hybrid system flow rate control valve 465 is set at a first position, the fifth hybrid system flow rate control valve 465 fluidically connects the second connection water passage 65*b* and the seventh hybrid system water passage 507 to each other as shown in FIG. 34A. When the fifth hybrid system flow rate control valve 465 is set at a second position, the fifth hybrid system flow rate control valve 465 fluidically connects the seventh and eighth hybrid system water passages 507 and 508 to each other as shown in FIG. 34B.

Figure 34C:
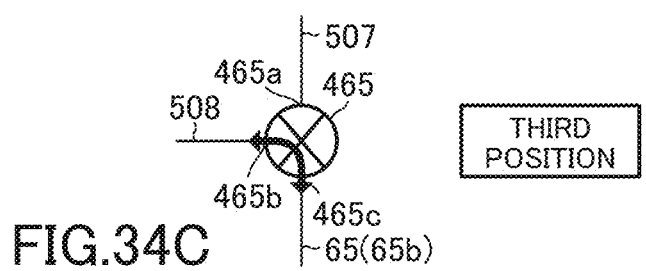
FIG. 34C is a view for showing the flow of the cooling water when the fifth hybrid system flow rate control valve shown in FIG. 29 is set at a third position.
Figure 34D:
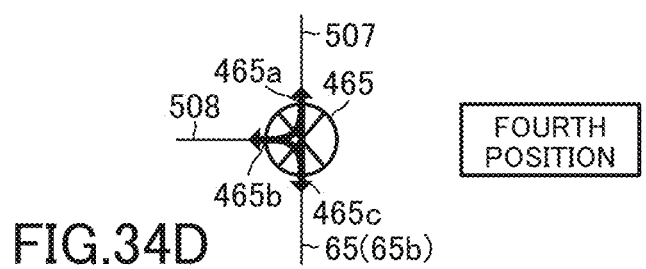
FIG. 34D is a view for showing the flow of the cooling water when the fifth hybrid system flow rate control valve shown in FIG. 29 is set at a fourth position.

When the fifth hybrid system flow rate control valve 465 is set at a third position, the fifth hybrid system flow rate control valve 465 fluidically connects the second connection water passage 65*b* and the eighth hybrid system water passage 508 to each other as shown in FIG. 34C. When the fifth hybrid system flow rate control valve 465 is set at a fourth position, the fifth hybrid system flow rate control valve 465 fluidically connects the second connection water passage 65*b* and the seventh hybrid system water passage 507 to each other, connects the second connection water passage 65*b* and the eighth hybrid system water passage 508 to each other, connects the seventh and eighth hybrid system water passages 507 and 508 to each other as shown in FIG. 34D.

The battery pump 41 is electrically connected to the ECU 90. The activation of the battery pump 41 is controlled by the ECU 90. The device pump 42 is electrically connected to the ECU 90. The activation of the device pump 42 is controlled by the ECU 90.

<First Hybrid System Circulation Control by Fourth Modified Apparatus>

When the fourth modified apparatus executes the first hybrid system circulation control, the fourth modified apparatus sets the first hybrid system flow rate control valve 461 at the first position, sets the second hybrid system flow rate control valve 462 at the fourth position, sets the third hybrid system flow rate control valve 463 at the second position, sets the fourth hybrid system flow rate control valve 464 at the second position, sets the fifth hybrid system flow rate control valve 465 at the second position, and activates the battery pump 41, the device pump 42, and the heat exchanging fan 79.

Figure 35:
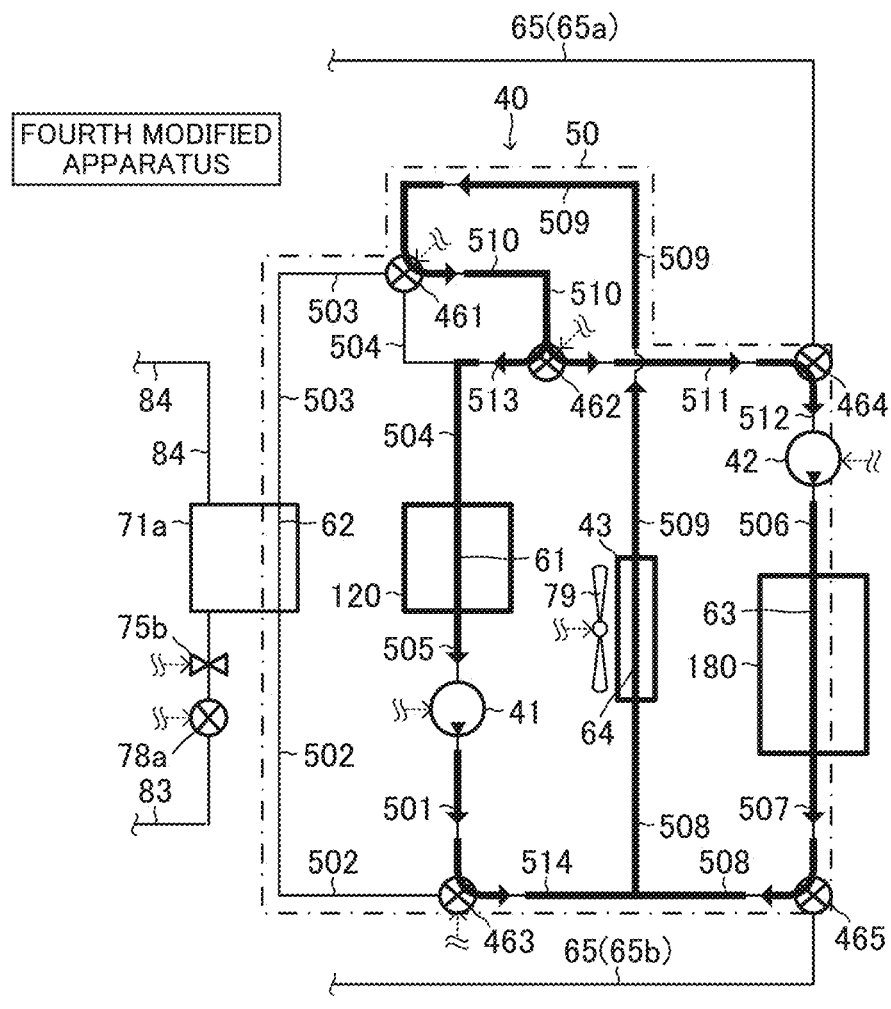
FIG. 35 is a view similar to FIG. 29 and which shows the flow of the cooling water.

When the fourth modified apparatus executes the first hybrid system circulation control, the cooling water flows in the hybrid system water circulation passage 50 as shown in FIG. 35. In particular, the cooling water discharged from the device pump 42 flows into the device water passage 63 through the sixth hybrid system water passage 506. The cooling water flows through the device water passage 63 and then, flows into the hybrid system radiator water passage 64 through the seventh hybrid system water passage 507, the internal water passage of the fifth hybrid system flow rate control valve 465, and the eighth hybrid system water passage 508. On the other hand, the cooling water discharged from the battery pump 41 flows into the hybrid system radiator water passage 64 through the first hybrid system water passage 501, the internal water passage of the third hybrid system flow rate control valve 463, the fourteenth hybrid system water passage 514, and the eighth hybrid system water passage 508.

The cooling water flows through the hybrid system radiator water passage 64 and then, flows into the internal water passage of the second hybrid system flow rate control valve 462 through the ninth hybrid system water passage 509, the internal water passage of the first hybrid system flow rate control valve 461, and the tenth hybrid system water passage 510. A part of the cooling water flowing into the internal water passage of the second hybrid system flow rate control valve 462, is suctioned into the device pump 42 through the eleventh hybrid system water passage 511, the internal water passage of the fourth hybrid system flow rate control valve 464, and the twelfth hybrid system water passage 512. The remaining of the cooling water flowing into the internal water passage of the second hybrid system flow rate control valve 462, flows into the battery water passage 61 through the thirteenth hybrid system water passage 513 and the fourth hybrid system water passage 504. The cooling water flows through the battery water passage 61 and then, is suctioned into the battery pump 41 through the fifth hybrid system water passage 505.

<Hybrid System Connection Circulation Control by Fourth Modified Apparatus>

Further, when the fourth modified apparatus executes the hybrid system connection circulation control, the fourth modified apparatus sets the first hybrid system flow rate control valve 461 at the first position, sets the second hybrid system flow rate control valve 462 at the third position, sets the third hybrid system flow rate control valve 463 at the second position, sets the fourth hybrid system flow rate control valve 464 at the first position, sets the fifth hybrid system flow rate control valve 465 at the first position, and activates the battery pump 41, the device pump 42, and the heat exchanging fan 79.

Figure 36:
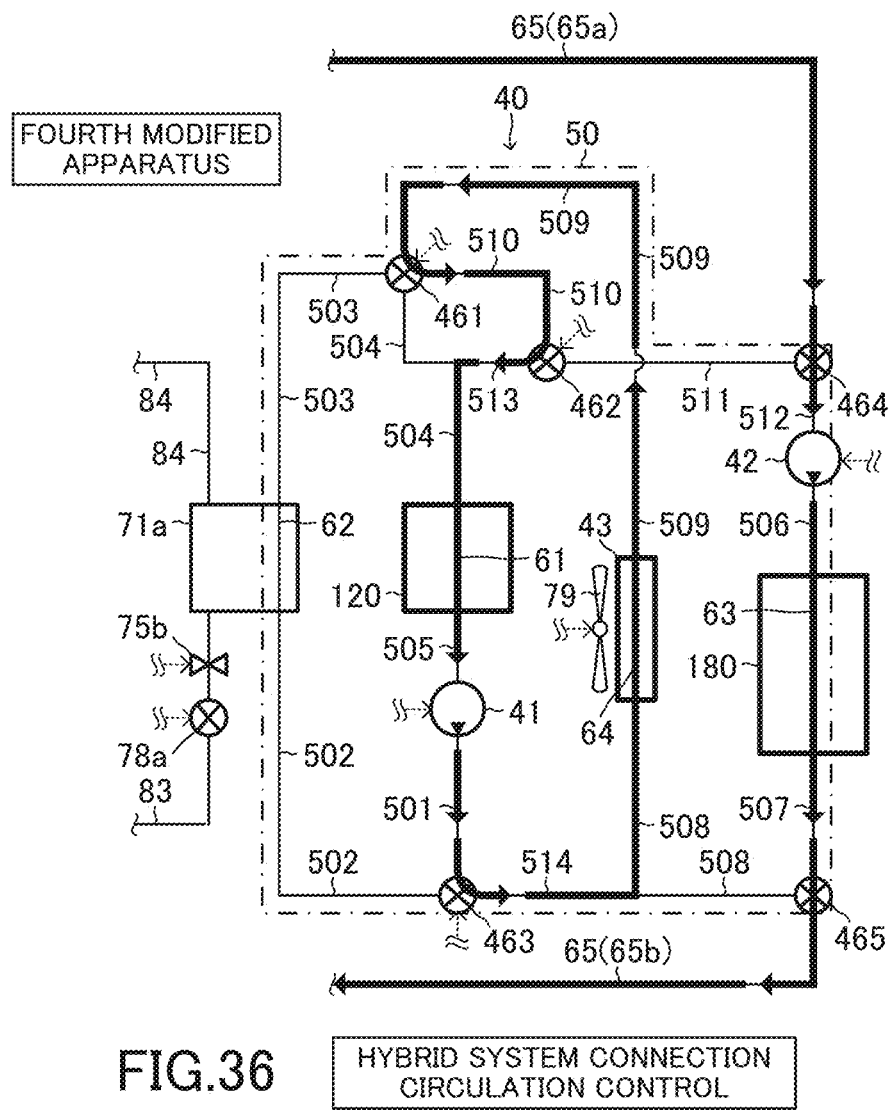
FIG. 36 is a view similar to FIG. 29 and which shows the flow of the cooling water.

When the fourth modified apparatus executes the hybrid system connection circulation control, the cooling water flows in the hybrid system water circulation passage 50 as shown in FIG. 36. In particular, the cooling water discharged from the device pump 42 flows into the device water passage 63 through the sixth hybrid system water passage 506. The cooling water flows through the device water passage 63 and then, flows into the engine radiator water passage 32 through the seventh hybrid system water passage 507, the internal water passage of the fifth hybrid system flow rate control valve 465, the second connection water passage 65*b*, and the third engine water passage 23. The cooling water flows through the engine radiator water passage 32 and then, is suctioned into the device pump 42 through the second engine water passage 22, the first connection water passage 65*a*, the internal water passage of the fourth hybrid system flow rate control valve 464, and the twelfth hybrid system water passage 512.

On the other hand, the cooling water discharged from the battery pump 41 flows into the hybrid system radiator water passage 64 through the first hybrid system water passage 501, the internal water passage of the third hybrid system flow rate control valve 463, the fourteenth hybrid system water passage 514, and the eighth hybrid system water passage 508. The cooling water flows through the hybrid system radiator water passage 64 and then, flows into the battery water passage 61 through the ninth hybrid system water passage 509, the internal water passage of the first hybrid system flow rate control valve 461, the tenth hybrid system water passage 510, the internal water passage of the second hybrid system flow rate control valve 462, the thirteenth hybrid system water passage 513, and the fourth hybrid system water passage 504. The cooling water flows through the battery water passage 61 and then, is suctioned into the battery pump 41 through the fifth hybrid system water passage 505.

<Second Hybrid System Circulation Control by Fourth Modified Apparatus>

When the fourth modified apparatus executes the second hybrid system circulation control, the fourth modified apparatus sets the first hybrid system flow rate control valve 461 at the first position, sets the second hybrid system flow rate control valve 462 at the second position, sets the third hybrid system flow rate control valve 463 at the third position, sets the fourth hybrid system flow rate control valve 464 at the second position, sets the fifth hybrid system flow rate control valve 465 at the second position, and activates the battery pump 41, the device pump 42, and the heat exchanging fan 79. At this time, the fourth modified apparatus executes the heat pump cooling circulation control.

Figure 37:
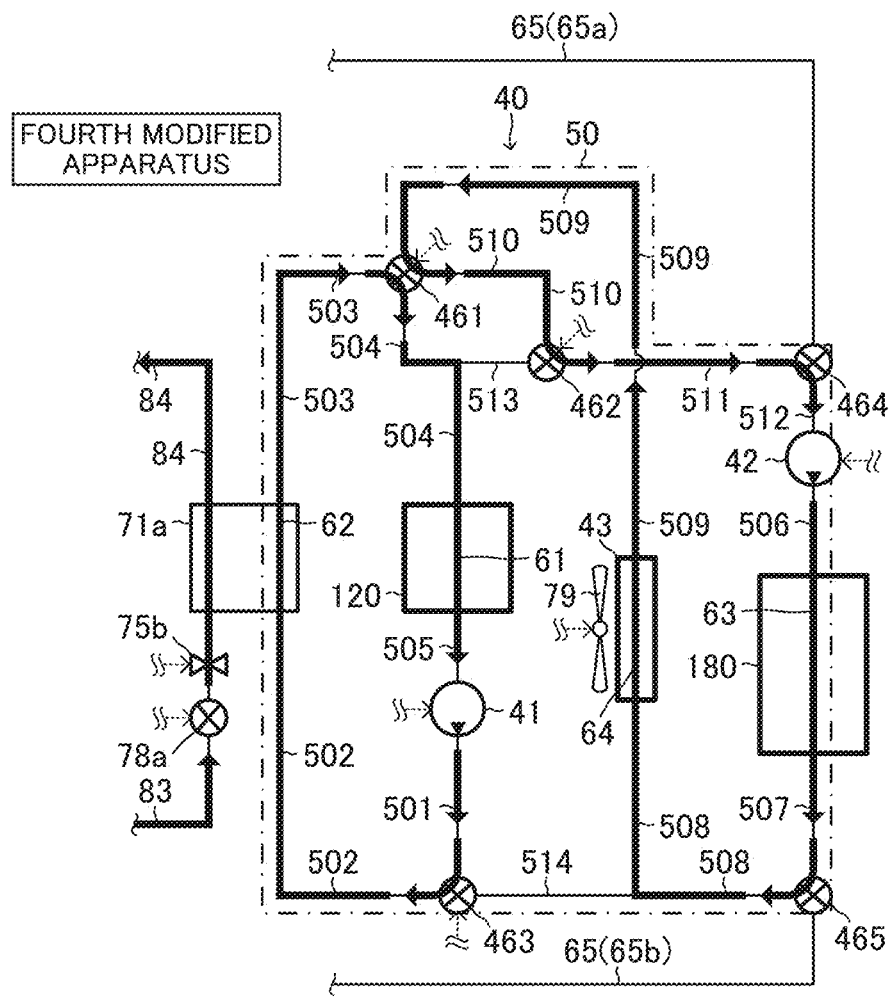
FIG. 37 is a view similar to FIG. 29 and which shows the flow of the cooling water and the flow of the cooling medium.

When the fourth modified apparatus executes the second hybrid system circulation control, the cooling water flows in the hybrid system water circulation passage 50 as shown in FIG. 37. In particular, the cooling water discharged from the device pump 42 flows into the device water passage 63 through the sixth hybrid system water passage 506. The cooling water flows through the device water passage 63 and then, flows into the hybrid system radiator water passage 64 through the seventh hybrid system water passage 507, the internal water passage of the fifth hybrid system flow rate control valve 465, and the eighth hybrid system water passage 508. The cooling water flows through the hybrid system radiator water passage 64 and then, is suctioned into the device pump 42 through the ninth hybrid system water passage 509, the internal water passage of the first hybrid system flow rate control valve 461, the tenth hybrid system water passage 510, the internal water passage of the second hybrid system flow rate control valve 462, the eleventh hybrid system water passage 511, the internal water passage of the fourth hybrid system flow rate control valve 464, and the twelfth hybrid system water passage 512.

On the other hand, the cooling water discharged from the battery pump 41 flows into the evaporator water passage 62 through the first hybrid system water passage 501, the internal water passage of the third hybrid system flow rate control valve 463, the second hybrid system water passage 502. The cooling water flows through the evaporator water passage 62 and then, flows into the battery water passage 61 thorough the third hybrid system water passage 503, the internal water passage of the first hybrid system flow rate control valve 461, and the fourth hybrid system water passage 504. The cooling water flows through the battery water passage 61 and then, is suctioned into the battery pump 41 through the fifth hybrid system water passage 505.

<Third Hybrid System Circulation Control by Fourth Modified Apparatus>

When the fourth modified apparatus executes the third hybrid system circulation control, the fourth modified apparatus sets the first hybrid system flow rate control valve 461 at the first position, sets the second hybrid system flow rate control valve 462 at the second position, sets the third hybrid system flow rate control valve 463 at the third position, sets the fourth hybrid system flow rate control valve 464 at the second position, sets the fifth hybrid system flow rate control valve 465 at the second position, and activates the battery pump 41 and the heat exchanging fan 79. At this time, the fourth modified apparatus executes the heat pump cooling circulation control.

Figure 38:
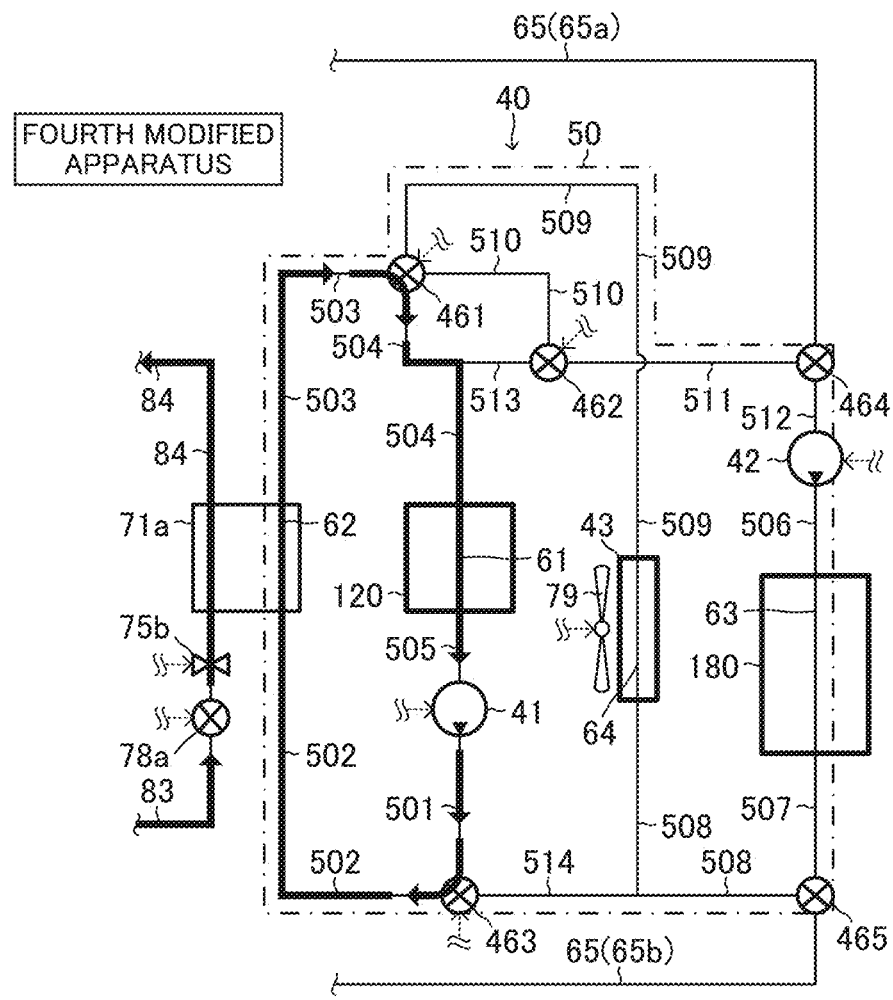
FIG. 38 is a view similar to FIG. 29 and which shows the flow of the cooling water and the flow of the cooling medium.

When the fourth modified apparatus executes the third hybrid system circulation control, the cooling water flows in the hybrid system water circulation passage 50 as shown in FIG. 38. In particular, the flow of the cooling water discharged from the battery pump 41 when the fourth modified apparatus executes the third hybrid system circulation control, is the same as the flow of the cooling water discharged from the battery pump 41 when the fourth modified apparatus executes the second hybrid system circulation control.

<Fourth Hybrid System Circulation Control by Fourth Modified Apparatus>

When the fourth modified apparatus executes the fourth hybrid system circulation control, the fourth modified apparatus sets the first hybrid system flow rate control valve 461 at the first position, sets the second hybrid system flow rate control valve 462 at the third position, sets the third hybrid system flow rate control valve 463 at the second position, sets the fourth hybrid system flow rate control valve 464 at the second position, sets the fifth hybrid system flow rate control valve 465 at the second position, and activates the battery pump 41 and the heat exchanging fan 79.

Figure 39:
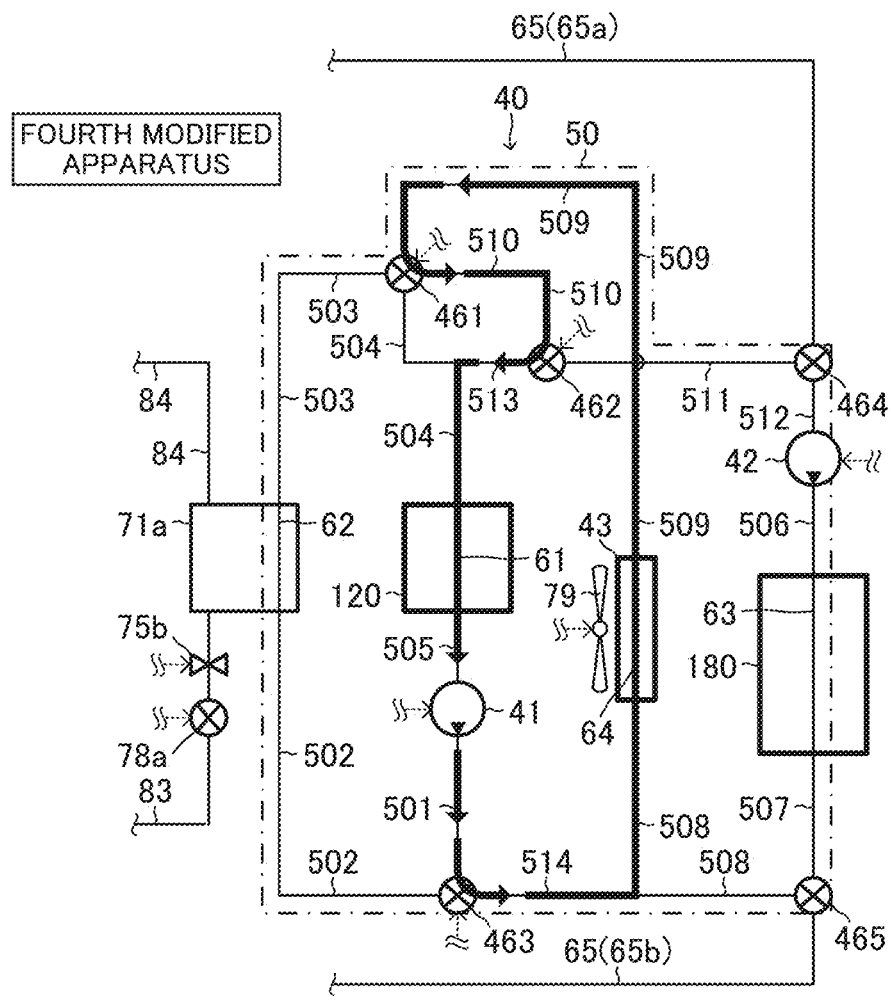
FIG. 39 is a view similar to FIG. 29 and which shows the flow of the cooling water.

When the fourth modified apparatus executes the fourth hybrid system circulation control, the cooling water flows in the hybrid system water circulation passage 50 as shown in FIG. 39. In particular, the cooling water discharged from the battery pump 41 flows into the hybrid system radiator water passage 64 through the first hybrid system water passage 501, the internal water passage of the third hybrid system flow rate control valve 463, the fourteenth hybrid system water passage 514, and the eighth hybrid system water passage 508. The cooling water flows through the hybrid system radiator water passage 64 and then, flows into the battery water passage 61 through the ninth hybrid system water passage 509, the internal water passage of the first hybrid system flow rate control valve 461, the tenth hybrid system water passage 510, the internal water passage of the second hybrid system flow rate control valve 462, the thirteenth hybrid system water passage 513, and the fourth hybrid system water passage 504. The cooling water flows through the battery water passage 61 and then, is suctioned into the battery pump 41 through the fifth hybrid system water passage 505.

<Fifth Hybrid System Circulation Control by Fourth Modified Apparatus>

When the fourth modified apparatus executes the fifth hybrid system circulation control, the fourth modified apparatus sets the first hybrid system flow rate control valve 461 at the first position, sets the second hybrid system flow rate control valve 462 at the second position, sets the third hybrid system flow rate control valve 463 at the third position, sets the fourth hybrid system flow rate control valve 464 at the second position, sets the fifth hybrid system flow rate control valve 465 at the second position, and activates the device pump 42 and the heat exchanging fan 79.

Figure 40:
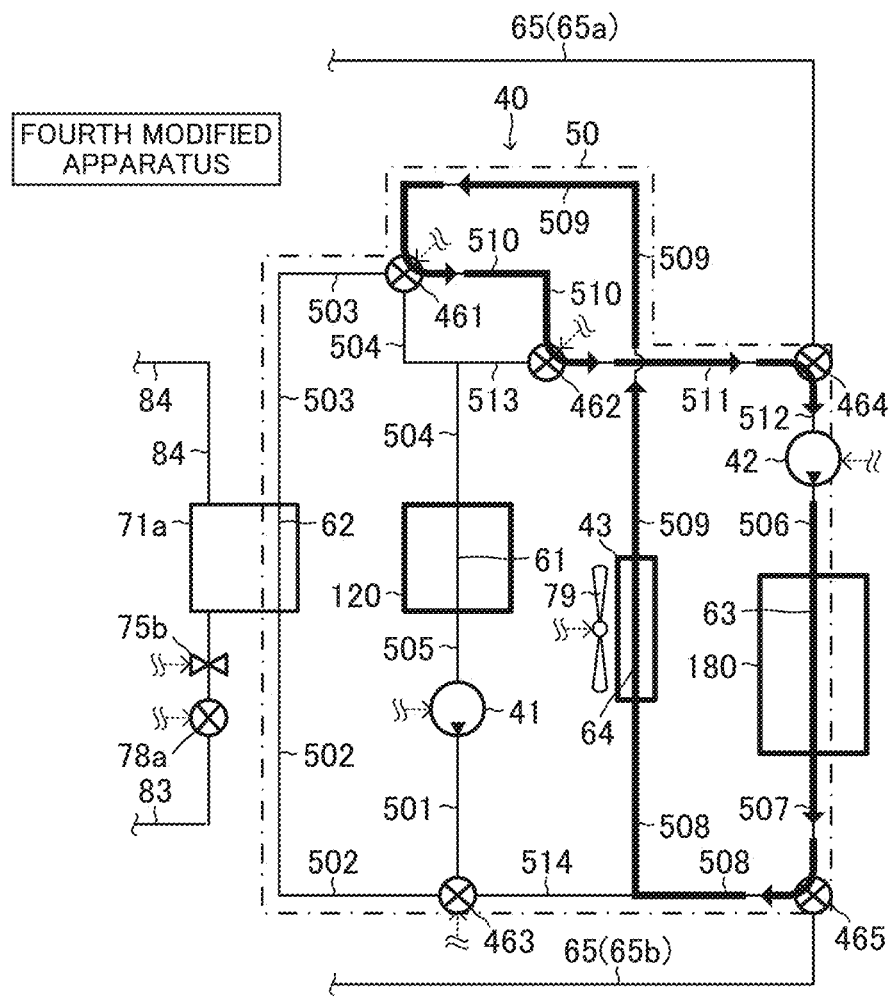
FIG. 40 is a view similar to FIG. 29 and which shows the flow of the cooling water.

When the fourth modified apparatus executes the fifth hybrid system circulation control, the cooling water flows in the hybrid system water circulation passage 50 as shown in FIG. 40. In particular, the flow of the cooling water discharged from the device pump 42 when the fourth modified apparatus executes the fifth hybrid system circulation control, is the same as the flow of the cooling water discharged from the device pump 42 when the fourth modified apparatus executes the second hybrid system circulation control.

The control of the engine system temperature control apparatus 10 and the heat pump 70 by the fourth modified apparatus is the same as the control of the engine system temperature control apparatus 10 and the heat pump 70 by the embodiment apparatus.

Fifth Modified Example

Figure 41:
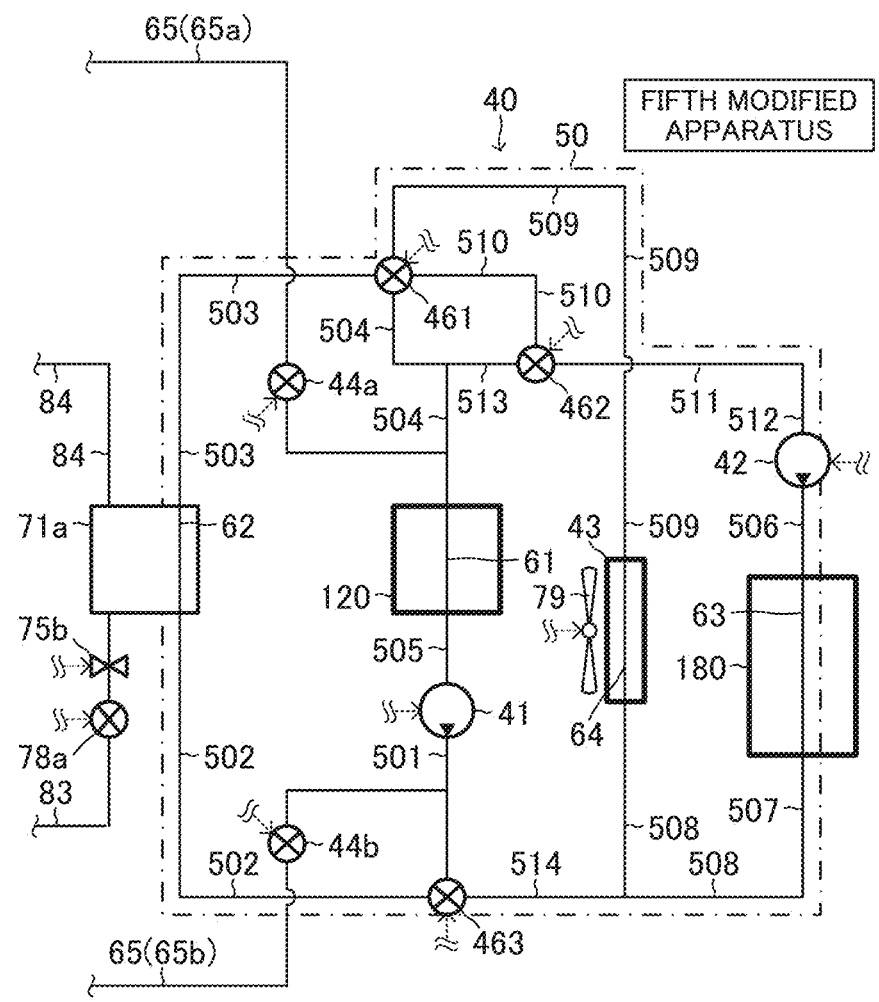
FIG. 41 is a view for showing a cooling apparatus of the vehicle driving system according to further another modified example of the embodiment.

Further, the invention can be applied to a cooling apparatus of the vehicle driving system 200 including the hybrid system temperature control apparatus 40 configured as shown in FIG. 41. The cooling apparatus shown in FIG. 41 is the same as the embodiment apparatus except that the hybrid system temperature control apparatus 40 of the cooling apparatus shown in FIG. 41 is different from the hybrid system temperature control apparatus 40 of the embodiment apparatus. Hereinafter, the cooling apparatus shown in FIG. 41 will be referred to as "the fifth modified apparatus".

The hybrid system temperature control apparatus 40 of the fifth modified apparatus includes the battery pump 41, the device pump 42, the hybrid system radiator 43, the first to third hybrid system flow rate control valves 461 to 463, a first connection water passage shut-off valve 44a, a second connection water passage shut-off valve 44b, and the hybrid system water circulation passage 50.

The first to third hybrid system flow rate control valves 461 to 463 of the fifth modified apparatus are the same as the first to third hybrid system flow rate control valves 461 to 463 of the fourth modified apparatus, respectively.

The hybrid system water circulation passage 50 of the fifth modified apparatus is formed by the battery water passage 61, the evaporator water passage 62, the device water passage 63, the hybrid system radiator water passage 64, the first to fourteenth hybrid system water passages 501 to 514, the internal water passage of the battery pump 41, the internal water passage of the device pump 42, and the internal water passages of the first to third hybrid system flow rate control valves 461 to 463.

The battery water passage 61, the evaporator water passage 62, the device water passage 63, and the hybrid system radiator water passage 64 of the fifth modified apparatus are the same as the battery water passage 61, the evaporator water passage 62, the device water passage 63, and the hybrid system radiator water passage 64 of the embodiment apparatus, respectively.

An end of the seventh hybrid system water passage 507 of the fifth modified apparatus is fluidically connected to the outlet of the device water passage 63, and the other end of the seventh hybrid system water passage 507 is fluidically connected to the eighth hybrid system water passage 508. Therefore, an end of the eighth hybrid system water passage 508 of the fifth modified apparatus is fluidically connected to the seventh hybrid system water passage 507, and the other end of the eighth hybrid system water passage 508 is fluidically connected to the inlet of the hybrid system radiator water passage 64.

An end of the twelfth hybrid system water passage 512 of the fifth modified apparatus is fluidically connected to the eleventh hybrid system water passage 511, and the other end of the twelfth hybrid system water passage 512 is fluidically connected to the cooling water suctioning opening of the device pump 42. Therefore, an end of the eleventh hybrid system water passage 511 of the fifth modified apparatus is fluidically connected to the twelfth hybrid system water passage 512, and the other end of the eleventh hybrid system water passage 511 is fluidically connected to the first hybrid system port 462a of the second hybrid system flow rate control valve 462.

The first to sixth hybrid system water passages 501 to 506, the ninth hybrid system water passage 509, the tenth hybrid system water passage 510, the thirteenth hybrid system water passage 513, and the fourteenth hybrid system water passage 514 of the fifth modified apparatus are the same as the first to sixth hybrid system water passages 501 to 506, the ninth hybrid system water passage 509, the tenth hybrid system water passage 510, the thirteenth hybrid system water passage 513, and the fourteenth hybrid system water passage 514 of the fourth modified apparatus, respectively.

The first connection water passage 65a of the fifth modified apparatus is fluidically connected to the fourth hybrid system water passage 504. The first connection water passage shut-off valve 44a is provided in the first connection water passage 65a of the fifth modified apparatus. The second connection water passage 65b of the fifth modified apparatus is fluidically connected to the first hybrid system water passage 501. The second connection water passage shut-off valve 44b is provided in the second connection water passage 65b of the fifth modified apparatus.

The first connection water passage shut-off valve 44a is electrically connected to the ECU 90. A setting position of the first connection water passage shut-off valve 44a is controlled by the ECU 90. When the first connection water passage shut-off valve 44a is set at an open position, the cooling water can flow through the first connection water passage shut-off valve 44a. When the first connection water passage shut-off valve 44a is set at a closed position, the cooling water cannot flow through the first connection water passage shut-off valve 44a.

The second connection water passage shut-off valve 44b is electrically connected to the ECU 90. A setting position of the second connection water passage shut-off valve 44b is controlled by the ECU 90. When the second connection water passage shut-off valve 44b is set at an open position, the cooling water can flow through the second connection water passage shut-off valve 44b. When the second connection water passage shut-off valve 44b is set at a closed position, the cooling water cannot flow through the second connection water passage shut-off valve 44b.

The battery pump 41 is electrically connected to the ECU 90. The activation of the battery pump 41 is controlled by the ECU 90. The device pump 42 is electrically connected to the ECU 90. The activation of the device pump 42 is controlled by the ECU 90.

<First Hybrid System Circulation Control by Fifth Modified Apparatus>

When the fifth modified apparatus executes the first hybrid system circulation control, the fifth modified apparatus sets the first hybrid system flow rate control valve 461 at the first position, sets the second hybrid system flow rate control valve 462 at the fourth position, sets the third hybrid system flow rate control valve 463 at the second position, sets the first connection water passage shut-off valve 44a at the closed position, sets the second connection water passage shut-off valve 44b at the closed position, and activates the battery pump 41, the device pump 42, and the heat exchanging fan 79.

Figure 42:
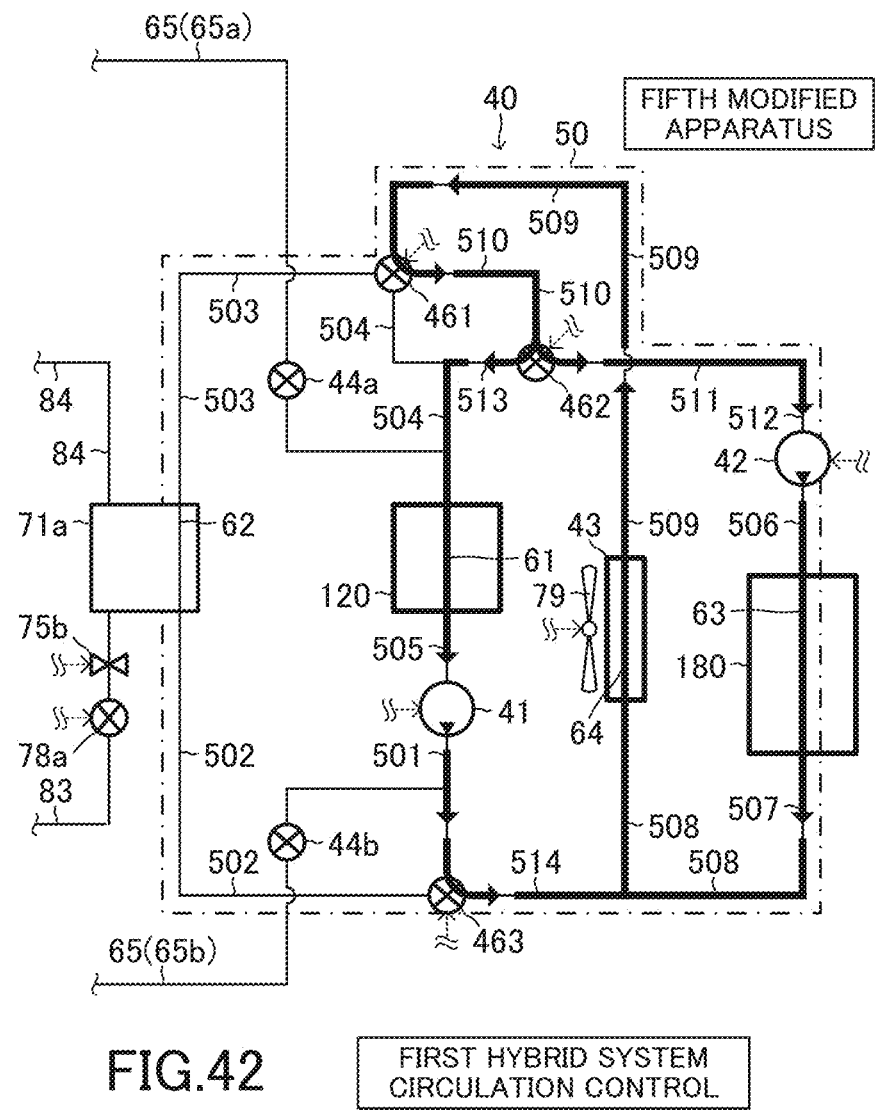
FIG. 42 is a view similar to FIG. 41 and which shows the flow of the cooling water.

When the fifth modified apparatus executes the first hybrid system circulation control, the cooling water flows in the hybrid system water circulation passage 50 as shown in FIG. 42. In particular, the cooling water discharged from the device pump 42 flows into the device water passage 63 through the sixth hybrid system water passage 506. The cooling water flows through the device water passage 63 and then, flows into the hybrid system radiator water passage 64 through the seventh hybrid system water passage 507 and the eighth hybrid system water passage 508. On the other hand, the cooling water discharged from the battery pump 41 flows into the hybrid system radiator water passage 64 through the first hybrid system water passage 501, the internal water passage of the third hybrid system flow rate control valve 463, the fourteenth hybrid system water passage 514, and the eighth hybrid system water passage 508.

The cooling water flows through the hybrid system radiator water passage 64 and then, flows into the internal water passage of the second hybrid system flow rate control valve 462 through the ninth hybrid system water passage 509, the internal water passage of the first hybrid system flow rate control valve 461, and the tenth hybrid system water passage 510. A part of the cooling water flowing into the internal water passage of the second hybrid system flow rate control valve 462, is suctioned into the device pump 42 through the eleventh hybrid system water passage 511 and the twelfth hybrid system water passage 512. On the other hand, the remaining of the cooling water flowing into the internal water passage of the second hybrid system flow rate control valve 462, flows into the battery water passage 61 through the thirteenth hybrid system water passage 513 and the fourth hybrid system water passage 504. The cooling water flows through the battery water passage 61 and then, is suctioned into the battery pump 41 through the fifth hybrid system water passage 505.

<Hybrid System Connection Circulation Control by Fifth Modified Apparatus>

Further, when the fifth modified apparatus executes the hybrid system connection circulation control, the fifth modified apparatus sets the first hybrid system flow rate control valve 461 at the first position, sets the second hybrid system flow rate control valve 462 at the second position, sets the third hybrid system flow rate control valve 463 at the first or second position, sets the first connection water passage shut-off valve 44a at the open position, sets the second connection water passage shut-off valve 44b at the open position, and activates the battery pump 41, the device pump 42, and the heat exchanging fan 79.

Figure 43:
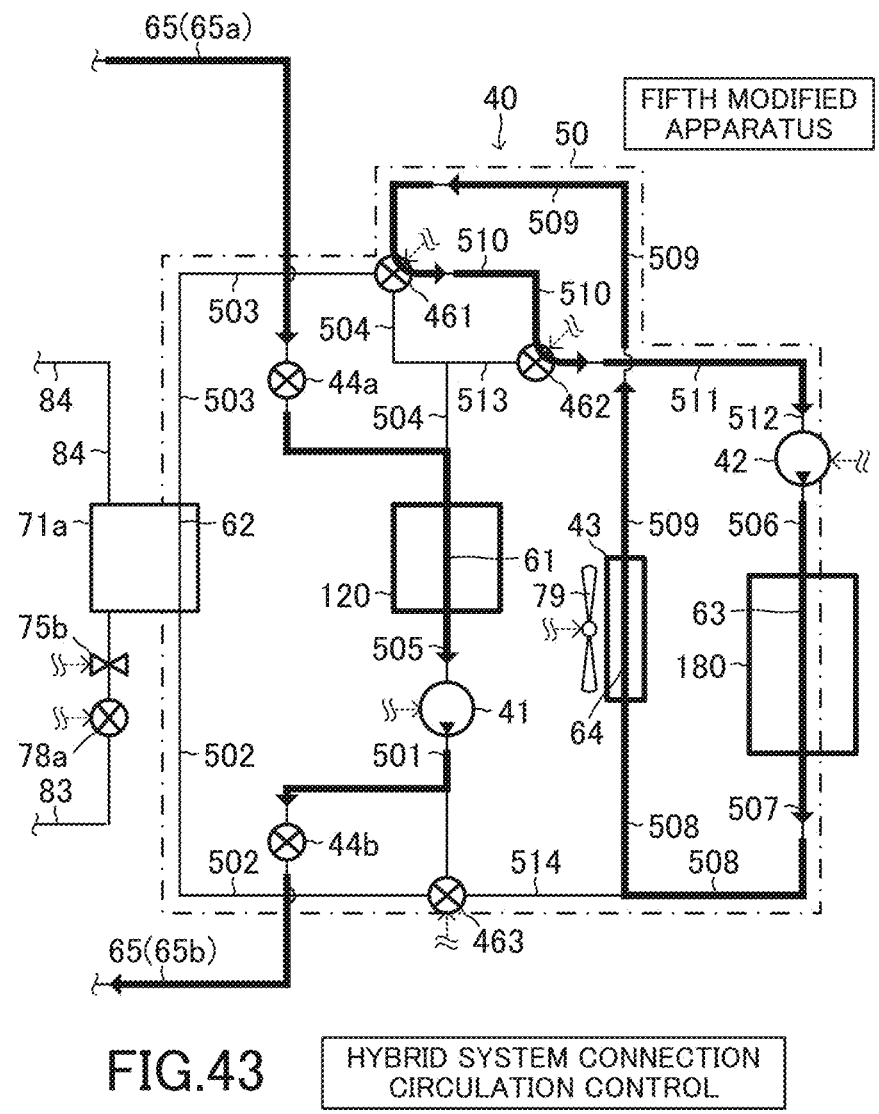
FIG. 43 is a view similar to FIG. 41 and which shows the flow of the cooling water.

When the fifth modified apparatus executes the hybrid system connection circulation control, the cooling water flows in the hybrid system water circulation passage 50 as shown in FIG. 43. In particular, the cooling water discharged from the device pump 42 flows into the device water passage 63 through the sixth hybrid system water passage 506. The cooling water flows through the device water passage 63 and then, flows into the hybrid system radiator water passage 64 through the seventh hybrid system water passage 507 and the eighth hybrid system water passage 508. The cooling water flows through the hybrid system radiator water passage 64 and then, is suctioned into the device pump 42 through the ninth hybrid system water passage 509, the internal water passage of the first hybrid system flow rate control valve 461, the tenth hybrid system water passage 510, the internal water passage of the second hybrid system flow rate control valve 462, the eleventh hybrid system water passage 511, and the twelfth hybrid system water passage 512.

On the other hand, the cooling water discharged from the battery pump 41 flows into the engine radiator water passage 32 through the first hybrid system water passage 501, the second connection water passage 65b, and the third engine water passage 23. The cooling water flows through the engine radiator water passage 32 and then, flows into the battery water passage 61 through the second engine water passage 22, the first connection water passage 65a, and the fourth hybrid system water passage 504. The cooling water flows through the battery water passage 61 and then, is suctioned into the battery pump 41 through the fifth hybrid system water passage 505.

<Second Hybrid System Circulation Control by Fifth Modified Apparatus>

When the fifth modified apparatus executes the second hybrid system circulation control, the fifth modified apparatus sets the first hybrid system flow rate control valve 461 at the first position, sets the second hybrid system flow rate control valve 462 at the second position, sets the third hybrid system flow rate control valve 463 at the third position, sets the first connection water passage shut-off valve 44a at the closed position, sets the second connection water passage shut-off valve 44b at the closed position, and activates the battery pump 41, the device pump 42, and the heat exchanging fan 79. At this time, the fifth modified apparatus executes the heat pump cooling circulation control.

Figure 44:
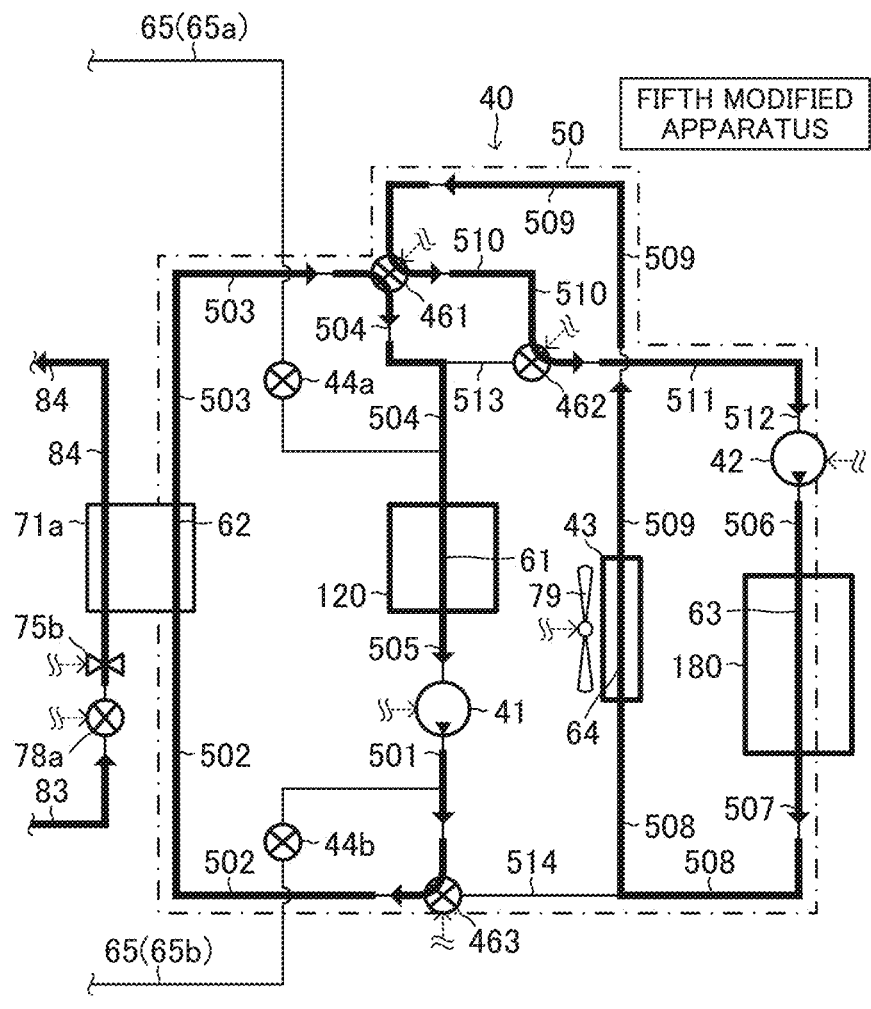
FIG. 44 is a view similar to FIG. 41 and which shows the flow of the cooling water and the flow of the cooling medium.

When the fifth modified apparatus executes the second hybrid system circulation control, the cooling water flows in the hybrid system water circulation passage 50 as shown in FIG. 44. In particular, the flow of the cooling water discharged from the device pump 42 when the fifth modified apparatus executes the second hybrid system circulation control, is the same as the flow of the cooling water discharged from the device pump 42 when the fifth modified apparatus executes the hybrid system connection circulation control.

On the other hand, the cooling water discharged from the battery pump 41 flows into the evaporator water passage 62 through the first hybrid system water passage 501, the internal water passage of the third hybrid system flow rate control valve 463, and the second hybrid system water passage 502. The cooling water flows through the evaporator water passage 62 and then, flows into the battery water passage 61 through the third hybrid system water passage 503, the internal water passage of the first hybrid system flow rate control valve 461, and the fourth hybrid system water passage 504. The cooling water flows through the battery water passage 61 and then, is suctioned into the battery pump 41 through the fifth hybrid system water passage 505.

<Third Hybrid System Circulation Control by Fifth Modified Apparatus>

When the fifth modified apparatus executes the third hybrid system circulation control, the fifth modified apparatus sets the first hybrid system flow rate control valve 461 at the first position, sets the second hybrid system flow rate control valve 462 at the second position, sets the third hybrid system flow rate control valve 463 at the third position, sets the first connection water passage shut-off valve 44a at the closed position, sets the second connection water passage shut-off valve 44b at the closes position, and activates the battery pump 41 and the heat exchanging fan 79. At this time, the fifth modified apparatus executes the heat pump cooling circulation control.

Figure 45:
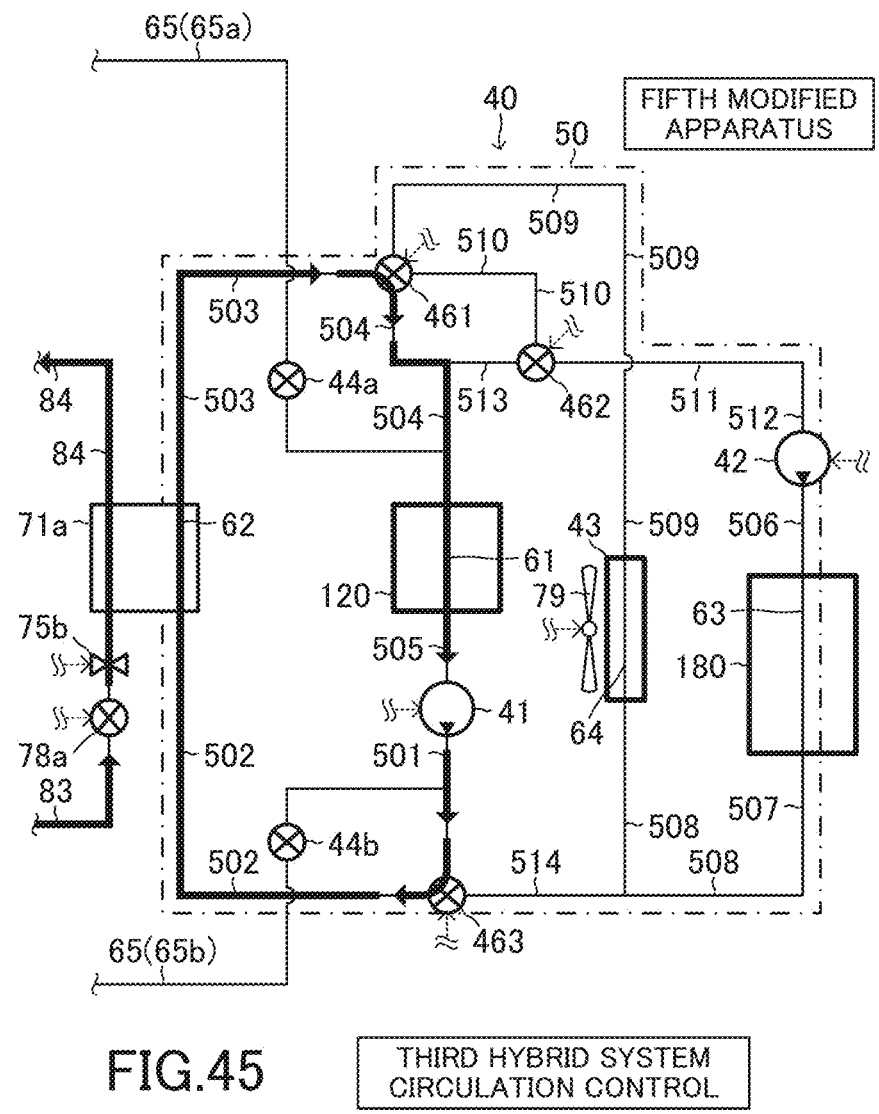
FIG. 45 is a view similar to FIG. 41 and which shows the flow of the cooling water and the flow of the cooling medium.

When the fifth modified apparatus executes the third hybrid system circulation control, the cooling water flows in the hybrid system water circulation passage 50 as shown in FIG. 45. In particular, the flow of the cooling water discharged from the battery pump 41 when the fifth modified apparatus executes the third hybrid system circulation control, is the same as the cooling water discharged from the battery pump 41 when the fifth modified apparatus executes the second hybrid system circulation control.

<Fourth Hybrid System Circulation Control by Fifth Modified Apparatus>

When the fifth modified apparatus executes the fourth hybrid system circulation control, the fifth modified apparatus sets the first hybrid system flow rate control valve 461 at the first position, sets the second hybrid system flow rate control valve 462 at the third position, sets the third hybrid system flow rate control valve 463 at the second position, sets the first connection water passage shut-off valve 44a at the closed position, sets the second connection water passage shut-off valve 44b at the closed position, and activates the battery pump 41 and the heat exchanging fan 79.

Figure 46:
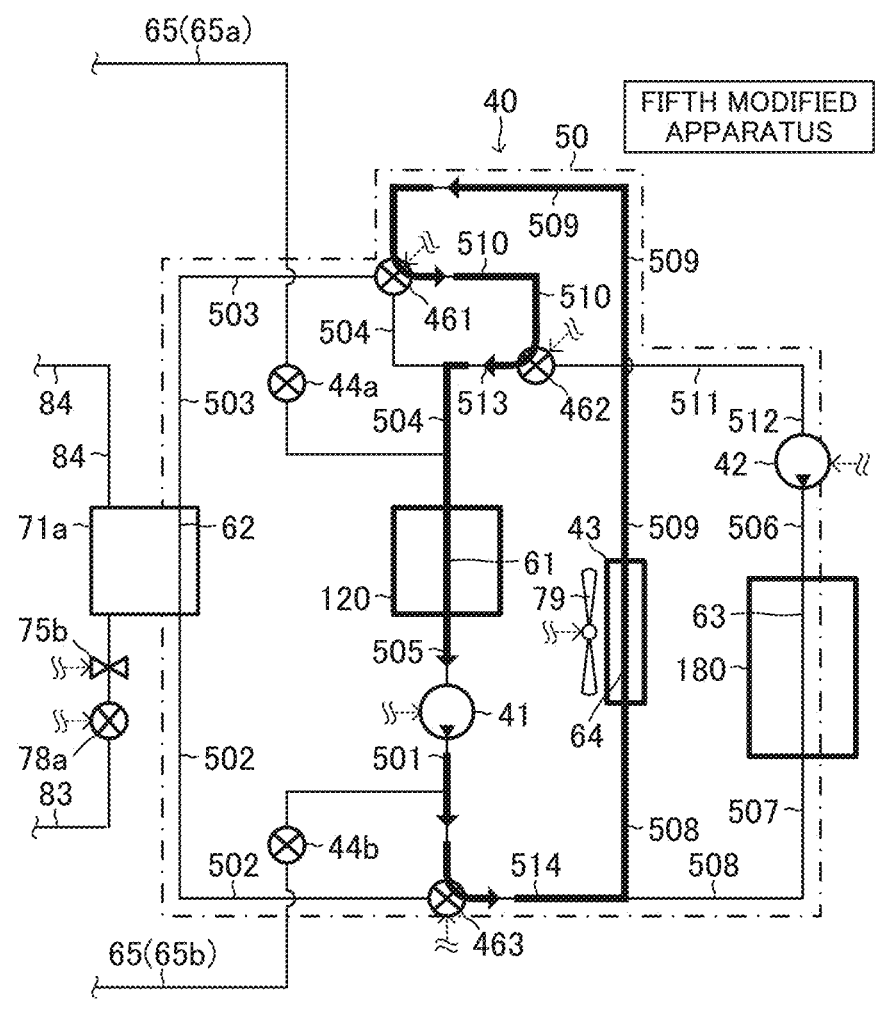
FIG. 46 is a view similar to FIG. 41 and which shows the flow of the cooling water.

When the fifth modified apparatus executes the fourth hybrid system circulation control, the cooling water flows in the hybrid system water circulation passage 50 as shown in FIG. 46. In particular, the cooling water discharged from the battery pump 41 flows into the hybrid system radiator water passage 64 through the first hybrid system water passage 501, the internal water passage of the third hybrid system flow rate control valve 463, the fourteenth hybrid system water passage 514, and the eighth hybrid system water passage 508. The cooling water flows through the hybrid system radiator water passage 64 and then, flows into the battery water passage 61 through the ninth hybrid system water passage 509, the internal water passage of the first hybrid system flow rate control valve 461, the tenth hybrid system water passage 510, the internal water passage of the second hybrid system flow rate control valve 462, the thirteenth hybrid system water passage 513, and the fourth hybrid system water passage 504. The cooling water flows through the battery water passage 61 and then, is suctioned into the battery pump 41 through the fifth hybrid system water passage 505.

<Fifth Hybrid System Circulation Control by Fifth Modified Apparatus>

When the fifth modified apparatus executes the fifth hybrid system circulation control, the fifth modified apparatus sets the first hybrid system flow rate control valve 461 at the first position, sets the second hybrid system flow rate control valve 462 at the second position, sets the third hybrid system flow rate control valve 463 at the third position, sets the first connection water passage shut-off valve 44a at the closed position, sets the second connection water passage shut-off valve 44b at the closed position, and activates the device pump 42 and the heat exchanging fan 79.

Figure 47:
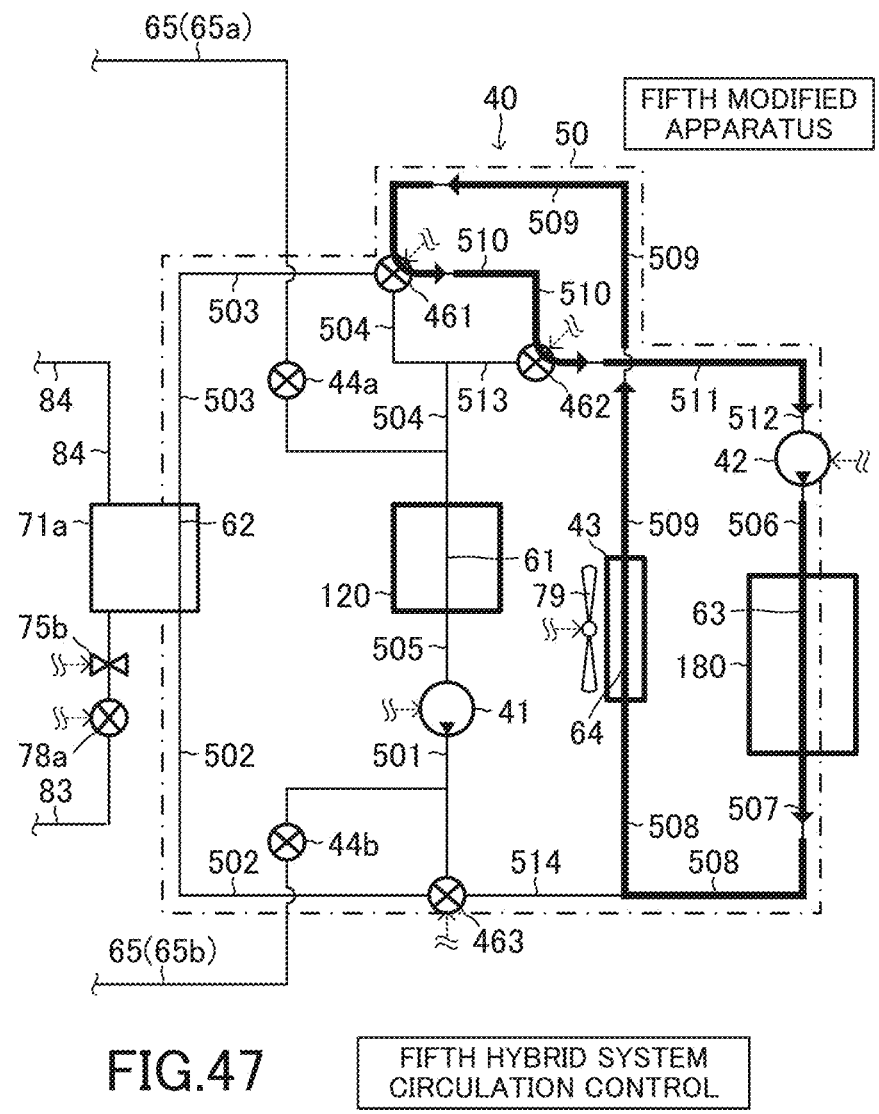
FIG. 47 is a view similar to FIG. 41 and which shows the flow of the cooling water.

When the fifth modified apparatus executes the fifth hybrid system circulation control, the cooling water flows in the hybrid system water circulation passage 50 as shown in FIG. 47. In particular, the flow of the cooling water discharged from the device pump 42 when the fifth modified apparatus executes the fifth hybrid system circulation control, is the same as the flow of the cooling water discharged from the device pump 42 when the fifth modified apparatus executes the second hybrid system circulation control.

The control of the engine system temperature control apparatus 10 and the heat pump 70 by the fifth modified apparatus is the same as the control of the engine system temperature control apparatus 10 and the heat pump 70 by the embodiment apparatus.

Sixth Modified Example

Further, the invention may be applied to a cooling apparatus of the vehicle driving system 200 configured as shown in FIG. 48. The cooling apparatus shown in FIG. 48 is the same as the embodiment apparatus except that the heat pump 70 of the cooling apparatus shown in FIG. 48 is different from the heat pump 70 of the embodiment apparatus. Hereinafter, the cooling apparatus shown in FIG. 48 will be referred to as "the sixth modified apparatus".

<Heat Pump of Sixth Modified Apparatus>

In the heat pump 70 of the sixth modified apparatus, the end of the third cooling medium passage 83 is fluidically connected to the cooling medium outlet of the condenser 73, and the other end of the third cooling medium passage 83 is fluidically connected to the cooling medium inlet of the first evaporator 71a. Further, the first expansion valve 75a is provided in the third cooling medium passage 83 between the cooling medium outlet of the condenser 73 and the connection portion P3. The heat pump 70 of the sixth modified apparatus does not include the outside air heat exchanger 72 of the embodiment apparatus.

<Summary of Activation of Sixth Modified Apparatus>

Below, controls including activating the compressor 74 of the heat pump 70 out of the controls executed by the sixth modified apparatus, will be described.

When the sixth modified apparatus determines that the heat pump activation condition is satisfied, the sixth modified apparatus executes a heat pump cooling/heating circulation control for flowing the cooling medium in the cooling medium circulation passage 80 as shown in FIG. 49 and executes a control for supplying the cooling water which flowed through the battery water passage 61, to the evaporator water passage 62 and a control for supplying the cooling water which flowed through the condenser water passage 34, to the engine radiator water passage 32, depending on various conditions. Below, the third hybrid system circulation control described above as the control for supplying the cooling water which flowed through the battery water passage 61, to the evaporator water passage 62 and a third engine circulation control described below as the control for supplying the cooling water which flowed through the condenser water passage 34, to the engine radiator water passage 32, will be described.

When the sixth modified apparatus executes the heat pump cooling/heating circulation control, the sixth modified apparatus sets the first cooling medium passage shut-off valve 78a at the open position, sets the second cooling medium passage shut-off valve 78b at the closed position, sets the heat pump bypass valve 77 at the closed position, sets the first expansion valve 75a at the non-decompression position, sets the second expansion valve 75b at the decompression position, and activates the compressor 74. At this time, the sixth modified apparatus may set the third expansion valve 75c at any of the decompression position and the non-decompression position.

When the sixth modified apparatus executes the heat pump cooling/heating circulation control, the cooling medium discharged from the compressor 74 flows into the condenser 73 through the first cooling medium passage 81 as shown in FIG. 49. The cooling medium flows through the condenser 73 and then, flows into the first evaporator 71a through the third cooling medium passage 83. The cooling medium flows through the first evaporator 71a and then, is suctioned into the compressor 74 through the fourth cooling medium passage 84.

Further, when the sixth modified apparatus executes the third engine circulation control, the sixth modified apparatus sets the engine flow rate control valve 17 at the third position, sets the first engine water passage shut-off valve 16a at the open position, sets the second engine water passage shut-off valve 16b at the open position, sets the engine bypass valve 18 at the closed position, stops activating the engine pump 11, and activates the heating pump 12 and the heat exchanging fan 79.

When the sixth modified apparatus executes the third engine circulation control, the cooling water discharged from the heating pump 12 flows into the condenser water passage 34 through the fourth engine water passage 24 as shown in FIG. 49. The cooling water flows through the condenser water passage 34 and then, flows into the engine radiator water passage 32 through the fifth engine water passage 25, the eighth engine water passage 28, and the second engine water passage 22. The cooling water flows through the engine radiator water passage 32 and then, is suctioned into the heating pump 12 through the third engine water passage 23, the ninth engine water passage 29, and the seventh engine water passage 27.

Thereby, the first expansion valve 75a is set at the non-decompression position, and the second expansion valve 75b is set at the decompression position. Therefore, the cooling medium having a temperature increased by a compression by the compressor 74, discharges the heat thereof to the cooling water flowing through the condenser water passage 34 while the cooling medium flows through the condenser 73. Thereby, the temperature of the cooling medium decreases. The cooling water receiving the heat from the cooling medium, is cooled by the engine radiator 13 while the cooling water flows through the engine radiator water passage 32.

The cooling medium having the temperature decreased at the condenser 73, flows through the second expansion valve 75b. A pressure of the cooling medium decreases while the cooling medium flows through the second expansion valve 75b. The cooling medium having the decreased pressure and the decreased temperature, flows through the first evaporator 71a. The cooling medium receives the heat from the cooling water flowing through the evaporator water passage 62 to evaporate while the cooling medium flows through the first evaporator 71a. Thereby, the cooling water is cooled. The cooled cooling water is supplied to the battery water passage 61. The battery 120 is cooled by the supplied cooling water.

Further, when the sixth modified apparatus determines that the process of heating the interior of the vehicle 100 is requested, the sixth modified apparatus executes the heat pump cooling/interior-heating circulation control and executes the control for supplying the cooling water which flowed through at least one of the battery water passage 61 and the device water passage 63, to the evaporator water passage 62 and the control for supplying the cooling water which flowed through the condenser water passage 34, to the core water passage 33. Below, the third hybrid system circulation control as the control for supplying the cooling water which flowed through at least one of the battery water passage 61 and the device water passage 63, to the evaporator water passage 62 and the engine interior-heating circulation control as the control for supplying the cooling water which flowed through the condenser water passage 34, to the core water passage 33, will be described.

Figure 50:
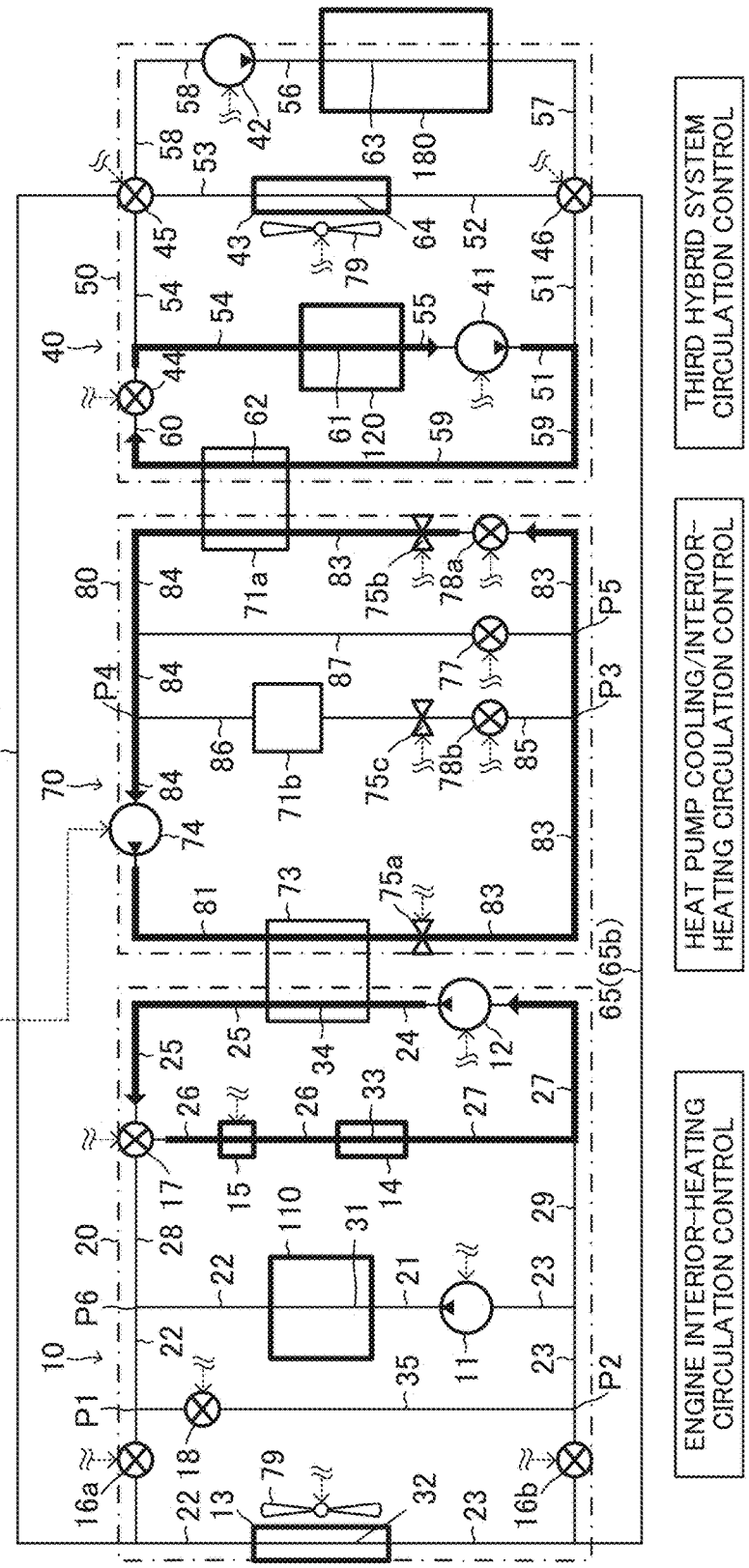
FIG. 50 is a view similar to FIG. 48 and which shows the flow of the cooling water and the flow of the cooling medium.

When the sixth modified apparatus executes the heat pump cooling/interior-heating circulation control, the third hybrid system circulation control, and the engine interior-heating circulation control, the cooling medium flows in the cooling medium circulation passage 80, and the cooling water flows in the engine water circulation passage 20 and the hybrid system water circulation passage 50 as shown in FIG. 50.

Thereby, the cooling medium having the temperature increased by the compression by the compressor 74, discharges the heat thereof to the cooling water flowing through the condenser water passage 34 while the cooling medium flows through the condenser 73. Thereby, the temperature of the cooling medium decreases. On the other hand, the cooling water having the temperature increased by the heat of the cooling medium at the condenser 73, is supplied to the core water passage 33. The cooling water discharges its heat to the heater core 14 while the cooling water flows through the core water passage 33. The discharged heat is used for heating the interior of the vehicle 100.

The pressure of the cooling medium having the temperature decreased at the condenser 73, decreases while the cooling medium flows through the second expansion valve 75b. The cooling medium having the decreased temperature and the decreased pressure, flows through the first evaporator 71a. The cooling medium receives the heat from the cooling water flowing through the evaporator water passage 62 to evaporate while the cooling medium flows through the first evaporator 71a. At this time, the temperature of the cooling medium increases. The cooling medium having the increased temperature is compressed by the compressor 74. Thereby, the temperature of the cooling medium further increases.

When the sixth modified apparatus determines that the process of cooling the interior of the vehicle 100 is requested, the sixth modified apparatus executes a heat pump interior-cooling circulation control described below and executes the control for supplying the cooling water which flowed through the condenser water passage 34, to the engine radiator water passage 32, depending on various conditions. Below, the third engine circulation control described above as the control for supplying the cooling water which flowed through the condenser water passage 34, to the engine radiator water passage 32, will be described.

When the sixth modified apparatus executes the heat pump interior-cooling circulation control, the sixth modified apparatus sets the first cooling medium passage shut-off valve 78a at the closed position, sets the second cooling medium passage shut-off valve 78b at the open position, sets the heat pump bypass valve 77 at the closed position, sets the first expansion valve 75a at the non-decompression position, sets the third expansion valve 75c at the decompression position, and activates the compressor 74. At this time, the sixth modified apparatus sets the second expansion valve 75b at any of the decompression and non-decompression positions.

When the sixth modified apparatus executes the heat pump interior-cooling circulation control, the cooling medium discharged from the compressor 74 flows into the condenser 73 through the first cooling medium passage 81 as shown in FIG. 51. The cooling medium flows through the condenser 73 and then, flows into the second evaporator 71b through the third cooling medium passage 83 and the fifth cooling medium passage 85. The cooling medium flows through the second evaporator 71b and then, is suctioned into the compressor 74 through the sixth cooling medium passage 86 and the fourth cooling medium passage 84.

When the sixth modified apparatus executes the heat pump interior-cooling circulation control and the third engine circulation control, the cooling medium having the temperature increased by the compression by the compressor 74, discharges the heat thereof to the cooling water flowing through the condenser water passage 34 while the cooling medium flows through the condenser 73. Thereby, the temperature of the cooling medium decreases. The cooling water receiving the heat of the cooling medium at the condenser 73, is cooled by the engine radiator 13 while the cooling water flows through the engine radiator water passage 32.

The pressure of the cooling medium having the temperature decreased at the condenser 73, decreases while the cooling medium flows through the third expansion valve 75c. The cooling medium having the decreased temperature and the decreased pressure, flows through the second evaporator 71b. The cooling medium receives the heat from the air in the surroundings of the second evaporator 71b while the cooling medium flows through the second evaporator 71b. Thereby, the air in the surroundings of the second evaporator 71b is cooled. The cooled air is used for cooling the interior of the vehicle 100.

Further, when the sixth modified apparatus determines that the process of cooling the interior of the vehicle 100 is requested while the sixth modified apparatus executes the hybrid system connection circulation control, the sixth modified apparatus executes the heat pump interior-cooling circulation control and the third engine circulation control. When the embodiment apparatus executes the hybrid system connection circulation control, the embodiment apparatus sets the first engine water passage shut-off valve 16a at the closed position and sets the second engine water passage shut-off valve 16b at the closed position. To the contrary, when the sixth modified apparatus executes the hybrid system connection circulation control, the six modified apparatus sets the first engine water passage shut-off valve 16a at the open position and sets the second engine water passage shut-off valve 16b at the open position.

When the sixth modified apparatus executes the heat pump interior-cooling circulation control, the sixth modified apparatus sets the first cooling medium passage shut-off valve 78a at the open position, sets the heat pump bypass valve 77 at the closed position, sets the first expansion valve 75a at the non-decompression position, sets the second expansion valve 75b at the non-decompression position, sets the third expansion valve 75c at the decompression position, and activates the compressor 74.

When the sixth modified apparatus executes the heat pump interior-cooling circulation control, the cooling medium discharged from the compressor 74 flows as shown in FIG. 52. Further, when the sixth modified apparatus executes the hybrid system connection circulation control and the third engine circulation control, the cooling water discharged from the heating pump 12, the battery pump 41, and the device pump 42 flows as shown in FIG. 52.

Thereby, the cooling water receiving the heat from the cooling medium flowing through the condenser 73, is cooled by the engine radiator 13 and the hybrid system radiator 43. In addition, the pressure of the cooling medium having the temperature decreased by discharging the heat thereof to the cooling water at the condenser 73, decreases while the cooling medium flows through the third expansion valve 75c. The cooling medium having the decreased temperature and the decreased pressure, flows through the second evaporator 71b. The cooling medium receives the heat from the air in the surroundings of the second evaporator 71b while the cooling medium flows through the second evaporator 71b. Thereby, the air in the surroundings of the second evaporator 71b is cooled. The cooled air is used for cooling the interior of the vehicle 100.

<Other Modified Apparatus>

Further, the embodiment apparatus and the first to sixth modified apparatuses may be configured to include a battery temperature sensor for detecting the temperature of the battery 120 in place of the battery water temperature sensor 94. In this case, the battery temperature sensor is provided in the battery 120. The battery temperature sensor is electrically connected to the ECU 90. The battery temperature sensor detects the temperature of the battery 120 and outputs a signal representing the detected temperature to the ECU 90. The ECU 90 acquires the temperature of the battery 120 as the battery temperature Tbat on the basis of the signal output from the battery temperature sensor.

In this case, for example, the embodiment apparatus determines that the process of cooling the battery 120 is requested when the battery 120 is activated, and the battery temperature Tbat is equal to or higher than a battery warmed temperature Tbat_dan. The battery warmed temperature Tbat_dan is set to be the lower limit temperature Tbat_lower of the predetermined battery temperature range WTbat.

Further, the embodiment apparatus determines that the heat pump activation condition is satisfied when the battery temperature Tbat is higher than the predetermined battery temperature Tbat_th.

Further, the embodiment apparatus estimates the battery water temperature TWbat on the basis of the battery temperature Tbat. The embodiment apparatus determines that the connection permission condition C5 is satisfied when the estimated battery water temperature TWbat is higher than the engine water temperature TWeng.

What is claimed is:

1. A cooling apparatus of a vehicle driving system, comprising:
   an engine water circulation passage, through which cooling water for cooling an internal combustion engine of the vehicle driving system for driving a vehicle, flows;
   an engine radiator provided in the engine water circulation passage for cooling the cooling water by an outside air;
   a hybrid system water circulation passage, through which the cooling water for cooling a first hybrid system component and a second hybrid system component of the vehicle driving system, flows, one of the first hybrid system component and the second hybrid system component including at least one of an electric motor and a battery;
   a hybrid system radiator provided in the hybrid system water circulation passage for cooling the cooling water by the outside air;
   a connection device including a first connection water passage for connecting the engine water circulation passage to the hybrid system water circulation passage and a second connection water passage for connecting the hybrid system water circulation passage to the engine water circulation passage (20); and
   an electronic control unit for controlling a flow of the cooling water and an activation of the connection device,
   wherein
   the electronic control unit is configured to:
   when an engine cooling process of cooling the internal combustion engine is requested, a first hybrid system cooling process of cooling the first hybrid system component is requested, a second hybrid system cooling process of cooling the second hybrid system component is requested, and a connection condition is not satisfied,
   execute a first control for controlling:
   the activation of the connection device to disconnect the engine water circulation passage from the hybrid system water circulation passage through the first connection water passage and disconnect the hybrid system water circulation passage from the engine water circulation passage through the second connection water passage;

the flow of the cooling water in the engine water circulation passage to cool the internal combustion engine by the cooling water cooled by the engine radiator; and the flow of the cooling water in the hybrid system water circulation passage to cool the first hybrid system component and the second hybrid system component by the cooling water cooled by the hybrid system radiator, and when the engine cooling process is not requested, the first hybrid system cooling process is requested, the second hybrid system cooling process is requested, and the connection condition is satisfied, execute a second control for controlling:

the activation of the connection device to connect the engine water circulation passage to the hybrid system water circulation passage through the first connection water passage and connect the hybrid system water circulation passage to the engine water circulation passage through the second connection water passage; and the flow of the cooling water in the engine water circulation passage, the hybrid system water circulation passage, the first connection water passage, and the second connection water passage to cool the first hybrid system component by the cooling water cooled by the engine radiator and cool the second hybrid system component by the cooling water cooled by the hybrid system radiator, and the connection condition is satisfied when the engine cooling process is not requested, and the cooling water flowing into the hybrid system water circulation passage from the engine water circulation passage through the first connection water passage, can cool the first hybrid system component.

2. The cooling apparatus of the vehicle driving system as set forth in claim 1, wherein the electronic control unit is configured to determine whether the cooling water flowing into the hybrid system water circulation passage from the engine water circulation passage through the first connection water passage, can cool the first hybrid system component on the basis of a temperature of the cooling water in the engine water circulation passage without the second control being executed and a temperature of the cooling water in the hybrid system water circulation passage without the second control being executed.

3. The cooling apparatus of the vehicle driving system as set forth in claim 2, wherein the electronic control unit is configured to determine that the cooling water flowing into the hybrid system water circulation passage from the engine water circulation passage through the first connection water passage, can cool the first hybrid system component when the temperature of the cooling water in the engine water circulation passage without the second control being executed, is equal to or lower than the temperature of the cooling water in the hybrid system water circulation passage without the second control being executed.

4. The cooling apparatus of the vehicle driving system as set forth in claim 3, wherein the electronic control unit is configured to use the temperature of the cooling water which cooled the first hybrid system component without the second control being executed, as the temperature of the cooling water in the hybrid system water circulation passage without the second control being executed.

5. The cooling apparatus of the vehicle driving system as set forth in claim 2, wherein the electronic control unit is configured to determine that the cooling water flowing into the hybrid system water circulation passage from the engine water circulation passage through the first connection water passage, can cool the first hybrid system component when the temperature of the cooling water in the engine water circulation passage without the second control being executed, is equal to or lower than a permitted upper limit of a temperature of the first hybrid system component.

6. The cooling apparatus of the vehicle driving system as set forth in claim 1, wherein the electronic control unit is configured to determine that the cooling water flowing into the hybrid system water circulation passage from the engine water circulation passage through the first connection water passage, can cool the first hybrid system component when an amount of heat generated by the first hybrid system component and the second hybrid system component is larger than a maximum amount of the heat discharged by the hybrid system radiator.

7. The cooling apparatus of the vehicle driving system as set forth in claim 1, wherein the electronic control unit is configured to determine that the engine cooling process is not requested when an operation of the internal combustion engine is stopped.

8. The cooling apparatus of the vehicle driving system as set forth in claim 1, wherein the electronic control unit is configured to determine that the engine cooling process is requested when the internal combustion engine is operated, and a temperature of the internal combustion engine is equal to or higher than a predetermined engine warmed temperature, at which the internal combustion engine becomes warmed completely.

9. The cooling apparatus of the vehicle driving system as set forth in claim 1, wherein the electronic control unit is configured to determine that the first hybrid system cooling process is requested when the first hybrid system component is activated, and a temperature of the first hybrid system component is equal to or higher than a predetermined first hybrid system component warmed temperature, at which the first hybrid system component becomes warmed completely.

10. The cooling apparatus of the vehicle driving system as set forth in claim 1, wherein the electronic control unit is configured to determine that the second hybrid system cooling process is requested when the second hybrid system component is activated, and a temperature of the second hybrid system component is equal to or higher than a predetermined second hybrid system component warmed temperature, at which the second hybrid system component becomes warmed completely.

11. The cooling apparatus of the vehicle driving system as set forth in claim 1, wherein the first hybrid system component includes the electric motor.

12. The cooling apparatus of the vehicle driving system as set forth in claim 11, wherein the second hybrid system component includes the battery.

13. The cooling apparatus of the vehicle driving system as set forth in claim 1, wherein the first hybrid system component includes the battery.

14. The cooling apparatus of the vehicle driving system as set forth in claim 13, wherein the second hybrid system component includes the electric motor.

* * * * *